United States Patent
Chen et al.

(10) Patent No.: US 11,288,432 B2
(45) Date of Patent: *Mar. 29, 2022

(54) COMPUTER IMPLEMENTED SYSTEM AND METHOD FOR GENERATING A LAYOUT OF A CELL DEFINING A CIRCUIT COMPONENT

(71) Applicant: Arm Limited, Cambridge (GB)

(72) Inventors: Andy Wangkun Chen, Austin, TX (US); Yew Keong Chong, Austin, TX (US); Tom Shore, Austin, TX (US); Gus Yeung, Austin, TX (US); Marlin Wayne Frederick, Jr., Austin, TX (US); Sriram Thyagarajan, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/062,567

(22) Filed: Oct. 3, 2020

(65) Prior Publication Data
US 2021/0019463 A1 Jan. 21, 2021

Related U.S. Application Data

(63) Continuation of application No. 16/140,461, filed on Sep. 24, 2018, now Pat. No. 10,796,053, which is a (Continued)

(51) Int. Cl.
*G06F 30/39* (2020.01)
*G06F 30/30* (2020.01)
*G06F 30/398* (2020.01)
*G06F 30/392* (2020.01)
*G06F 30/394* (2020.01)

(52) U.S. Cl.
CPC .............. *G06F 30/39* (2020.01); *G06F 30/30* (2020.01); *G06F 30/398* (2020.01); *G06F 30/392* (2020.01); *G06F 30/394* (2020.01)

(58) Field of Classification Search
CPC ........ G06F 30/39; G06F 30/398; G06F 30/30; G06F 30/392; G06F 30/394
(Continued)

(56) References Cited

U.S. PATENT DOCUMENTS 5,579,237 A * 11/1996 Shibuya ................ G06F 30/392
716/122
5,619,420 A * 4/1997 Breid ...................... G06F 30/39
716/113

(Continued)

*Primary Examiner* — Phallaka Kik
(74) *Attorney, Agent, or Firm* — Pramudji Law Group PLLC; Ari Pramudji

(57) ABSTRACT

Various implementations described herein are directed to a method. The method may provide a tile database with multiple tiles that define one or more first component sections for a memory device. The method may define an array of storage elements having a specified memory array width. The method may define one or more second component sections having at least part of a standard cell based tile with standard cells arranged in multiple standard cell rows. The method may generate a memory instance by defining a layout for the memory device with the multiple tiles selected from the tile database based on matching the multiple standard cell rows to the specified memory array width of the array of storage elements.

20 Claims, 53 Drawing Sheets

Related U.S. Application Data continuation of application No. 14/528,314, filed on Oct. 30, 2014, now Pat. No. 10,083,269, which is a continuation-in-part of application No. 14/165,623, filed on Jan. 28, 2014, now Pat. No. 9,659,125.

(60) Provisional application No. 61/906,237, filed on Nov. 19, 2013.

(58) Field of Classification Search
USPC ............ 716/122, 123, 124, 129, 130, 131; 703/15
See application file for complete search history.

(56) References Cited

U.S. PATENT DOCUMENTS

| | | | | |
|---|---|---|---|---|
| 5,757,657 | A * | 5/1998 | Hathaway | G06F 30/392 710/9 |
| 5,850,350 | A * | 12/1998 | Shibuya | G06F 30/392 716/122 |
| 6,463,575 | B1 * | 10/2002 | Takahashi | G06F 30/39 716/130 |
| 7,818,703 | B2 * | 10/2010 | Andreev | G06F 30/392 716/122 |
| 8,863,051 | B2 * | 10/2014 | Kauth | G06F 30/398 716/106 |
| 10,083,269 | B2 * | 9/2018 | De Dood | G06F 30/398 |
| 10,796,053 | B2 * | 10/2020 | de Dood | G06F 30/30 |
| 2006/0217916 | A1 * | 9/2006 | Cheng | G06F 30/398 702/119 |
| 2007/0157146 | A1 * | 7/2007 | Chen | G06F 30/392 257/798 |
| 2008/0222578 | A1 * | 9/2008 | Joshi | G06F 30/39 716/103 |
| 2013/0179662 | A1 * | 7/2013 | Choquette | G06F 9/3851 712/206 |
| 2014/0130003 | A1 * | 5/2014 | Cheuh | G06F 30/398 716/121 |
| 2014/0353842 | A1 * | 12/2014 | Yuan | H01L 23/5226 257/774 |

* cited by examiner

SCHEMATIC FOR A NAND (OF SPECIFIC DRIVE STRENGTH)

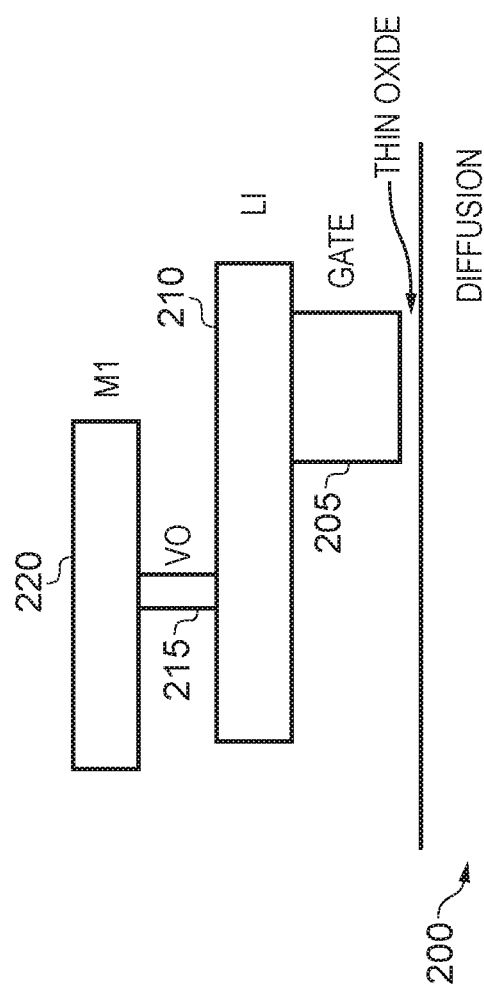

LOG AFTER COMPLETION OF PROCESS OF FIG 5A

| GRID LOCATION 392 | MATCHING MAPPING ENTRIES 394 | LOCATION ENABLED/DISABLED 396 |
|---|---|---|
| 0,0 | | |
| 0,1 | | |
| ⋮ | | |
| M,M | | |

FOR COMPACTION NODES 1 & 3 GENERATE SET OF BREAKPOINTS TO IDENTIFY FORCES

| FORCE 1 | $y \geq 3nm,$ | priority 10 |
| FORCE 2 | $y \geq 4nm,$ | priority 9 |
| FORCE 3 | $y \geq 5nm,$ | priority 8 |

Ⓐ = GEOMETRY IS OPTIONAL BUT IF PRESENT MUST BE CONFINED TO REGION A

Ⓑ = NO GEOMETRY TO APPEAR IN REGION B

Ⓒ = AT LEAST ONE GEOMETRY MUST APPEAR IN LAYOUT C

IF W1 + W2 + W3 = NEW TILE WIDTH, THEN INSTANCE OF LONGEST ROW
SO PLACE SIDE BY SIDE

COMPUTER IMPLEMENTED SYSTEM AND METHOD FOR GENERATING A LAYOUT OF A CELL DEFINING A CIRCUIT COMPONENT

RELATED CASES

This application is a continuation of U.S. patent application Ser. No. 16/140,461, now U.S. Pat. No. 10,796,053, filed 2018 Sep. 24, which is a continuation of U.S. patent application Ser. No. 14/528,314, filed 2014 Oct. 30 and now U.S. Pat. No. 10,083,269, which is a continuation-in-part of U.S. patent application Ser. No. 14/165,623, filed on 2014 Jan. 28, and now U.S. Pat. No. 9,659,125; and U.S. patent application Ser. No. 14/528,314 also claims priority to U.S. Provisional Patent Application Ser. No. 61/906,237, filed on 2013 Nov. 19; the entire contents of each of which are incorporated herein by reference.

BACKGROUND

Field

The present technique relates to a computer implemented system and method for generating a layout of a cell defining a circuit component.

Description of the Prior Art

When producing integrated circuits, a number of process layers are formed on a substrate, each process layer incorporating a layout pattern. The layout patterns within the various layers establish component features and interconnections such that once the final process layer has been formed, an integrated circuit has been produced containing all of the required circuit components interconnected in the manner required to perform the functions of the integrated circuit.

For a new integrated circuit, a layout of that integrated circuit will be produced in the form of a data file identifying the required layout patterns for each of the process layers. To assist in the generation of such a layout, it is known to use cell libraries providing a plurality of different cells, each cell defining a layout for a particular component. Various types of cells are used in modern systems for generating integrated circuit layouts, for example standard cells, datapath cells, custom cells, cells representing portions of a memory device, etc. For the purposes of the following discussions, the standard cell example will be referred to.

A standard cell library will provide a plurality of standard cells, each standard cell defining a layout for a particular circuit component. The circuit components for which standard cells are developed are typically the basic building block components used to construct more complex circuits within the integrated circuit, and hence for example standard cells may be generated for AND gates, NAND gates, OR gates, NOR gates, inverters, flops, etc.

Once a standard cell library has been produced for a particular process technology, then the design of integrated circuits for that process technology can be simplified. For example, it is known to provide automated tools which use a functional design of a planned integrated circuit (for example in the form of a gate level net list or a Register Transfer Language (RTL) higher level representation of the design) and a standard cell library in order to generate the layout of the planned integrated circuit.

Typically, the standard cells are arranged in rows by the automated tool and (considering the rows as running horizontally) the left and right boundaries of each standard cell are such that any given standard cell may be placed next to any other given standard cell. Thus the automated tool has free choice as to which standard cells are placed where in order to fulfil the requirements of the functional design with a low routing overhead. This process is illustrated schematically in FIG. 38, which illustrates a portion 700 of an integrated circuit layout, the portion shown having three rows of a fixed row height 725. Each row comprises a series of blocks 720 with a fixed unit of width 730. Each standard cell in the standard cell library is arranged to have a height equal to the row height 725, and to have a width which can vary between cells but is a multiple of the unit width 730. Standard cells are then placed into each row having regards to the required circuit elements and connections between those circuit elements required by the integrated circuit, with the various standard cells arranged to abut against one another. For the purpose of illustration, three standard cells 740, 750, 760 are shown located within one of the rows.

For each type of component having an associated standard cell, it is often the case that multiple versions of the standard cell are produced to cover different forms of that component type. For example, considering a NAND gate, it will typically be the case that multiple standard cells will be produced to represent NAND gates having different drive strengths. As the drive strength increases, the width of the standard cell will typically become larger in order to accommodate the additional structures (for example additional gate fingers) that may be required to produce a NAND gate with the increased drive strength. Similarly, for other components such as flops, there may be a need to produce multiple different standard cells to represent the various variants of flops required, for example a scan flop, a non-scan flop, a reset flop, a non-reset flop, a retention flop, etc.

Accordingly, it will be appreciated that a large number of standard cells will typically need to be provided within the standard cell library for any particular process technology. For a different process technology, the standard cells will then need to be redesigned to ensure they conform to the design rules applicable to that process technology. With current process technologies, up to and including 20 nm technology, the design rules have been relatively straightforward, consisting essentially of an indication of the minimum width of a pattern feature, a minimum spacing between pattern features, and alignment/overlap rules used to ensure vias can be reliably produced interconnecting pattern features at different process layers. Due to the relatively simple nature of the design rules, it has been possible for the standard cells to be manually designed. Further, it has been a relatively straightforward exercise to develop additional standard cells to cover variants of a particular circuit component, such as different drive strengths NAND gates, different forms of flop, etc.

However, as the process technologies reduce below the 20 nm technology, for example in to the 14 nm domain, then the techniques used to develop each of the process layers become significantly more complex. For example, at each process layer, the number of processes required to perform the required layout patterns increases, as techniques such as double patterning are required to produce the layout pattern at such small process geometries. This results in the design rules becoming far more complicated than has traditionally been the case, setting out not only the three basic rules discussed earlier, but also requiring the specification of many different examples and exceptions. This has the result that the design of standard cells for emerging process technologies is becoming very complex. Further, at such process technologies it is no longer the case that a new variant of a particular component can readily be produced merely by a relatively simple modification to an existing standard cell. For example, whilst in current process technologies, the standard cell layout for a higher drive strength NAND gate may be readily produced by a relatively simple modification to the standard cell layout of a lower driver strength NAND gate, this is no longer the case in emerging process technologies such as 14 nm technology, and often the standard cell layouts will be very different for different variants of a particular component.

The above described problems associated with the generation of standard cells apply also to the generation of other types of cells.

Against this background, it would be desirable to provide a technique which enabled automation in the generation of cells that conform to the design rules of these emerging process technologies.

SUMMARY

In one example, there is provided a computer implemented method of generating a layout of a cell defining a circuit component, the layout providing a layout pattern for a target process technology, the method comprising: obtaining an archetype layout providing a valid layout pattern for the cell having regard to design rules of the target process technology; receiving an input data file providing a process technology independent schematic of the circuit component for which the cell is to be generated; performing a schematic sizing operation on the input data file, having regard to schematic constraints applicable to the target process technology and layout constraints derived from the archetype layout, in order to generate an output data file providing a process technology dependent schematic of the circuit component; performing a cell generation operation using the output data file and layout data determined from the archetype layout in order to generate the layout of the cell.

In one example, there is provided a computer program product on a non-transitory storage medium for controlling a computer to perform the above-described method of generating a layout of a cell defining a circuit component.

In a further example, there is provided a non-transitory storage medium storing a cell library containing one or more cell layouts generated in accordance with the above-described cell layout generation method.

In a further example there is provided a system for generating a layout of a cell defining a circuit component, the layout providing a layout pattern for a target process technology, the system comprising: a first interface configured to receive an archetype layout providing a valid layout pattern for the cell having regard to design rules of the target process technology; a second interface configured to receive an input data file providing a process technology independent schematic of the circuit component for which the cell is to be generated; and processing circuitry configured to perform a schematic sizing operation on the input data file, having regard to schematic constraints applicable to the target process technology and layout constraints derived from the archetype layout, in order to generate an output data file providing a process technology dependent schematic of the circuit component; the processing circuitry further configured to perform a cell generation operation using the output data file and layout data determined from the archetype layout in order to generate the layout of the cell.

In a further example there is provided a system for generating a layout of a cell defining a circuit component, the layout providing a layout pattern for a target process technology, the system comprising: first interface means for obtaining an archetype layout providing a valid layout pattern for the cell having regard to design rules of the target process technology; second interface means for receiving an input data file providing a process technology independent schematic of the circuit component for which the cell is to be generated; sizing means for performing a schematic sizing operation on the input data file, having regard to schematic constraints applicable to the target process technology and layout constraints derived from the archetype layout, in order to generate an output data file providing a process technology dependent schematic of the circuit component; and cell generation means for performing a cell generation operation using the output data file and layout data determined from the archetype layout in order to generate the layout of the cell.

In a further example there is provided a method of manufacturing an integrated circuit comprising: employing the above-described cell layout generation method to generate layouts of a plurality of cells, each cell defining a circuit component; performing a place and route operation to generate, from an input functional definition of the integrated circuit, a layout design incorporating said plurality of cells; and manufacturing the integrated circuit from the layout design.

BRIEF DESCRIPTION OF THE DRAWINGS

The present technique will be described further, by way of example only, with reference to embodiments thereof as illustrated in the accompanying drawings, in which:

FIG. 4A schematically illustrates various process layers for which layout patterns will need to be provided within the standard cell layout;

FIG. 6 schematically illustrates a log that is established during the performance of the process of FIG. 5A, in accordance with one embodiment;

DESCRIPTION OF EMBODIMENTS

Figure 1:
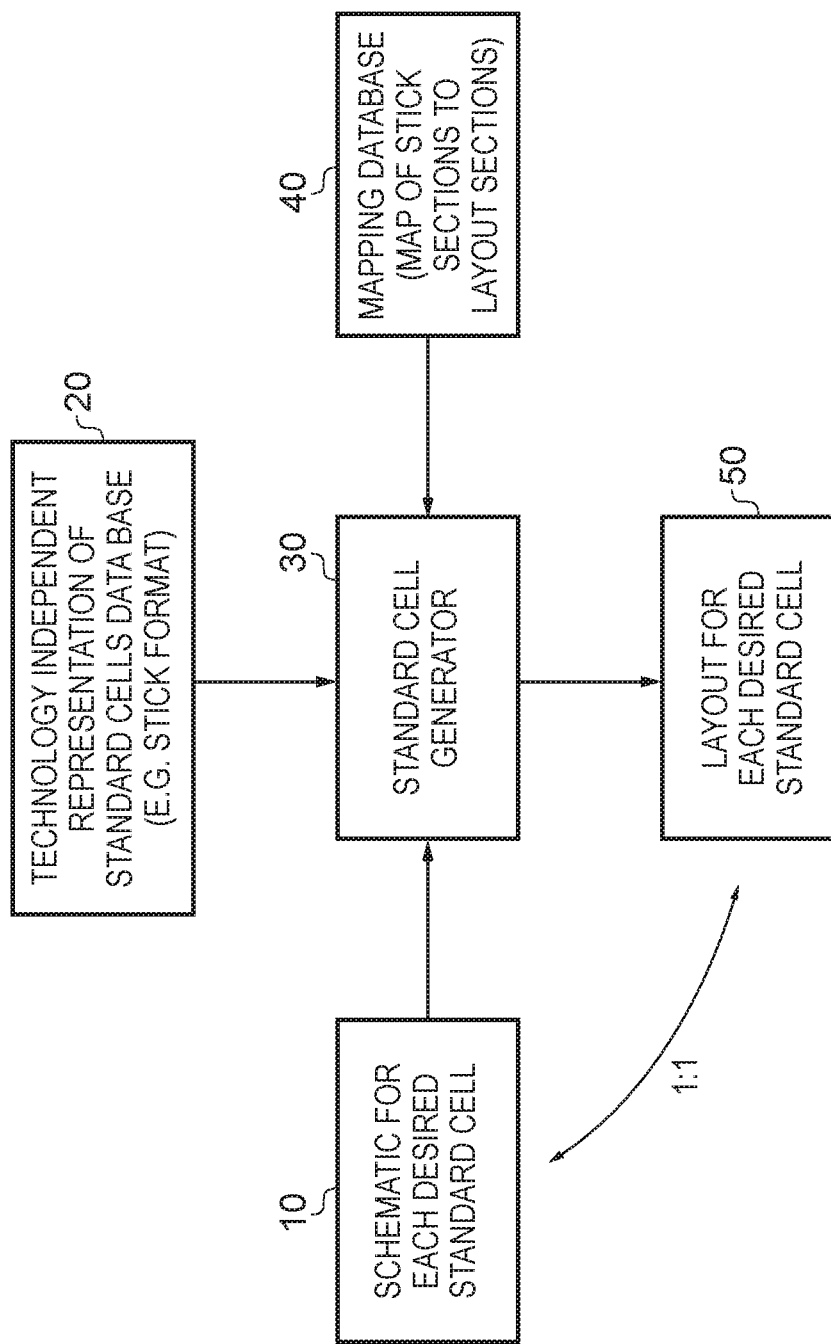
FIG. 1 is a block diagram schematically illustrating a system in accordance with one embodiment.

Before discussing the embodiments with reference to the accompanying figures, the following description of embodiments is provided. In one example, there is provided a computer implemented method of generating a layout of a cell defining a circuit component, the layout providing a layout pattern for a target process technology, the method comprising: obtaining an archetype layout providing a valid layout pattern for the cell having regard to design rules of the target process technology; receiving an input data file providing a process technology independent schematic of the circuit component for which the cell is to be generated; performing a schematic sizing operation on the input data file, having regard to schematic constraints applicable to the target process technology and layout constraints derived from the archetype layout, in order to generate an output data file providing a process technology dependent schematic of the circuit component; performing a cell generation operation using the output data file and layout data determined from the archetype layout in order to generate the layout of the cell.

In accordance with the above example, a method of generating a layout for a cell is provided that can take account of both schematic constraints and layout constraints. In particular, an archetype layout is used as an input, this providing a valid layout pattern for the cell having regard to design rules of the target process technology. The aim of the archetype layout is to capture the design intent of what the final layout should look like, but will not itself form the layout that is generated by the above method. The archetype layout could be produced in a variety of ways, but in one embodiment may be a user prepared archetype layout to serve as the starting point for generating the layout of the cell.

In accordance with the above method, a process technology independent schematic is also provided, this providing a schematic representation of the circuit component in a process technology independent form.

However, prior to using the schematic in the cell generation operation, a schematic sizing operation is first performed taking into account schematic constraints that are applicable to the target process technology. For example, based on some target process technology specific information, which may for example identify characteristics of certain component elements such as transistors and the like, for instance size restrictions, etc, it is possible to use the process technology independent schematic to identify certain constraints (referred to herein as schematic constraints) that would apply having regard to that target process technology information. For example, the schematic may identify one or more component elements that need to be sized the same.

However, there is only a certain amount of information that can be obtained about the appropriate sizing of component elements from the schematic itself. In accordance with the above example, other constraints (referred to herein as layout constraints) are also derived from the archetype layout. In particular, since the archetype layout is a valid layout pattern for the cell having regard to the design rules of the target process technology, it may be possible by analysis of the archetype layout to identify constraints that would not be derivable from the schematic itself. By using both the schematic constraints and the layout constraints identified in the above manner, the schematic sizing operation then generates an output data file providing a process technology dependent schematic of the circuit component.

The cell generation operation then uses that output data file along with certain data derived from the archetype layout, in order to generate the layout of the cell. In one embodiment, the cell generation operation may receive the archetype layout itself, or alternatively certain information may be derived from the archetype layout, such as mapping entries that will be discussed in more detail later, with that information then being used along with the output data file to generate the cell layout.

The above approach provides a significantly improved mechanism for generating the layout of cells, due to its ability to co-optimize both schematic and layout having regard to the process technology, through the consideration of both schematic constraints and layout constraints when producing the process technology dependent schematic to be used by the cell generation operation.

The schematic sizing operation can take a variety of forms but in one embodiment comprises: evaluating the source schematic having regard to specified requirements for the target process technology in order to determine schematic constraints on component elements of the cell used to implement the circuit component defined by the cell; evaluating the archetype layout in order to determine any layout constraints on said component elements that are dictated by the layout; and generating the process technology dependent schematic taking into account the schematic constraints and the layout constraints.

The component elements considered in the above process can take a variety of forms. In one embodiment, they may be the individual transistors that will be used to form the cell. However, in an alternative embodiment, the component elements can be configured in multiple hierarchical levels, and in such an arrangement the schematic constraints and the layout constraints may be associated with component elements at more than one hierarchical level. For example, in a complex cell, it may be possible to break the cell down into a number of functional blocks, each consisting of multiple transistors. Schematic constraints and layout constraints may be associated with the individual blocks, as well as being associated with the individual transistors. This provides a great deal of flexibility in the sizing operation and the way in which schematic constraints and layout constraints are used when developing the output sized schematic.

The source constraints and layout constraints can take a variety of forms, but in one embodiment identify size constraints on features of the component elements. Hence, considering the example of transistors, these constraints can identify size constraints on transistor features, such as the gate length (i.e. the width of the poly structure) and the transistor width (i.e. the width of the diffusion region).

The size constraints can also identify relative sizing constraints for one or more transistors, and hence for example may provide an indication of multiple transistors that need to have the same size, an indication of a total size for multiple associated transistors (such as a connected pair of PMOS and NMOS transistors) and an indication of minimum and maximum sizes applicable to certain transistors. These minimum and maximum sizes may be dictated by the process technology involved, but in addition may take into account user specified requirements for the cell whose layout is being produced, such as power consumption requirements that may dictate the minimum and maximum sizes of the transistors.

The archetype layout can take a variety of forms, but in one embodiment is constructed so as to enable the largest number of layout constraints to be derived from the archetype layout. In particular, in one embodiment, the archetype layout is configured such that sizes of transistors defined by the archetype layout are maximised having regards to constraints dictated by the design rules.

In one embodiment, the method further comprises the steps of obtaining a process technology independent layout representation associated with the circuit component, the process technology independent layout representation being defined within a grid array providing a plurality of grid locations; and during the cell generation operation, using the process technology independent layout representation in combination with the output data file and the layout data determined from the archetype layout in order to generate the layout of the cell.

The process technology independent layout representation can take a variety of forms, but in one embodiment takes the form of the so-called "stick" format of representation, also referred to as a stick diagram. A stick diagram provides a line drawn representation of the layout pattern within various layers, and includes connection points identifying where connections need to be made between layers. Such a stick diagram has no dimensions specified, and instead the stick diagram is reproduced within a grid array, with the line patterns being produced along the edges of the grids within the grid array, and with the connection points being constrained to be positioned at grid locations within the grid array. As a result, the stick diagram is entirely process technology independent.

In one embodiment, the technology independent layout representation may be generated with reference to the archetype layout.

There are a number of ways in which this can be done, and in one embodiment this is done by analysing a number of archetype layouts in order to populate a first database of process technology independent layout representations. In particular, in one embodiment, the method further comprises a step of populating a first database of process technology independent layout representations by: receiving an input archetype layout of a particular cell, providing a valid layout pattern for generating within the target process technology the circuit component defined by that particular cell; superimposing said grid array on that input archetype layout; identifying a plurality of regular-shaped sections forming the input archetype layout; transforming those regular-shaped sections into segments snapped to the grid array in order to generate a process technology independent layout representation associated with the circuit component defined by the particular cell; and storing the generated process technology independent layout representation in the first database. Such an approach enables the first database to be populated with process technology independent layout representations (for example stick diagrams) that can then be used as inputs to the earlier described process for generating cells.

For example, a generated process technology independent layout representation stored in the first database may be used as the process technology independent layout representation obtained when generating a layout of a cell whose defined circuit component is of a same type as the circuit component defined by the particular cell having the input archetype layout.

In one embodiment, the step of transforming the regular-shaped sections into segments snapped to the grid array comprises: for pairs of overlapping regular-shaped sections, snapping those pairs to the grid array such that a connection between the overlapping regular-shaped sections of each pair is located at a grid location of the grid array. The regular-shaped sections can take a variety of forms, but in one embodiment are rectangles.

The cell generation operation can take a variety of forms, but in one embodiment takes the form of a compaction mechanism that is able to take account of an unlimited number of competing layout requirements. In particular, in one embodiment the cell generation operation comprises: analysing the archetype layout to create a set of compaction nodes, each compaction node being associated with an edge of a feature in the archetype layout; establishing connection lines between pairs of edges, and for each pair of edges allocating the associated connection lines to the compaction node for each edge in that pair; allocating forces to each connection line; and applying a solving algorithm to manipulate locations of the edges having regard to the forces.

By applying forces to connection lines between pairs of edges, and associating compaction nodes with each of the edges, the solving algorithm is able to take all of these potentially unlimited number of competing layout requirements specified by the forces into account when manipulating locations of the edges of the layout features, hence allowing a starting layout to be converted into a new layout that has been optimized for these various competing layout requirements.

The way in which the archetype layout is analysed at the beginning of the compaction process can vary dependent on embodiment. In one embodiment, the analysing step comprises: identifying each transistor in the archetype layout; associating each identified transistor with a corresponding grid location in the process technology independent layout representation; for each identified transistor creating a first candidate layout pattern whose size is determined from the archetype layout and a second candidate layout pattern whose size is determined from the process technology dependent schematic, and co-locating the first and second candidate layout patterns at the corresponding grid location; and creating compaction nodes for corresponding edges in each of the first and second candidate layout patterns.

By generating different candidate layout patterns for each identified transistor, one derived from the archetype layout and the second derived from the process technology dependent schematic produced by the earlier mentioned schematic sizing operation, it is possible to place some constraints on the sizing of each of the transistors using the earlier mentioned "forces" mechanism. In particular, both candidate layout patterns can be co-located at the corresponding grid location identified from the stick diagram, and compaction nodes can be created for corresponding edges in each of the first and second candidate layout patterns. Thereafter, forces can be established between those corresponding edges which can then solved during the application of the solving algorithm.

In particular, in one embodiment, the step of establishing connecting lines between pairs of edges comprises identifying a plurality of pairs of edges, each pair comprising an edge from the first candidate layout pattern and a corresponding edge from the second candidate layout pattern, and establishing connection lines for each identified pair of edges. The forces allocated to each connection line are then chosen so as to bring the two candidate layout patterns into alignment during the cell generation operation. Hence, during the compaction process, the forces will serve to bring the two versions of the transistor layout into an arrangement in the final layout where they are coincident.

The step of analysing the archetype layout can also involve additional analysis steps, in addition to the above analysis steps performed in relation to the transistors. Indeed, even in situations where the above analysis of the transistors is not performed, some additional analysis steps can also be performed. For example, the step of analysing the archetype layout may comprise analysing layout shapes in the archetype layout to break up the layout shapes into overlapping rectangles, and creating compaction nodes for each edge of each overlapping rectangle.

Accordingly, the layout shapes are analysed in a systematic way to produce a series of overlapping rectangles, and compaction nodes are then established for the edges of those rectangles.

In one embodiment, for the overlapping rectangles formed from each layout shape, the method further determines which connection lines intersect by at least a specified amount, and associates forces with those connection lines such that those connection lines remain connected during the cell generation operation. By such an approach, it can be ensured, through the association of appropriate forces with those connection lines, that those connection lines will continue to remain connected even if they change shape during the cell generation operation. The specified amount by which the connection lines must intersect before such a linking occurs may be user controlled through a process technology file used as an input to the process.

In one embodiment, during the process of breaking up the layout shape into overlapping rectangles, any rectangle whose shorter dimension is less than a predetermined threshold is discarded. This approach, can, for example, be used to prevent slithers smaller than minimum width from forming a connected wire segment, by specifying a minimum width equal to the minimum wire width for that layer.

There are a number of ways of creating the overlapping rectangles but in one embodiment the overlapping rectangles are configured to be the largest possible rectangles having regard to the layout shape.

There are a number of ways in which forces can be applied to the various connection lines established by the above mechanisms. In one embodiment, the method further comprises: applying the design rules to the archetype layout to determine a set of features for which a force could potentially be allocated to a connection line to represent the design rules; apply a filtering operation to reduce the number of features in said set; and applying forces to the connection lines in order to represent the design rules for the remaining features in said set.

By applying the design rules to the various features within the archetype layout there will potentially be a very large number of features identified for which a force could potentially be allocated. However, by applying the above mentioned filtering operation, it is possible to reduce the number of features without the risk of failing the design rule constraints. By using the reduced number of features, it is then possible to provide a more optimal layout solution than may be the case if all of the features had forces allocated to them.

In particular, once the filtering operation has been performed, forces are then applied to the relevant connection lines in order to represent the design rules for the remaining features that have not been filtered out.

In one embodiment, at least one of the forces is specified as a set of breakpoints. Each breakpoint typically specifies a minimum distance between the edges, and various different minimum distances can be indicated using the set of break points, with different priorities being associated with each one.

Further, in one embodiment at least one of the forces is set having regard to a user customised constraint. Hence, the user can enter an additional force in order to create custom requirements. Such a custom force can be between any two arbitrary edges.

The forces can be specified in a variety of ways but in one embodiment each force specifies a desired constraint and a priority identifying a relative strength of that desired constraint.

In such embodiments, the solving algorithm seeks to resolve the conflicting forces having regard to their specified priorities, resulting in edge locations being repositioned.

By the above mechanism, all of the various conflicting priorities are resolved simultaneously, resulting in the placement of edges such that the highest possible priority forces are all resolved, and with as many of the lower priority forces being resolved as possible.

In an alternative embodiment, the above described compaction mechanism is not used, and instead an alternative approach is used to generate the layout of the cell. In particular, in one embodiment the method may further comprise: providing a mapping database having a priority ordered list of mapping entries, each mapping entry storing a process technology independent layout section and an associated layout pattern section for the target process technology; for selected grid locations within the grid array, performing a lookup operation in the mapping database to determine a matching mapping entry, the matching mapping entry being a highest priority mapping entry within the priority ordered list whose process technology independent layout section matches a portion of the process technology independent layout representation at that selected grid location; and generating the layout of the cell by incorporating, at each of the selected grid locations, the layout pattern section for the target process technology stored in the matching mapping entry.

In accordance with this approach, a mapping database is provided having a priority ordered list of mapping entries, each mapping entry storing a process technology independent layout section and an associated layout pattern section for a target process technology. For a particular cell to be produced, an appropriate process technology independent layout representation can then be selected for the circuit component to be represented by the cell. A lookup process is then performed to find matching mapping entries for grid locations within the process technology independent layout representation, with the layout of the cell then being generated by incorporating, at each of those grid locations, the layout pattern section stored in the matching mapping entry.

This provides an efficient, automated, process for generating cells that conform to the design rules of the target process technology. This process can yield significant benefits when applied to emerging process technologies such as 14 nm technology, where the design rules become very complex.

The selected grid locations for which the lookup process is performed can be varied, but in one embodiment the selected grid locations comprise every grid location within the grid array.

In one embodiment, at least one mapping entry within the mapping database identifies at least one grid location to be disabled if that at least one mapping entry is determined to be one of said matching mapping entries, and the layout generating step excludes from incorporation in the layout the layout pattern section stored in the matching mapping entry for any disabled grid location. By such an approach, mapping entries can be included in the mapping database which can specify a relatively large layout section that, once added to the layout, will remove the need for one or more adjacent grid locations to introduce any further layout. To ensure no additional layout patterns are added by those one or adjacent grid locations, then those one or adjacent grid locations can be disabled by the mapping entry that includes the large layout section.

Whilst the mapping entries in the mapping database may be added manually, in one embodiment an automated mechanism is provided for developing the contents of the mapping database, based on the earlier-mentioned input archetype layout and the associated process technology independent layout representation generated from that input archetype layout. In particular, in one embodiment the automated mechanism comprises: providing within the mapping database an initial priority ordered list of mapping entries; receiving a process technology independent layout representation generated from the input archetype layout of the particular cell; for selected grid locations within the grid array, performing a lookup operation in the mapping database to determine a matching mapping entry, the matching mapping entry being a highest priority mapping entry within the priority ordered list whose process technology independent layout section matches a portion of the process technology independent layout representation at that selected grid location; generating a candidate layout of the particular cell by incorporating, at each of the selected grid locations, the layout pattern section for the target process technology stored in the matching mapping entry; comparing the candidate layout with the input archetype layout; and altering the priority ordered list of mapping entries within the mapping database dependent on said comparison. This provides an efficient mechanism for developing a mapping database whose mapping entries include layout sections conforming to the target process technology.

The manner in which the priority ordered list of mapping entries is altered based on a comparison of the candidate layout with the input archetype layout can vary dependent on embodiment. However, in one embodiment, the step of altering the priority ordered list comprises identifying unwanted regular shaped sections, said unwanted regular shaped sections being regular shaped sections within the candidate layout that are not fully incorporated within the layout pattern of the input archetype layout, and then for each unwanted regular shaped section determining the grid location and matching mapping entry that caused the unwanted regular shaped section to be included in the candidate layout. Then, for each unwanted regular shaped section, a new mapping entry is created within the prioritised ordered list that is of a higher priority than the matching mapping entry that caused the unwanted regular shaped section to be included in the candidate layout, that new mapping entry having a process technology independent layout section that is defined such that the new mapping entry will only be a matching mapping entry for the grid location that caused the unwanted regular shaped section to be included in the candidate layout.

Furthermore, in one embodiment, the step of altering the priority ordered list further comprises identifying absent regular shaped sections, said absent regular shaped sections being regular shaped sections within the layout pattern of the input archetype layout that are not fully incorporated within the candidate layout. Then, for each absent regular shaped section, a nearest grid location is identified, and a matching mapping entry is created for that nearest grid location that includes within the associated layout pattern section the absent regular shaped section.

In one embodiment, a layout resizing mechanism is provided to enable an archetype layout of a cell to be converted into a new archetype layout conforming to a different cell architecture. In one embodiment, the archetype layout that is input to the above described process for generating the layout of a cell may be an archetype layout that has been generated by such a process.

In particular, in one embodiment, the archetype layout that is input to the cell generation method is generated by performing the steps of: inputting an existing archetype layout for the cell conforming to a first cell architecture; obtaining cell dimension data for a second cell architecture; performing a layout resizing operation on the existing archetype layout to generate a new archetype layout conforming to the second cell architecture; employing the new archetype layout as the obtained archetype layout.

The cell dimension data can take a variety of forms but in one embodiment comprises: at least one of a desired cell height and desired transistor pitch indication data for the second cell architecture. The desired transistor pitch indication data can specify the transistor pitch in a number of ways, for example in terms of spacing between polysilicon tracks, and/or the gate length of those polysilicon tracks. In accordance with the technique described above, the cell dimension data can be specified for any desired situation. In one particular example, by suitable specification of the cell dimension data, it can be arranged that a predetermined multiple of standard cell rows for the second cell architecture has a height matching the width of a memory array custom tile. In particular, in one embodiment discussed later herein, memory instances are constructed from memory tiles, but rather than having to custom design all of the memory tiles, some of the tiles are constructed at least partly using standard cells. By enabling the cells to be resized using the above technique, it is possible to generate a cell library containing cells that are sized so that a number of standard cell rows can be populated with those cells within a tile, whilst ensuring that tile has a width that will match with a fully custom tile, such as a custom tile used to produce the memory array portions of the memory device containing the bit cells.

There are a number of ways in which the resizing operation can be performed, but in one embodiment the resizing operation is performed with respect to at least one identified cut line. In one embodiment, the cut lines can run horizontally through the cell, to enable the cell to be stretched, or indeed shrunk, in the height dimension, or they can run vertically through the cell to enable the cell to be stretched, or shrunk, in the width dimension.

In one embodiment, each cut line has a resizing amount specified in association therewith to identify an extent of resizing required at that cut line.

In one particular embodiment, the resizing operation is a stretching operation and the resizing amount is a stretch amount.

There are a number of ways to perform the stretching operation. In one embodiment, for each cut line, that portion of the existing archetype layout that resides to a predetermined side of that cut line is shifted to create a gap whose size is dependent on the specified stretch amount, and the gap is filled by interconnecting the existing layout at each side of the gap. This approach works well for all flexible layers, for example the metal layers containing routing layout patterns. However, some layers may contain fixed shape layout patterns, for example contacts and via layers. In such situations, it may not be appropriate to stretch the shapes, since this may cause some design rules to be violated. Instead, in one embodiment, for a fixed shape feature in the layout that is intersected by a cut line to a predetermined extent, the entire fixed shape feature is moved by the stretch amount so as to retain the fixed shape. Conversely, if the fixed shape feature is not intersected by a cut line to the predetermined extent, then the entire fixed shape feature stays in its original position when the stretching operation is performed.

In one embodiment, the layout of cell produced by the cell generation operation of the above described method is used as the final cell layout. However, in an alternative embodiment an iterative process can be initiated where the layout of the cell produced by the cell generation operation is analysed having regard to predetermined criteria. If that predetermined criteria indicates that some further modification to the cell layout may be appropriate, then a revised data file providing a modified process technology dependent schematic is created, and that modified process technology dependent schematic is then re-input to the cell generation operation to cause a new cell layout to be produced by rerunning the cell generation operation using that revised data file.

The above described techniques can be used to generate a layout for a variety of types of cell. However, in one embodiment the technique is used to generate the layout of a standard cell.

In one example, there is provided a computer program product on a non-transitory storage medium for controlling a computer to perform the above-described method of generating a layout of a cell defining a circuit component.

In a further example, there is provided a non-transitory storage medium storing a cell library containing one or more cell layouts generated in accordance with the above-described cell layout generation method.

In a further example there is provided a system for generating a layout of a cell defining a circuit component, the layout providing a layout pattern for a target process technology, the system comprising: a first interface configured to receive an archetype layout providing a valid layout pattern for the cell having regard to design rules of the target process technology; a second interface configured to receive an input data file providing a process technology independent schematic of the circuit component for which the cell is to be generated; and processing circuitry configured to perform a schematic sizing operation on the input data file, having regard to schematic constraints applicable to the target process technology and layout constraints derived from the archetype layout, in order to generate an output data file providing a process technology dependent schematic of the circuit component; the processing circuitry further configured to perform a cell generation operation using the output data file and layout data determined from the archetype layout in order to generate the layout of the cell.

In a further example there is provided a system for generating a layout of a cell defining a circuit component, the layout providing a layout pattern for a target process technology, the system comprising: first interface means for obtaining an archetype layout providing a valid layout pattern for the cell having regard to design rules of the target process technology; second interface means for receiving an input data file providing a process technology independent schematic of the circuit component for which the cell is to be generated; sizing means for performing a schematic sizing operation on the input data file, having regard to schematic constraints applicable to the target process technology and layout constraints derived from the archetype layout, in order to generate an output data file providing a process technology dependent schematic of the circuit component; and cell generation means for performing a cell generation operation using the output data file and layout data determined from the archetype layout in order to generate the layout of the cell.

In a further example there is provided a method of manufacturing an integrated circuit comprising: employing the above-described cell layout generation method to generate layouts of a plurality of cells, each cell defining a circuit component; performing a place and route operation to generate, from an input functional definition of the integrated circuit, a layout design incorporating said plurality of cells; and manufacturing the integrated circuit from the layout design.

Additionally, in one embodiment the manufacturing method may further comprise: providing one or more memory instances, each memory instance defining the layout of a memory device; and during the place and route operation, incorporating at least one memory instance into the layout design.

Some of the above-described techniques can be used independently of the other described techniques. For example, irrespective of the cell layout generation operation, the above-described schematic sizing operations and layout resizing operations can be performed independently of the cell layout generation operation.

When designing integrated circuits, it is known to use cells provided in cell libraries in order to instantiate within the design the required circuit components. Each cell library typically contains a plurality of cells, where each cell provides a layout defining a circuit component. Typically, the integrated circuit is designed by using multiple of the cells from the cell library to implement the required functionality of the integrated circuit. For example, considering a standard cell library, the standard cells within the standard cell library define basic circuit components that can be combined to implement at least some of the required functionality of the integrated circuit, typically the standard cells being arranged in a plurality of standard cell rows, so that the standard cells in a particular row abut against each other.

Often the cells will include input/output (I/O) pins within a particular process layer, and pin access connections will need to be made to those I/O pins in order to enable signals to be input to and output from the components defined by those cells during operation of the integrated circuit. Typically such pin access connections need to be established during a place and route process, when the various cells are arranged within the integrated circuit to provide the desired functionality. However, with emerging process technologies, it is becoming more difficult to establish the required pin access connections during the place and route process. When designing the cells for cell libraries, it would accordingly be useful to be able to establish the likelihood that suitable pin access connections will be able to be made to the I/O pins of that cell when the cell is subsequently used in the design of an integrated circuit, since if that is not the case it may be appropriate to redesign the cell prior to inclusion in the cell library so that the layout of the I/O pins for the cell is altered.

In one example, there is provided a computer implemented method of generating an indication of valid pin access layout patterns for a layout of a cell defining a circuit component, the layout defining layout patterns for a number of process layers, including an input/output (I/O) pin layout pattern for a first process layer, the I/O pin layout pattern defining a plurality of I/O pins, and the method comprising: providing in association with a second process layer a plurality of routing tracks extending through the cell, the routing tracks being used for provision of pin access connections defined by a pin access layout pattern; detecting hit points for the cell, where each hit point identifies a segment of a routing track that overlaps one of said I/O pins; determining a plurality of hit point combinations for the cell, each hit point combination identifying a hit point for each of said plurality of I/O pins, and identifying an access direction for provision of an associated pin access connection to each hit point along the associated routing track; and performing a design rule checking operation having regard to a process technology to be used to construct the circuit component defined by the cell, the design rule checking operation being performed in respect of at least a subset of the plurality of hit point combination in order to provide an indication of valid pin access layout patterns.

The above technique hence provides a computer implemented technique for generating an indication of valid pin access layout patterns to be associated with the layout of the cell. The more valid pin access layout patterns that can be established for a cell, the more confident one can be that during subsequent use of that cell in a particular integrated circuit, the place and route tool will be able to find a suitable pin access layout pattern for connecting to the various I/O pins of the cell, taking account of the surrounding cells within the integrated circuit.

There are a number of ways in which the design rule checking operation can be performed in respect of at least a subset of the plurality of hit point combinations in order to provide an indication of valid pin access layout patterns. For example, the design rule checking operation may be applied directly to those hit point combinations. However, alternatively the design rule checking operation is actually performed on candidate pin access layout patterns derived from those hit point combinations. In particular, in one embodiment the method further comprises generating a candidate pin access layout pattern for each hit point combination in said at least a subset of the plurality of hit point combinations. Then the design rule checking operation is performed on those candidate pin access layout patterns.

In many situations, there may potentially be a large number of hit point combinations that can be determined for the cell having regards to the detected hit points, but it is often the case that certain hit points will never in practice be suitable for establishing connections to the I/O pins, due to surrounding layout within the cell. In one embodiment, a filtering operation is performed in order to discard any hit point combinations that include such a hit point. In particular, in one embodiment the method further comprises applying a filtering operation to discard any hit point combinations that do not meet predetermined validity criteria. Then, candidate pin access layout patterns are only generated for each hit point combination remaining after that filtering operation has been performed.

The predetermined validity criteria can be established in a variety of ways but in one embodiment the predetermined validity criteria are established using heuristics.

In one embodiment, the design rule checking operation is performed for each candidate pin access layout pattern in order to produce a set of pin access layout patterns containing those candidate pin access layout patterns that pass the design rule checking operation.

Whilst the set of pin access layout patterns produced may merely be used by the designer of the cell layout to provide an indication of the likelihood of a valid pin access layout pattern being found during subsequent place and route operations using that cell, the set of pin access layout patterns (or information derived therefrom) can also be used for other purposes. For example, in one embodiment, the set of pin access layout patterns may be output in association with the cell, for later reference by tools using that cell during the design of an integrated circuit. For example, the place and route tool may be able to refer to the set of pin access layout patterns with the aim of choosing one of the pin access layout patterns for use in association with the cell.

In one particular embodiment, the cell is a cell of a cell library and information derived from the set of pin access layout patterns is stored within the cell library in association with the cell. Hence, in such embodiments, information derived from the set of pin access layout patterns is directly available within the cell library. This information may in practice be the set of pin access layout patterns themselves, or alternatively may be some other information derived therefrom, for example an indication of invalid pin access layout patterns.

Whilst the design rule checking operation may in one embodiment merely identify which candidate pin access layout patterns are valid and which are not, it can in one embodiment be altered so as to seek to convert a number of otherwise invalid candidate pin access layout patterns into valid ones, thereby seeking to increase the overall number of valid pin access layout patterns identified.

In particular, in one embodiment the design rule checking operation comprises: converting the design rules for the process technology into a series of linear constraints; establishing a function to be solved; for each candidate pin access layout pattern, seeking to solve said function having regard to the series of linear constraints; and producing the set of pin access layout patterns to contain those candidate pin access layout patterns for which said function is solved.

For one or more of the candidate pin access layout patterns, the step of seeking to solve said function may cause a modification to at least one layout portion in the candidate pin access layout pattern, in order to convert what would otherwise be an invalid pin access layout pattern into a valid one.

The layout portion modified by such a process may comprise one or more pin access connections. Alternatively, or in addition, it may comprise a cell connection not used as a pin access connection, but provided for example in the same process layer as the pin access connections.

The modification made to a layout portion during the above process can take a variety of forms but in one embodiment comprises adjusting an end position of the layout portion in order to satisfy one of the design rules.

The function to be solved during the above process can take a variety of forms but in one embodiment is a function that seeks to minimise modifications to layout portions in a candidate pin access layout pattern that are required in order to satisfy the series of linear constraints.

For some process technologies at least some of the design rules may identify constraints which are not linear, an example being the "Self Aligned Double Patterning" (SADP) process technology. Nevertheless, in accordance with one embodiment such design rules are still converted into a series of linear constraints during the above-described design rule checking process.

Whilst each candidate pin access layout pattern may specify a layout pattern for just a single process layer, for example the earlier-mentioned second process layer, in one embodiment each candidate pin access layout pattern specifies a layout pattern for more than one process layer, including said second process layer.

In one particular embodiment, said more than one process layer includes a via connection process layer in addition to the second process layer, the via connection process layer being used to establish via connections between the pin access connections in the second process layer and the I/O pins in the first process layer.

In one embodiment, the earlier described step of detecting hit points comprises detecting all hit points that exist for the cell. This maximises the hit points available when determining the plurality of hit point combinations, hence potentially increasing the number of valid pin access layout patterns identified for the cell.

The cell subjected to the above process may take a variety of forms, but in one embodiment is a standard cell for inclusion in a standard cell library.

The first and second process layers may vary dependent in different embodiments but in one embodiment the first process layer is a metal 1 layer and the second process layer is a metal 2 layer.

The plurality of routing tracks can take a variety of forms, but in one embodiment they are provided in parallel extending in one direction through the cell. Hence, for example, the plurality of routing tracks may extend in parallel across the width of the cell, or alternatively the plurality of routing tracks may extend in parallel along the height dimension of the cell.

In an alternative embodiments, the plurality of routing tracks form an array of routing tracks extending in two perpendicular directions through the cell. In such an arrangement, each hit point identifies where two crossing routing tracks overlap one of the I/O pins.

In addition to determining valid pin access layout patterns, the method can also be extended to perform at least one additional layout check operation to determine whether the layout conforms to predetermined layout guidelines specified having regards to a target process technology, and to output log data to indicate if any layout guidelines are being violated. The layout guidelines can take a variety of forms but in one embodiment may identify one or more restrictions on layout geometry in peripheral regions of the cell. In particular, the layout guidelines can take into account the various other cells that may abut against the cell under consideration when the cells are used to construct an integrated circuit, and hence check that the proposed layout geometry for the cell will not cause any problems when that cell is abutted against other cells in the cell library.

For example, it may be that there are certain regions in the periphery of the cell where no layout geometry should be present, and other regions where it may be required that at least one layout geometry is present. There may also be certain regions where it is optional whether layout geometry is present, but if it is present it must be constrained to be entirely within that region.

In another example there is provided a non-transitory storage medium storing a cell library including a plurality of cell layouts, for at least one cell layout the cell library including information derived from a set of pin access layout patterns generated using the above-described methods.

In a yet further example there is provided a system for generating an indication of valid pin access layout patterns for a layout of a cell defining a circuit component, the layout defining layout patterns for a number of process layers, including an input/output (I/O) pin layout pattern for a first process layer, the I/O pin layout pattern defining a plurality of I/O pins, and the system comprising: routing track placement circuitry configured to provide in association with a second process layer a plurality of routing tracks extending through the cell, the routing tracks being used for provision of pin access connections defined by a pin access layout pattern; hit point detection circuitry configured to detect hit points for the cell, where each hit point identifies a segment of a routing track that overlaps one of said I/O pins; hit point combination circuitry configured to determine a plurality of hit point combinations for the cell, each hit point combination identifying a hit point for each of said plurality of I/O pins, and identifying an access direction for provision of an associated pin access connection to each hit point along the associated routing track; and processing circuitry configured to perform a design rule checking operation having regard to a process technology to be used to construct the circuit component defined by the cell, the design rule checking operation being performed in respect of at least a subset of the plurality of hit point combination in order to provide an indication of valid pin access layout patterns.

In another example there is provided a system for generating an indication of valid pin access layout patterns for a layout of a cell defining a circuit component, the layout defining layout patterns for a number of process layers, including an input/output (I/O) pin layout pattern for a first process layer, the I/O pin layout pattern defining a plurality of I/O pins, and the method comprising: routing track means for providing in association with a second process layer a plurality of routing tracks extending through the cell, the routing tracks being used for provision of pin access connections defined by a pin access layout pattern; hit point detection means for detecting hit points for the cell, where each hit point identifies a segment of a routing track that overlaps one of said I/O pins; hit point combination analysis means for determining a plurality of hit point combinations for the cell, each hit point combination identifying a hit point for each of said plurality of I/O pins, and identifying an access direction for provision of an associated pin access connection to each hit point along the associated routing track; and processing means for performing a design rule checking operation having regard to a process technology to be used to construct the circuit component defined by the cell, the design rule checking operation being performed in respect of at least a subset of the plurality of hit point combination in order to provide an indication of valid pin access layout patterns.

Some of the above described techniques can be used independently of the other described techniques. For example, the above-described additional layout check operation could be performed even in situations where the checking process for valid pin access layout patterns was not performed.

In the field of memory device design, it is known to generate a memory instance defining the layout of a memory device with reference to a plurality of tiles used to define component sections for the memory device. These tiles include not only tiles used to define the individual memory arrays contained within the memory device, but also tiles used to define the associated control and access circuits used to operate the memory device. Each of the memory arrays will be formed from an array of storage elements, also referred to as bit cells, with the dimensions of the bit cell being defined by the foundry developing those bit cells. As a result, a particular size memory array title will have a width that is determined by the bit cells used.

Typically, each of the tiles is custom designed having regards to the bit cells used (and hence the width of the memory array portion represented by the tile), in order to ensure that the various tiles can be aligned when generating a memory instance. However, the process of custom designing every tile significantly increases the design time, and as layout design rules become more complicated in smaller process technologies, it is becoming increasingly expensive to produce fully custom layouts for memory devices.

In one example there is provided a method of generating a memory instance defining the layout of a memory device, comprising: providing a tile database comprising a plurality of tiles defining component sections for the memory device, the tile database including a memory array custom tile defining an array of storage elements and having a specified memory array width, and an associated standard cell based tile defining a component section where at least part of the standard cell based tile comprises standard cells arranged in a plurality of standard cell rows to define components of the component section, the plurality of standard cell rows being configured so as to match a width of the memory array custom tile; receiving input parameters for the memory instance to be generated; and constructing the memory instance from multiple tiles selected from the tile database in accordance with the input parameters, said multiple tiles including said memory array custom tile and said associated standard cell based tile.

In accordance with the above example, the tile database includes an associated standard cell based tile where at least part of that tile is formed using standard cells arranged in a plurality of standard cell rows, with the plurality of standard cell rows configured to align with the width of the memory array custom tile. The use of standard cells in such a manner can significantly reduce the design time, while still ensuring correct alignment of the tiles having regards to the bit cell width.

There are a number of ways in which the plurality of standard cell rows may be configured so as to match a width of the memory array custom tile. For example, in one embodiment the standard cell row pitch of each standard cell row may be such that the total pitch formed by the plurality of standard cell rows is slightly less than the width of the memory array custom tile. In such a situation, a gap row can be introduced between two adjacent standard cell rows in order to pad out the overall pitch of the standard cell based tile to match the width of the memory array custom tile.

Alternatively, in one embodiment, the method further comprises performing a tile generation process to generate a standard cell based tile for inclusion in the tile database, using standard cells from a plurality of standard cell libraries, the plurality of standard cell libraries including at least a first standard cell library and a second standard cell library, the second standard cell library providing standard cells with a different standard cell row pitch to the standard cells provided by the first standard cell library.

In particular, in one embodiment, the tile generation process comprises configuring the plurality of standard cell rows of the standard cell based tile so that at least one standard cell row has the standard cell row pitch of the first standard cell library and at least one standard cell row has the standard cell row pitch of the second standard cell library, such that the pitch of the standard cell based tile matches the width of an associated memory array custom tile. Hence, different standard cell rows have different standard cell pitches within the same standard cell based tile, with standard cells from the appropriate standard cell libraries being used to populate those standard cell rows. This provides an efficient mechanism for aligning the pitch of the standard cell based tile with the width of the memory array custom tile.

In one embodiment, a standard cell library generation process may be used to generate a new standard cell library from an existing standard cell library, the standard cell library generation process comprising: selecting a memory array custom tile from the tile database; determining a standard cell row pitch for the new standard cell library such that the specified memory array width of the selected memory array custom tile is an integer multiple of the determined standard cell row pitch; and performing a modification operation on the standard cells of the existing standard cell library to produce equivalent standard cells aligned with the determined standard cell row pitch, and populating the new standard cell library with the produced equivalent standard cells.

The modification operation can take a variety of forms, but in one embodiment the existing standard cell library has a standard cell row pitch less than the determined standard cell row pitch for the new standard cell library, and the modification operation comprises a stretch operation performed on the standard cells of the existing standard cell library.

By such an approach, it is possible to generate new standard cell libraries where the standard cell row pitch is specifically chosen so as to facilitate generating standard cell based tiles whose pitch matches the width of the associated memory array tiles. In particular, a tile generation process can then be used to generate a standard cell based tile for inclusion in the tile database in association with the selected memory array custom tile, by providing said integer multiple of standard cell rows within the standard cell based tile, and populating those standard cell rows with standard cells selected from the new standard cell library.

In one embodiment, during the process of generating the memory instance, a feedback mechanism can be used to initiate the generation of additional standard cell based tiles as and when deemed appropriate. For example, in one embodiment, the step of generating said memory instance may include performing an analysis operation based on the current tiles provided by the tile database, and dependent on that analysis generating a feedback control signal to cause a tile generation process to be initiated to generate at least one additional standard cell based tile for inclusion in said tile database, whereafter the memory instance can be generated so as to include said at least one additional standard cell based tile.

The tile generation process initiated by such a feedback mechanism may produce a new standard cell based tile including a plurality of standard cell rows of mixed standard cell row pitch, or may produce a new standard cell based tile based on a newly generated standard cell library who standard cell row pitch has been specifically chosen having regard to the memory array width. In this latter case, the feedback control signal may itself cause the generation of that new standard cell library, and then subsequently the generation of at least one additional standard cell based tile using that new standard cell library.

The analysis operation can take a variety of forms, but in one embodiment the step of performing an analysis operation based on the current tiles provided by the tile database comprises generating a candidate memory instance using the current tiles provided by the tile database and analysing the candidate memory instance having regard to predetermined criteria in order to determine whether to issue said feedback control signal. By such an approach, it is possible to run through multiple iterations of generating a memory instance before settling on a final memory instance design. Due to the standard cell based approach described above, these iterations can be performed relatively quickly, hence making such an iterative approach a very practical way of developing an optimum memory instance design.

In some instances, for example when generating a tile to represent the control circuitry of the memory device, it is necessary for multiple power domains to be defined within the tile. In one such embodiment, this is achieved by providing within a standard cell library gap standard cells that are used to provide power domain boundaries between standard cells within a standard cell row of the standard cell based tile. By such an approach, it is not necessary to completely separate the areas within the tile used for each power domain, and instead the various standard cells required to implement the components required for the tile can be placed within the standard cell rows so as to achieve optimum device density.

The gap standard cells can take a variety of forms, but in one embodiment provide a break in at least one of a supply voltage line and a reference voltage line extending along a standard cell row. Alternatively, or in addition, they may provide a break in at least one of an nwell voltage line and a pwell voltage line extending along a standard cell row.

In one embodiment, during the performance of the tile generation process to generate the standard cell based tile for control circuitry of the memory device, standard cells are used from a standard cell library whose standard cell row pitch provides an optimum device density having regard to the components to be provided within the control circuitry.

When using the above described approach, where some of the tiles used to construct a memory instance are standard cell based tiles, it is possible that situations will arise where the standard cells within one or more of the standard cell libraries are altered, which will then have a knock-on effect to the layout of those standard cells within the standard cell based tiles. Example situations where the layout of individual standard cells may change is an Engineering Change Order (ECO) event or a process technology migration to a new process technology.

In accordance with one embodiment, an automated mechanism is provided to enable the layout of the standard cells within the standard cell rows of a standard cell based tile to be modified in order to accommodate such changes in individual standard cell layouts.

In particular, in one embodiment, the method further comprises performing a tile modification operation on a standard cell based tile to take account of a change in layout of at least one of the standard cells included in the plurality of standard cell rows of the standard cell based tile.

The tile modification operation can take a variety of forms, but in one embodiment comprises performing a relative placement algorithm to adjust the placement of one or more standard cells within at least one standard cell row so as to remove any overlap resulting from the change in layout. In particular, in one embodiment the relative placement algorithm is designed so as to ensure that the fewest number of standard cells have to be moved to accommodate the standard cell changes, hence reducing the rewiring overhead required to maintain the required connectivity between the cells.

In one embodiment, the performing of the relative placement algorithm comprises: determining the total width of each standard cell row having regard to said change in layout of at least one of the standard cells, in order to set, as a new standard cell row width for the tile, the total width of the longest standard cell row; and determining new coordinate locations for each standard cell having regard to the new standard cell row width.

Then, in one embodiment, the method further comprises, for each standard cell row, if the total width of the standard cells in that standard cell row matches the new standard cell row width for the tile, adjusting the placement of each standard cell so that all the standard cells in the row are placed side by side in an abutting arrangement. Conversely, if the total width of the standard cells in that standard cell row is less than the new standard cell row width for the tile, the method instead comprises determining if there are an overlapping standard cells, and for any overlapping cells, determining a minimum number of standard cells in the standard cell row that need to be moved to remove the overlap, and adjusting the placement of that minimum number of standard cells accordingly.

In accordance with another example there is provided a memory compiler for performing the above-described memory instance generation method.

In accordance with a further example there is provided an integrated circuit comprising a memory device produced from a memory instance generated by performing the above-described memory instance generation method.

Other examples include a non-transitory storage medium storing a tile database containing one or more standard cell based tiles generated in accordance with the above described techniques and a non-transitory storage medium storing a standard cell library generated in accordance with the above described techniques.

In another example there is provided a system for generating a memory instance defining the layout of a memory device, comprising: a tile database comprising a plurality of tiles defining component sections for the memory device, the tile database including a memory array custom tile defining an array of storage elements and having a specified memory array width, and an associated standard cell based tile defining a component section where at least part of the standard cell based tile comprises standard cells arranged in a plurality of standard cell rows to define components of the component section, the plurality of standard cell rows being configured so as to match a width of the memory array custom tile; an interface configured to receive input parameters for the memory instance to be generated; and processing circuitry configured to construct the memory instance from multiple tiles selected from the tile database in accordance with the input parameters, said multiple tiles including said memory array custom tile and said associated standard cell based tile.

In another example there is provided a system for generating a memory instance defining the layout of a memory device, comprising: tile database means for providing a plurality of tiles defining component sections for the memory device, the tile database means including a memory array custom tile defining an array of storage elements and having a specified memory array width, and an associated standard cell based tile defining a component section where at least part of the standard cell based tile comprises standard cells arranged in a plurality of standard cell rows to define components of the component section, the plurality of standard cell rows being configured so as to match a width of the memory array custom tile; interface means for receiving input parameters for the memory instance to be generated; and processing means for constructing the memory instance from multiple tiles selected from the tile database in accordance with the input parameters, said multiple tiles including said memory array custom tile and said associated standard cell based tile.

Some of the above described techniques can be used independently of the other described techniques. For example, the above-described tile generation process, standard cell library generation process and/or tile modification operation could be performed independently of the process of generating an actual memory instance.

Particular embodiments will now be described with reference to the figures.

For the purpose of describing the following embodiments, the generation of standard cells will be considered, but the same techniques can also be applied to the generation of other types of cells, for example datapath cells, custom cells, cells representing portions of a memory device, etc.

FIG. 1 is a block diagram schematically illustrating a system in accordance with one embodiment. A standard cell generator tool 30 is provided, which in one embodiment may take the form of a software tool executing on a computer. The standard cell generator 30 is arranged to receive a schematic for each desired standard cell to be generated. The schematic can take a variety of forms, but in one embodiment is a data file providing a logical representation of the circuit component for which a standard cell is to be produced. For example, such a schematic may identify a number of interconnected transistors (and possibly capacitors, resistors, etc.) with associated properties (width, length, threshold voltage, etc.) sufficient to characterize the electrical behavior of the circuit.

Based on a received schematic 10, the standard cell generator 30 will then perform a lookup operation within the database 20 in order to locate a technology independent representation of the standard cell to be generated. The technology independent representation can take a variety of forms, but one known representation is the so-called "stick" format of representation, also referred to as a stick diagram. A stick diagram provides a line drawn representation of the layout pattern within various layers, and includes connection points identifying where connections need to be made between layers. Such a stick diagram has no dimensions specified, and instead the stick diagram is reproduced within a grid array, with the line patterns being produced along the edges of the grids within the grid array, and with the connection points being constrained to be positioned at grid locations within the grid array. As a result, the stick diagram is entirely process technology independent.

Typically, different stick diagrams will be produced for different types of circuit components, and accordingly a stick diagram may be provided within the database for a NAND gate, a separate stick diagram for an OR gate, a separate stick diagram for a flop, etc. There is no requirement for there only to be a single stick diagram for a particular type of circuit component, and hence different stick diagrams may be produced for some different variants of a particular circuit component type, i.e. a separate stick diagram for a high drive strength NAND gate, and a separate stick diagram for a low drive strength NAND gate.

In the past, such stick diagrams have been used as inputs to compactor tools, which based on the design rules for a particular process technology, follow a sequence of steps in order to seek to generate a solution, where the solution represents a layout conforming to the design rules. However, in the emerging process technologies, such as 14 nm technology and beyond, the compactor approach no longer is able to reliably generate a solution given the complex design rules associated with such process technologies, and accordingly can no longer be used to reliably generate layouts.

Instead, in accordance with the technique described in FIG. 1, the standard cell generator tool 30 has access to a mapping database 40, the mapping database having a plurality of mapping entries, where each mapping entry stores a process technology independence layout section and an associated layout pattern section for the target process technology. Assuming stick diagrams are used within the database 20, the mapping database entries will hence store a stick format section and an associated layout pattern section. The plurality of mapping entries in the database are arranged as a priority ordered list of mapping entries. For selected grid locations within the grid array, the standard cell generator tool 30 performs a lookup operation in the mapping database 40 to seek to locate a highest priority mapping entry within the priority ordered list whose stick section matches, at that selected grid location, a portion of the stick diagram retrieved from the database 20. It is possible that more than one mapping entry may have a stick section that matches a portion of the stick diagram at the selected grid location, but in that event the highest priority mapping entry that matches is selected as the matching mapping entry to be used when generating a standard cell.

Once matching mapping entries have been identified for the grid locations, then the layout of the standard cell is produced by incorporating, at each of those grid locations, the layout pattern section stored in the matching mapping entry. This process will be described in more detail later, but once completed will result in the standard cell generator 30 outputting a layout 50 for each desired standard cell. Hence, for every schematic 10 input to the standard cell generator 30, the standard cell generator can then generate a corresponding layout 50.

Figure 2:
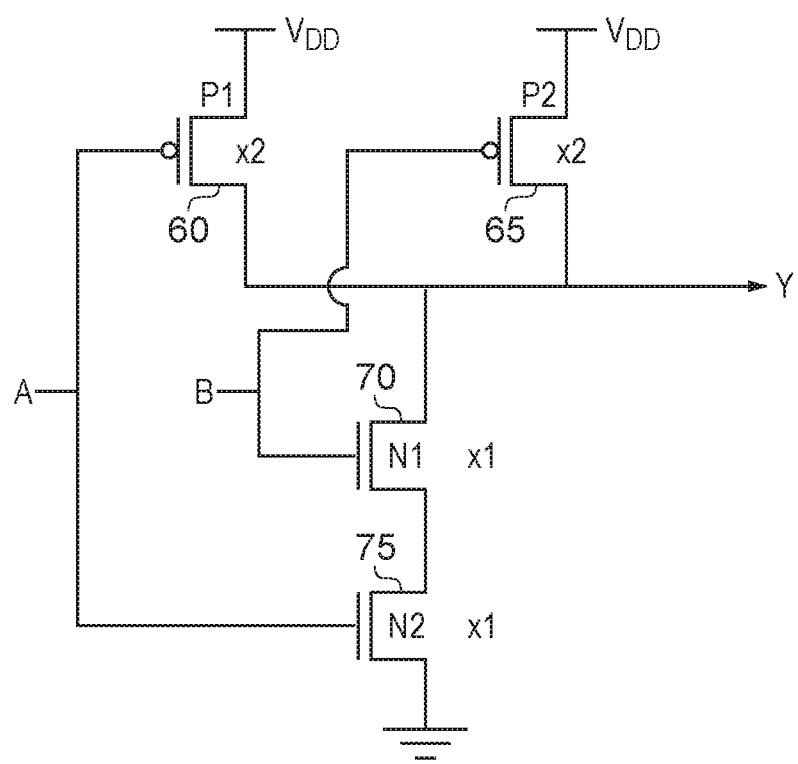
FIG. 2 illustrates an example schematic that may be provided as an input to the standard cell generator of FIG. 1 in accordance with one embodiment.

FIG. 2 provides an example of a schematic 10 that may be input to the standard cell generator 30 of FIG. 1 in accordance with one embodiment. The schematic shown in FIG. 2 is for a NAND gate, and consists of two PMOS transistors 60, 65 placed in parallel between the supply voltage and an output node, along with two NMOS transistors 70, 75 placed in series between the output node and a ground potential. Each of two inputs are provided to one of the PMOS transistors and a corresponding NMOS transistor, as shown in FIG. 2. The representation shown in FIG. 2 will typically be provided as a data file input to the standard cell generator, and will include additional data, such as specifying the drive strengths of the transistors. In this particular example, it is assumed that the PMOS transistors 60, 65 have a drive strength of two and the NMOS transistors 70, 75 have a drive strength of one.

Figure 3:
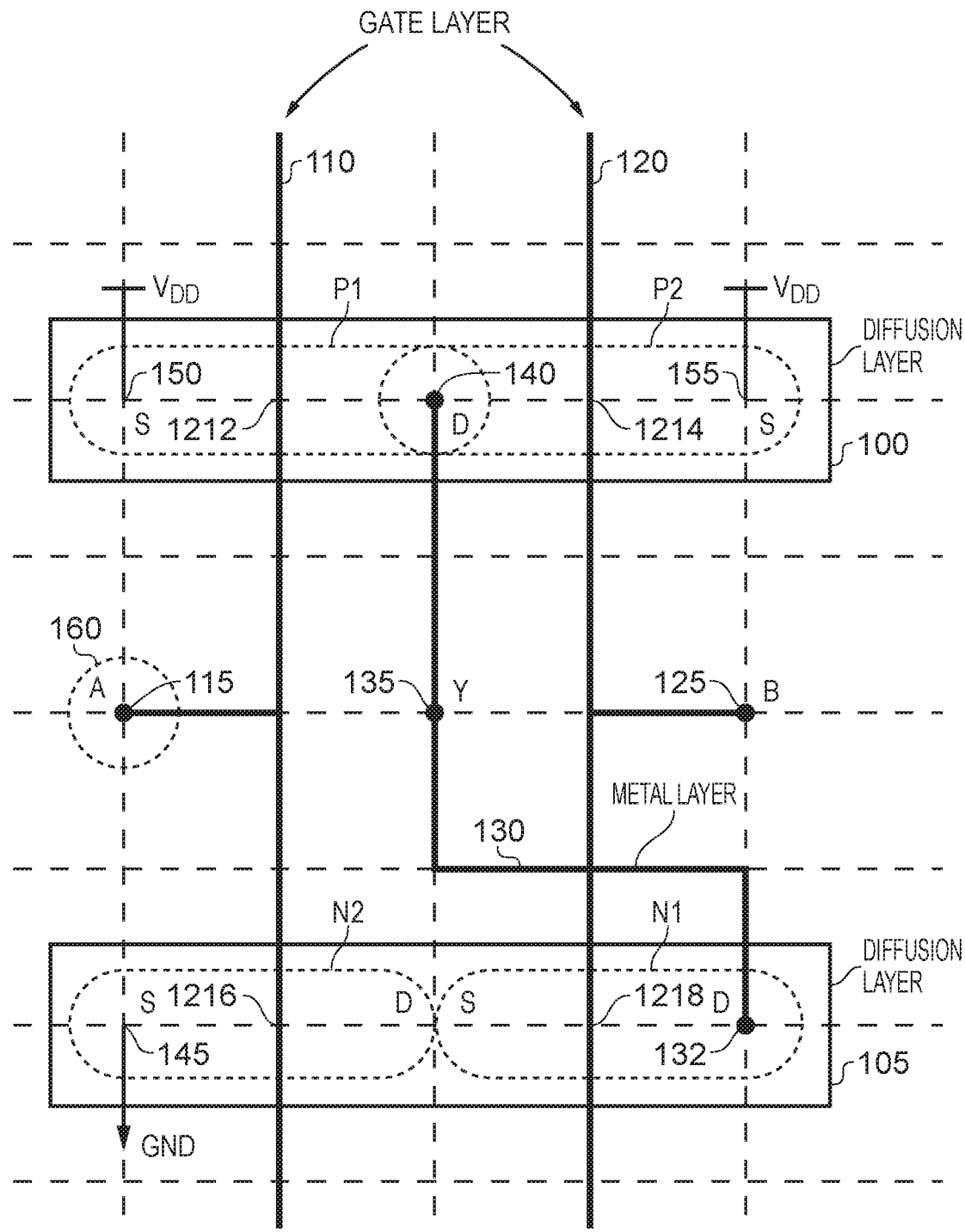
FIG. 3 illustrates an example stick format that may be selected from the stick format database by the standard cell generator of FIG. 1, when seeking to generate a standard cell layout for the schematic of FIG. 2, in accordance with one embodiment.

FIG. 3 illustrates an example stick diagram that may be retrieved from the stick database 20 by the standard cell generator 30 upon receipt of the schematic of FIG. 2. In particular, the stick diagram shown in FIG. 3 is a stick diagram for a NAND gate, and shows three layers, namely a diffusion layer, a gate layer and a metal layer. Two diffusion regions 100, 105 are shown within the diffusion layer, and then two gate lines 110, 120 are shown within the gate layer, one gate line being provided for each PMOS/NMOS transistor pair. A metal line 130 is shown within the metal layer. A connection point 135 is provided in the metal layer, to connect the metal line 130 to the output "Y". In accordance with this stick diagram format, connection point rules dictate that the connection points for the gate lines 110, 120 must be two grid squares away from any other connection point, and accordingly both of the lines 110, 120 representing the gates have a branch line out to corresponding connection points 115, 125, the connection point 115 being a connection point to the first input "A" and the connection point 125 being a connection to the second input "B".

The metal line 130 has two further connection points, namely a connection point 140 connecting the metal line to the common drain of the two PMOS transistors P1 and P2, and a connection point 132 connecting to the drain of the NMOS transistor N1. As shown schematically in FIG. 3 to illustrate context, but not strictly forming part of the stick diagram, the source regions 150 and 155 of the two PMOS transistors P1 and P2 are to be connected to the supply voltage Vdd. Similarly, the source region 145 of the NMOS transistor N2 will be connected to the ground potential.

Typically the stick diagram only illustrates a subset of the layers that are required within the generated standard cell layout. FIG. 4A schematically illustrates a few of the process layers that may be provided within a standard cell layout, and it will be appreciated that FIG. 4A is not intended to show an exhaustive list of all process layers. For example, there will be further layers above the metal 1 layer 220, and there may be more intervening layers between the metal one layer 220 and the gate layer 205 than shown in the schematic illustration of FIG. 4A. As shown in FIG. 4A, a diffusion layer 200 is provided, and this is separated by a thin oxide layer from the gate layer 205. A local interconnect layer (LI) 210 is then provided to enable patterns to be developed above the gate layer. A first via layer (V0) 215 is then provided to enable connections to be made between the local interconnect (LI) layer 210 and the metal 1 layer 220. Beyond the metal 1 layer 220, one or more further via layers may be provided to enable connections to be made between the metal 1 layer and subsequent metal layers, for example a metal 2 layer.

Figure 4B:
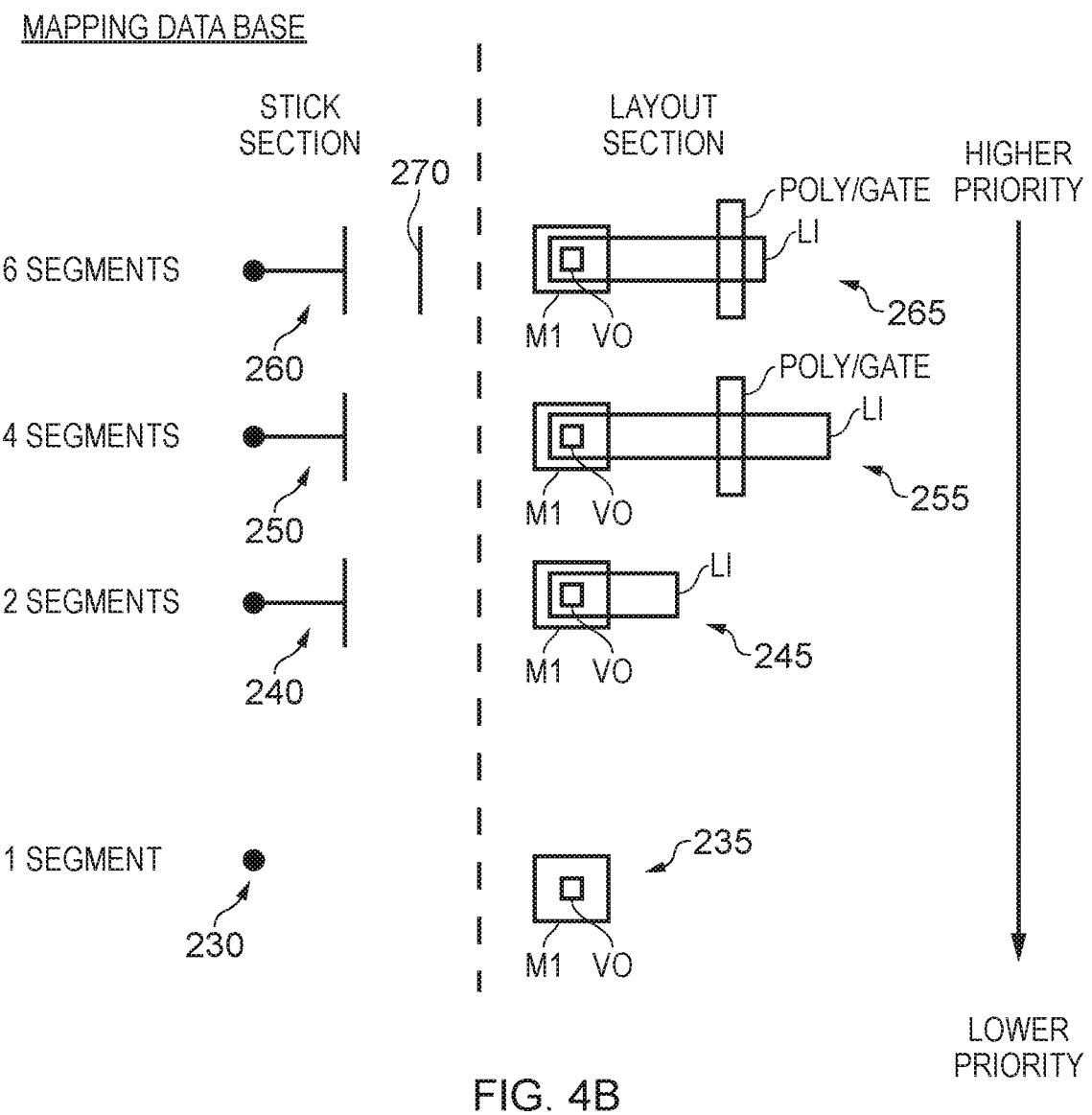
FIG. 4B schematically illustrates a number of mapping entries that may be provided within the mapping database of FIG. 1, in accordance with one embodiment.

FIG. 4B schematically illustrates mapping entries that may be provided within the mapping database 40, with the higher priority mapping entries being those towards the top of the page and the lower priority ones being those towards the bottom of the page. The particular examples illustrated in FIG. 4B are intended to identify mapping entries that might match at the grid location 160 shown in FIG. 3. At the low priority end is a stick section consisting of just a connection point 230 which will generically allow a match to be found in the mapping database for any grid location including a connection point. The corresponding layout pattern 235 may consist of a metal 1 layer square section and a smaller square first via (V0) layer section.

A higher priority entry may consist of a stick section 240 consisting of a connection point and a horizontal line. This will also match at the grid location 160 in FIG. 3, but it will be appreciated that for the particular example of the stick diagram of FIG. 3 there will be no other grid locations where this entry will match. The corresponding layout section 245 has the same metal 1 and V0 layer patterns, but includes a further rectangle at the local interconnect (LI) layer level.

A higher priority mapping entry may contain the stick section 250, which consists of a connection point, a horizontal line, and then both a vertical line above the horizontal line and a vertical line below the horizontal line. Again this will match at the grid location 160. In this example, the corresponding layout section again includes the same metal 1 and V0 layer patterns, but the local interconnect rectangle is extended, and in addition the layout section includes a gate layer pattern (also sometimes referred to as a poly layer pattern).

In the example of FIG. 4B, a further higher priority mapping entry contains a stick section 260 which additionally includes another vertical section 270. The corresponding layout section 265 is essentially the same as the layout section 255 of the lower priority entry, but in this instance the local interconnect rectangle has been trimmed back, to provide spacing with regard to some further layout to be added in relation to another grid location whose matching mapping entry identifies the layout section for the stick component 270.

Accordingly, with reference to this last example, it should be noted that the stick section can be as simple or as complex as desired, and can identify stick features that are themselves not going to have associated layout within the layout section of the entry. This enables the mapping entries in the mapping database to be modified to include high priority mapping entries that can be guaranteed to match at only once specific grid location within a particular stick diagram, this process being discussed in more detail later with reference to FIGS. 10A to 10C.

Figure 5A:
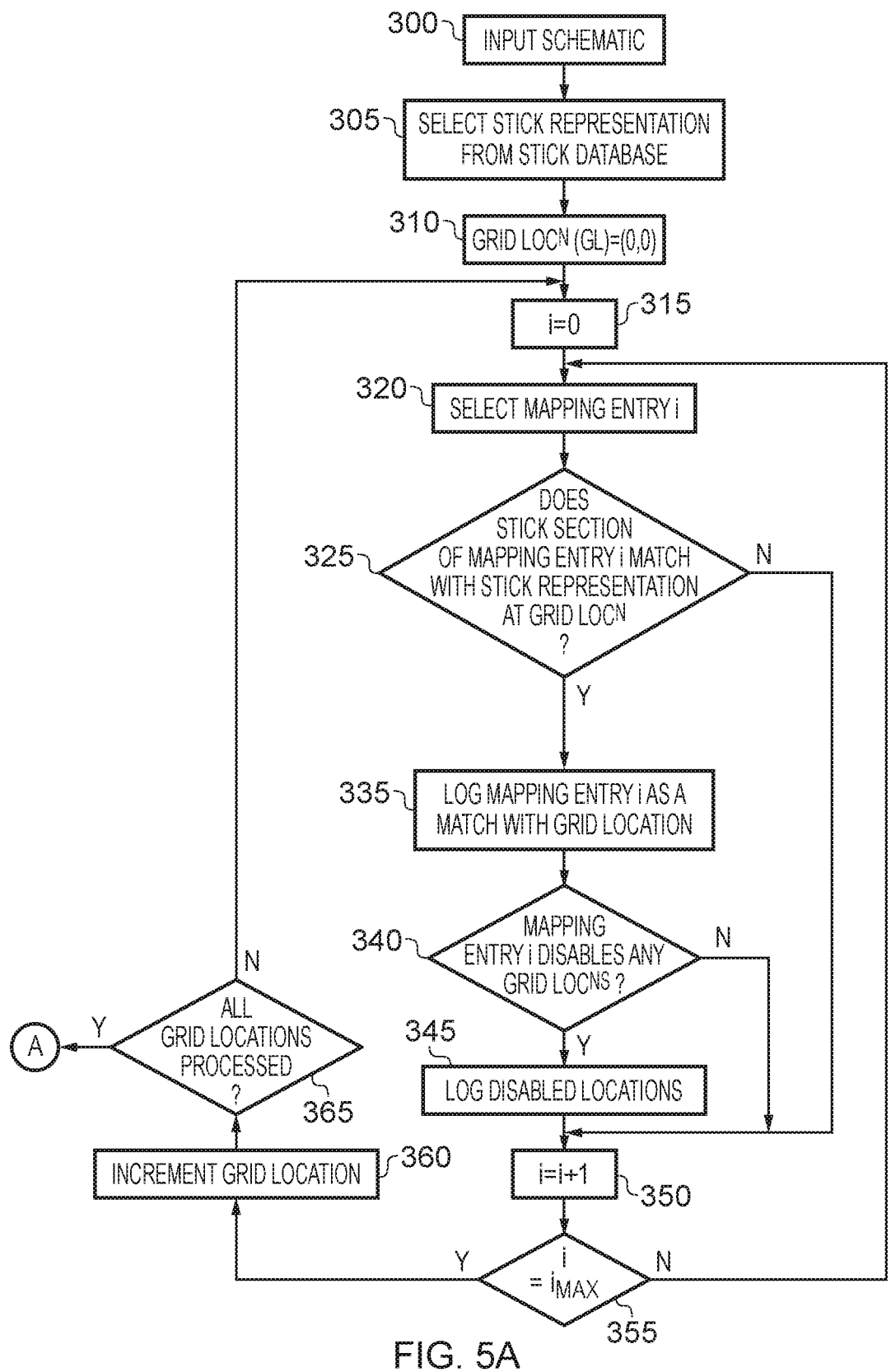
FIGS. 5A and 5B provide a flow diagram illustrating the operation of the system of FIG. 1, in accordance with one embodiment.
Figure 5B:
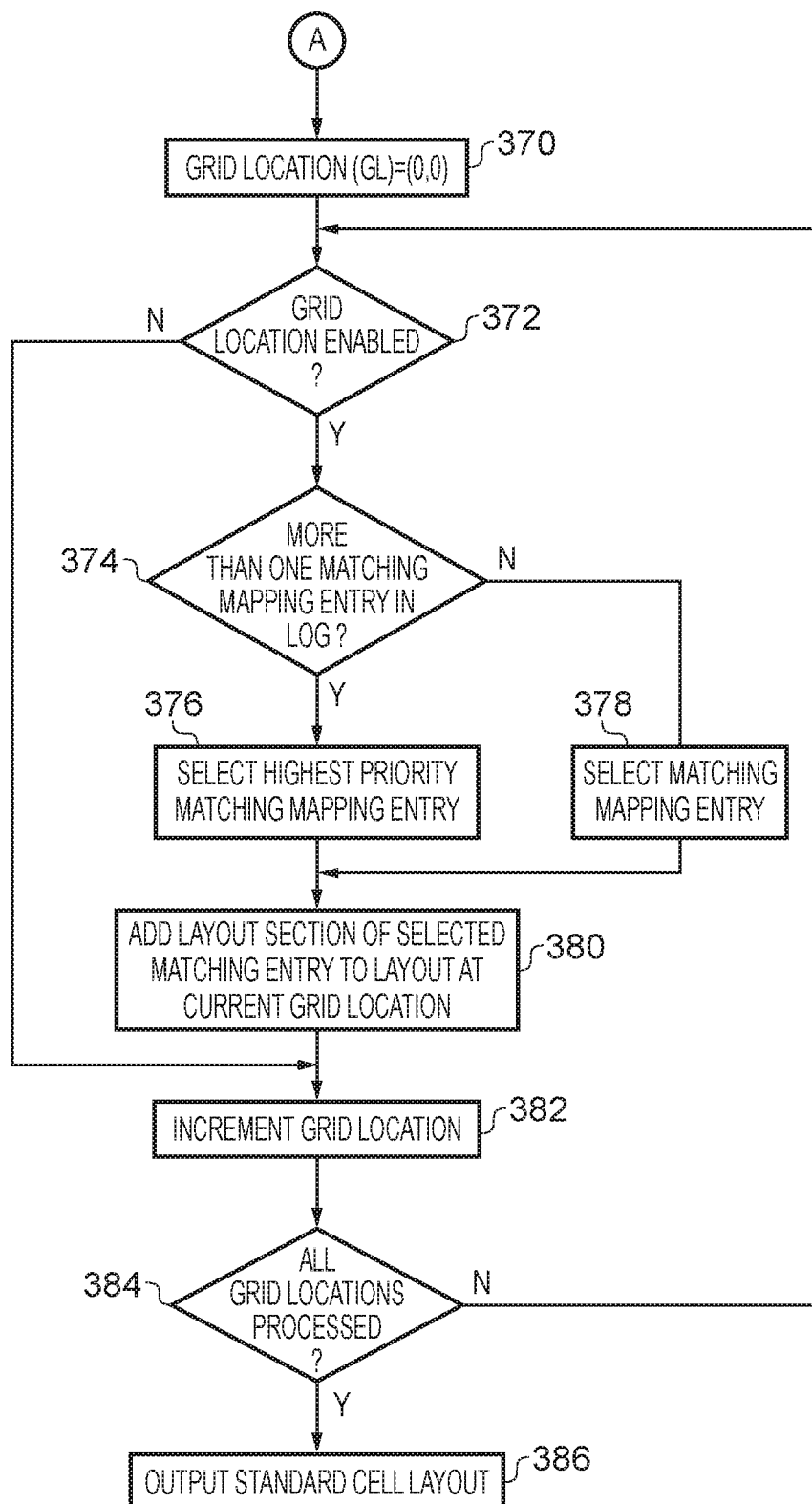

FIGS. 5A and 5B are flow diagrams illustrating the operation of the system of FIG. 1 in accordance with one embodiment. At step 300, a schematic is input to the standard cell generator 30, whereafter at step 305 the standard cell generator accesses the stick database 20 in order to select an appropriate stick representation for that schematic. Thereafter, a grid location parameter is initialised to an initial value (in this example 0,0) at step 310. At step 315, another parameter i is set equal to 0, whereafter at step 320 mapping entry i is selected from the mapping database 40. Whilst it does not matter in which order the mapping entries are analysed (e.g. from the lowest priority entry to the highest priority entry, or from the highest priority entry to the lowest priority entry), for the purposes of discussion it will be assumed that the analysis starts with the highest priority mapping entry.

At step 325, it is determined whether the stick section of the mapping entry i matches with the stick representation at the grid location. If not, the process proceeds directly to step 350 where the parameter i is incremented, and if the value of i does not yet equal some maximum value indicating that all grid locations have been evaluated (as determined at step 355), the process will then return to step 320 to cause the process to be repeated for the next mapping entry.

If at step 325 a match is detected, then at step 335 mapping entry i is added to a log in association with the current grid location to identify that that mapping entry is a match for the grid location, whereafter the process proceeds to step 340.

At step 340, it is determined whether the mapping entry i identifies any grid locations that should be disabled as a result of that mapping entry being used as a matching mapping entry. In particular it is possible for a mapping entry to include data identifying certain grid locations that will be disabled if that mapping entry is used at a matching mapping entry, which hence enables that mapping entry to specify a relatively large layout section which, once added to the layout, will remove the need for one or more adjacent grid locations to introduce any further layout. If not, the process proceeds to step 350, but otherwise the process proceeds to step 345 where the above mentioned log is populated to identify any disabled grid locations.

Via steps 350 and 355, the above process is then repeated for every mapping entry, whereafter the process proceeds to step 360 where the grid location is incremented. Assuming all grid locations have not yet been processed (as determined at step 365), the entirety of the above process is then repeated from step 315, to cause all of the mapping entries to be evaluated in respect of the new grid location. Once all grid locations have been processed, the process then branches to FIG. 5B.

Before discussing FIG. 5B, reference will be made to FIG. 6 which schematically illustrates the contents of the log 390 that will have been produced as a result of performance of the process of FIG. 5A. In particular, the log has an entry for each grid location, that entry identifying the grid location in the section 392, identifying any matching mapping entries in the section 394, and identifying whether the grid location is enabled or disabled in the section 396.

Considering now FIG. 5B, then at step 370 the grid location is again initialised, whereafter at step 372 it is determined with reference to the log 390 whether that grid location is enabled. If not, the process proceeds directly to step 382. However, if the grid location is enabled, it is then determined at step 374 whether more than one matching mapping entry is identified in the section 394 of the relevant entry within the log 390. In one embodiment, the mapping database 40 includes a number of low priority mapping entries whose stick sections are basic enough to ensure that there will always be at least one matching mapping entry for each grid location.

If there is only one matching mapping entry, then that single matching mapping entry identified in the log is selected at step 378, whereas in the event of multiple matching mapping entries, the highest priority matching mapping entry from amongst those matching mapping entries identified in the log is selected at step 376.

Thereafter, at step 380, the layout section identified within the selected matching entry of the mapping database 40 is added to the layout at the current grid location. Thereafter, at step 382 the grid location is incremented, and then at step 304 it is determined whether all grid locations have yet been processed. If not, the process loops back to step 372, but once all grid locations have been processed, then this indicates that the layout for the entire standard cell has now been produced, and accordingly that standard cell layout is output at step 386.

The mapping entries in the mapping database can be varied, such that a number of the entries have simple stick sections ensuring that at least one matching mapping entry will be found for any particular grid location, whilst other higher priority mapping entries have relatively complex stick sections, for example stick sections that ensure that that mapping entry will only match at one specific grid location. These latter high priority mapping entries hence allow very specific layout sections to be specified, and by this approach the very complex design rules associated with the emerging process technologies can be catered for. Further, as mentioned earlier, certain grid locations can be disabled in association with certain mapping entries. Hence, considering the example of a high priority mapping entry whose associated stick section will ensure that that mapping entry only matches at one specific grid location, a relatively large associated layout section may be specified in that mapping entry to identify a very specific format of layout to be reproduced at that grid location, and that layout may be such that no additional layout needs to be produced for one or more adjacent grid locations. Those adjacent grid locations can hence be disabled to prevent any additional layout being reproduced at those grid locations.

Figure 7:
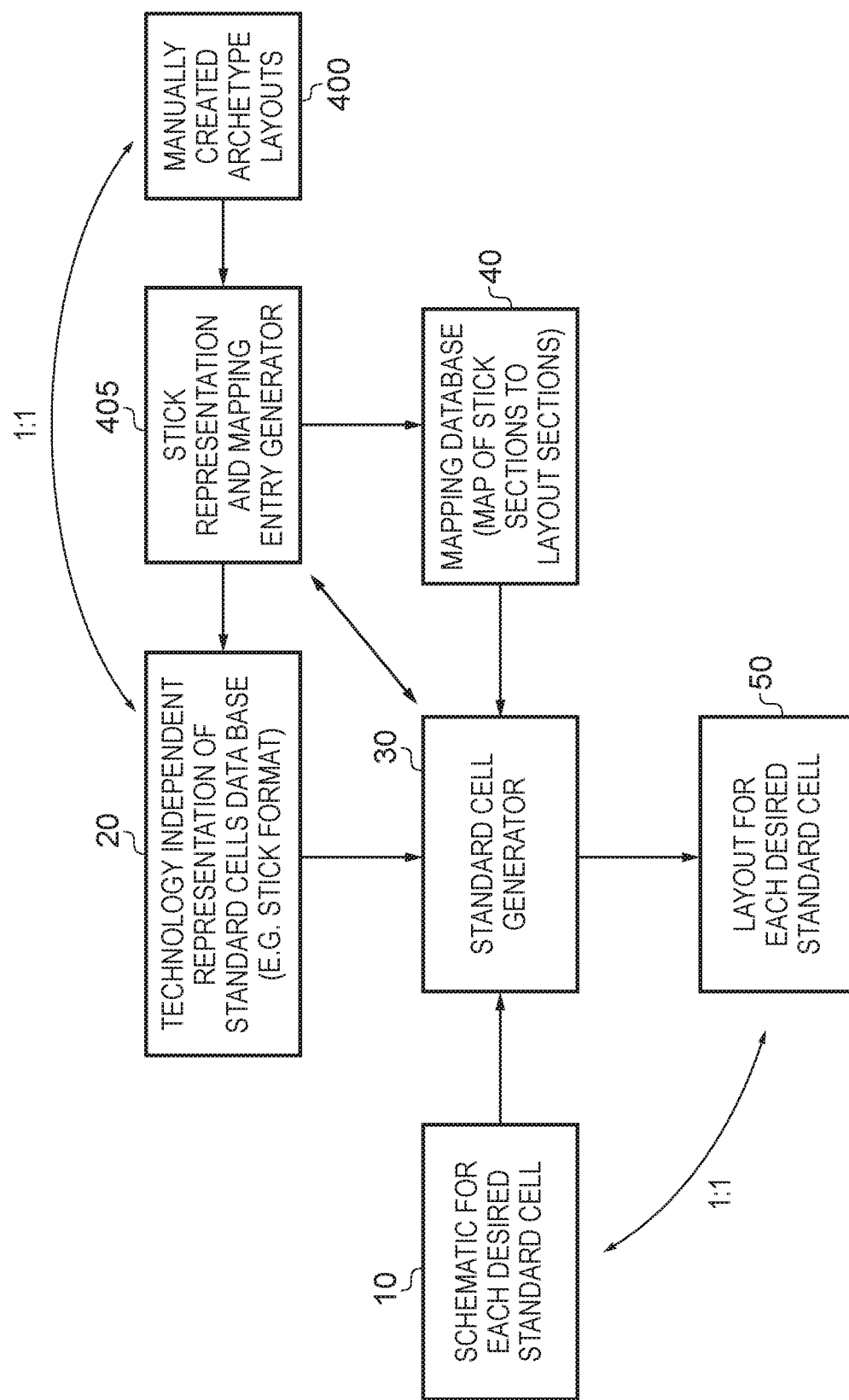
FIG. 7 illustrates a system in accordance with an alternative embodiment, which incorporates an automated mechanism for populating the sticks database and mapping database.

Whilst the contents of the stick database 20 and the mapping database 40 can be populated manually, FIG. 7 illustrates an alternative embodiment where an additional generator tool 405 is used to populate one or both of the stick database 20 and the mapping database 40. In particular, the generator tool 405 receives manually created archetype layouts 400, and in one embodiment generates a stick diagram for insertion within the database 20 for every archetype layout 400 input to the tool. In addition, the tool 405 may then interact with the tool 30 to cause the tool 30 to generate a standard cell layout from the produced stick diagram, and by then subsequently comparing that produced standard cell layout with the archetype layout, the tool 405 can modify the contents of the mapping database, in particular by creating additional mapping entries and by altering the layout sections of one or more pre-existing mapping entries, as will be discussed in detail later with reference to FIGS. 10A to 10C. Whilst the stick representation and mapping entry generator 405 is shown as a separate component to the standard cell generator 30, in one embodiment both of these components can be provided within a single tool.

Figure 8:
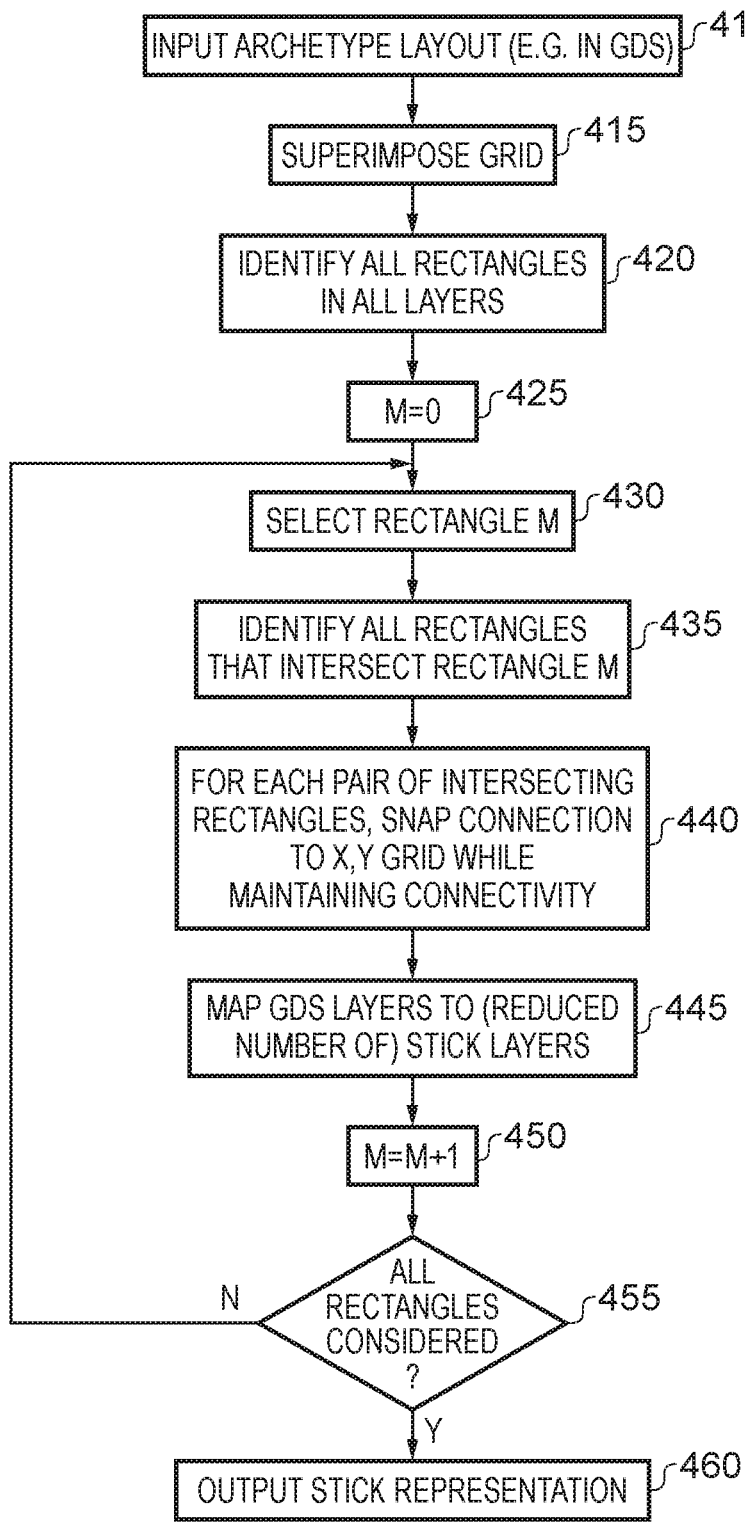
FIG. 8 is a flow diagram illustrating how stick representations may be generated in one embodiment of the system of FIG. 7.

FIG. 8 is a flow diagram illustrating how the stick representation and mapping entry generator 405 generates a stick representation from an input archetype layout 400. At step 410, the archetype layout is input to the generator 405. This will typically take the form of a data file, such as a GDS data file. At step 415, the generator tool 405 superimposes a grid on the archetype layout, whereafter at step 420 the tool identifies all regular-shaped sections within all of the layers in the archetype layout. As will be understood, typically all of the layout patterns in a GDS file are constructed using a series of rectangles, and accordingly in this embodiment at step 420 all such rectangles are identified in all of the layers. However, it will be appreciated that in other embodiments different shaped sections could be used and identified. Thereafter, at step 425, a parameter M is set equal to 0.

At step 430, rectangle M is selected, and then at step 435 all rectangles that intersect rectangle M are then identified. This will include both rectangles that intersect the rectangle in the same process layer, as well as any rectangles that intersect in a different process layer, due to a connection being provided between the rectangles in those two different process layers.

At step 440, for each pair of intersecting rectangles, the connection between those rectangles is snapped to the grid, such that the resulting connection point will be at one of the X, Y grid locations within the grid. In addition, whilst performing this snapping function, the connectivity is maintained whilst reducing the rectangles to the line format of the stick diagram. This process is shown schematically in FIG. 9.

Figure 9:
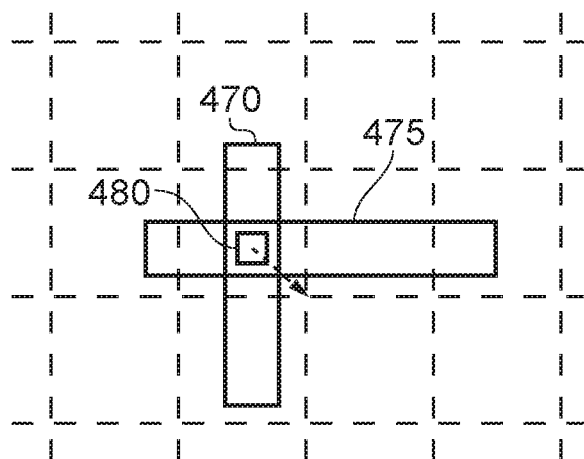
FIG. 9 schematically illustrates the process performed at step 440 of FIG. 8 in accordance with one embodiment.
Figure 9:
Figure 9:
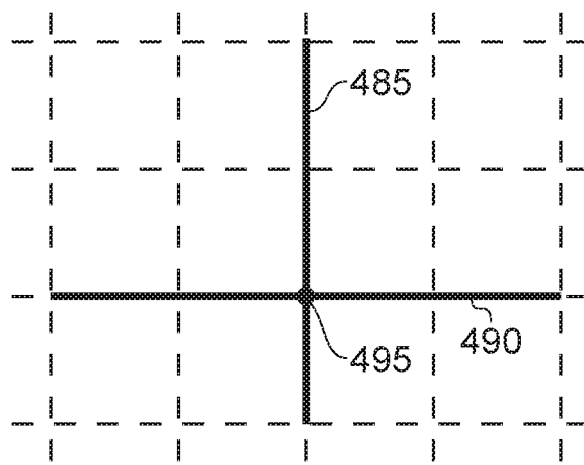

Accordingly, as shown in FIG. 9 a first rectangle 470 interconnects a second rectangle 475 at a connection 480. The connection 480 is snapped to the nearest grid location, as shown by the point 495. Further, the rectangle 470 is snapped outwards to the grid, to form the line 485, and similarly the rectangle 475 is snapped outwards to the grid to form the line 490.

At step 445, the various GDS layers are then mapped to the stick layers. As discussed previously, there will typically be more GDS layers than stick layers, and accordingly the stick features produced by the process of step 440 need to be mapped to the relevant stick layers. Hence, at this step the stick features generated with respect to two or more GDS layers may be consolidated into a single stick layer. Some GDS layers may be unnecessary to describe the stick features, and therefore will be unused when generating the stick features.

At step 450, the parameter M is incremented, whereafter it is determined whether all rectangles have been considered at step 455. If not, then the process returns to step 430. Once all rectangles have been considered, then the required stick representation will have been produced, and accordingly is output at step 460 for storing within the database 20. Although not specifically shown in FIG. 8, an optional step that may be taken prior to outputting the stick diagram is that, once the process of step 440 has been performed for all pairs of intersecting rectangles, then any spare portions of any of the lines that extend beyond a final connection point can be trimmed back to remove superfluous parts of the lines.

Figure 10A:
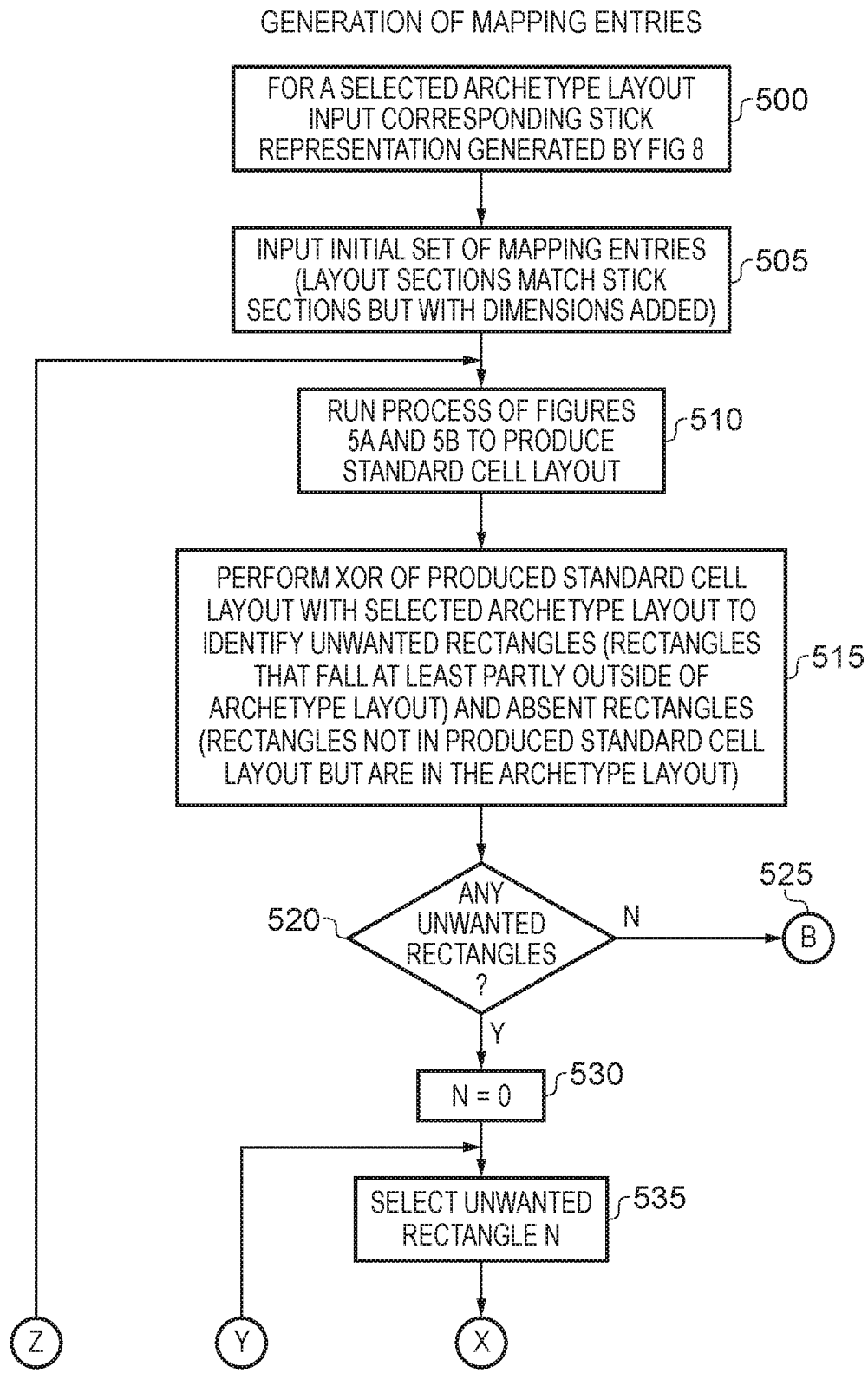
FIGS. 10A to 10C provide a flow diagram illustrating how the system of FIG. 7 is used to alter the contents of the mapping database in accordance with one embodiment.
Figure 10B:
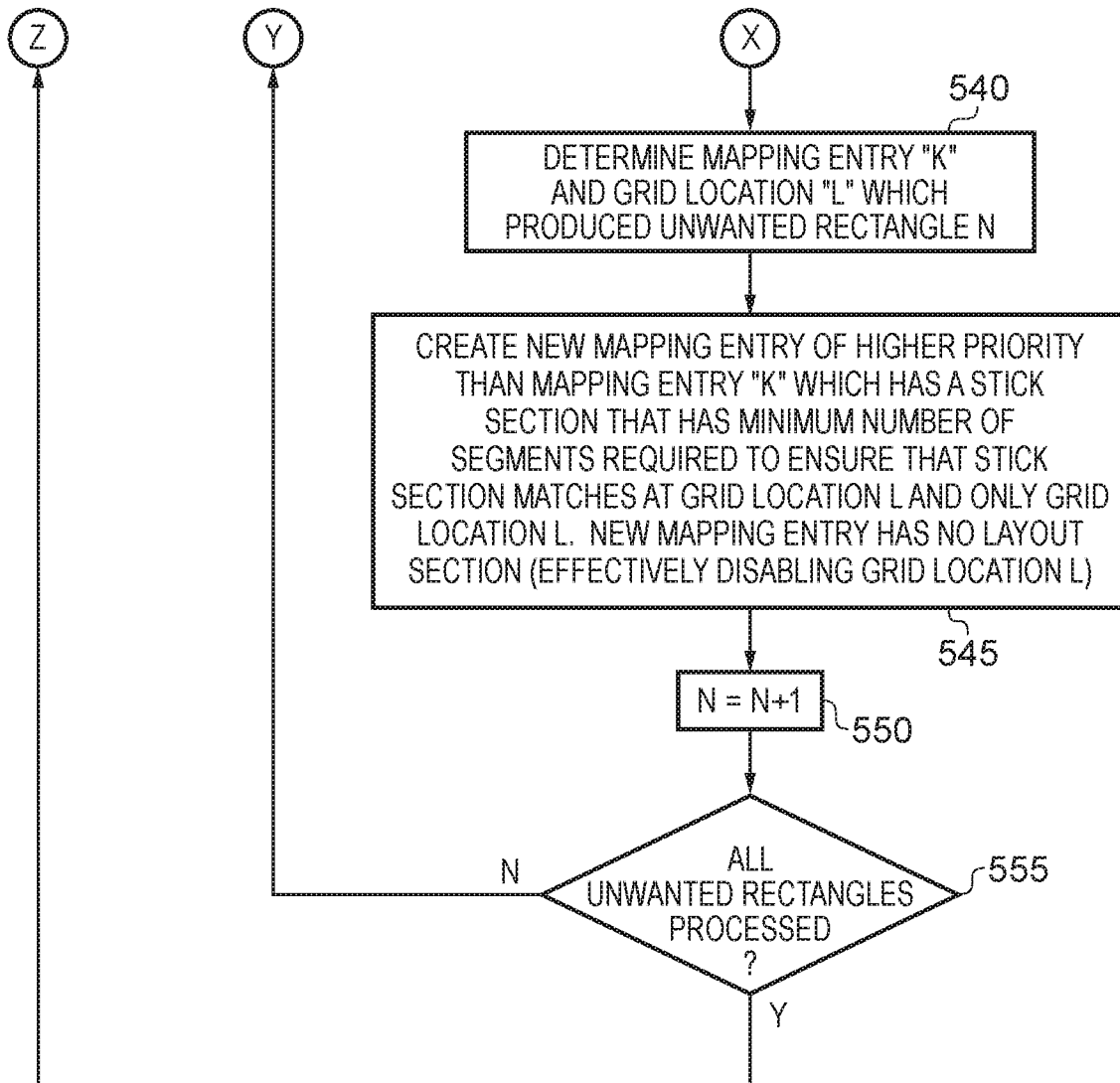
Figure 10C:
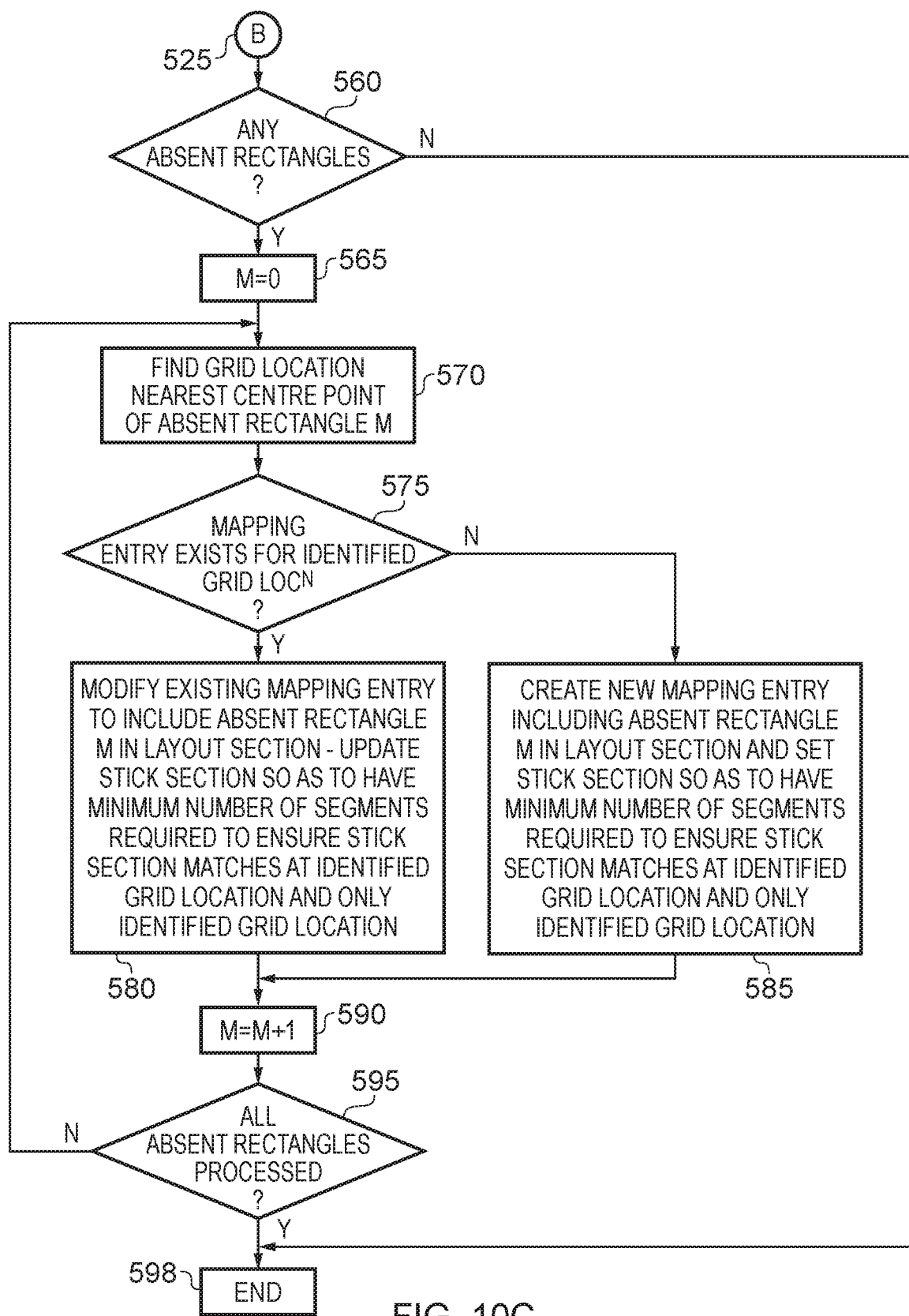

FIGS. 10A to 10C are flow diagrams illustrating how the stick representation and mapping entry generator 405 is used to alter the contents of the mapping database 40. In particular, through use of the archetype layouts 400 that are developed having regards to a particular process technology, the generator 405 can develop a mapping database whose mapping entries are specific to that process technology, and enable standard cells to be generated conforming to that process technology. This means that once a certain number of archetype layouts have been manually developed and verified as conforming to the particular process technology, a suitable mapping database 40 can then be generated, such that all subsequent required standard cells for that process technology can then be generated automatically using the standard cell generator 30.

As shown at step 500 in FIG. 10A, the mapping entry generator 405 causes the standard cell generator 30 to retrieve from the database 20 the stick diagram that the generator 405 generated from a particular input archetype layout 400.

The mapping database 40 is initialised with an initial set of mapping entries that are of a simple form, sufficient to allow a matching entry to be found for each grid location. In one embodiment, in these initial set of mapping entries, each mapping entry has a layout section that matches the corresponding stick section, but with dimensions added (to identify the length and width of the rectangles). At step 505, that initial set of mapping entries is input into the standard cell generator 30 from the mapping database 40.

Thereafter at step 510, the generator tool 30 performs the process of FIGS. 5A and 5B discussed earlier in order to produce a standard cell layout.

At step 515, the generator tool 405 then performs a logical XOR operation using as inputs both the produced standard cell layout output by the standard cell generator 30 and the original archetype layout 400. This enables any unwanted rectangles to be identified, namely rectangles that are present in the standard cell layout generated by the standard cell generator 30 from the stick diagram, but which fall at least partly outside of the rectangles in the archetype layout. In addition, this process will generate any absent rectangles, namely rectangles that are not in the standard cell layout produced by the standard cell generator 30 from the stick diagram, but which are in the archetype layout, and hence are required.

At step 520, it is then determined if there are any unwanted rectangles. If not, the process proceeds to point B 525, invoking the process of FIG. 10C discussed later. However, assuming there are some unwanted rectangles, then at step 530 the parameter N is set equal to 0, whereafter unwanted rectangle N is selected at step 535.

The process then proceeds to FIG. 10B, where the generator 405 interacts with the generator 30 in order to determine the mapping entry (referred to herein as mapping entry K) and the grid location (referred to herein as grid location L) which produced the unwanted rectangle within the standard cell layout output from the standard cell generator 30. Thereafter, the generator 405 creates, at step 545, a new mapping entry of a higher priority than mapping entry K, which has a stick section that has the minimum number of segments required to ensure that that stick section matches at the grid location L, and only at the grid location L within the stick diagram.

As illustrated in the earlier discussed FIG. 4B, a segment is either a connection point, or a line extending along the edge of a single grid. Hence the various stick sections illustrated in FIG. 4B have the number of segments identified against them in FIG. 4B. If the process of step 545 were to be performed specifically in respect of the grid location 160 discussed earlier with reference to FIG. 3, then it will be appreciated that a stick section of the form identified by the reference numeral 240 (having two segments) would represent the minimum number of segments required to ensure that that stick section only matches at grid location 160 within the stick diagram. The above is purely an example to illustrate the step performed at step 545.

In addition, at step 545, that new mapping entry is initialised to have no layout section. This effectively disables grid location L, since if the standard cell generator 30 were to re-run the process using the stick diagram, it would then insert no circuit layout in association with grid location L, and accordingly the unwanted rectangle would no longer appear.

Following step 545, then the parameter N is incremented at step 550, whereafter it is assessed whether all unwanted rectangles have been processed at step 555. If not, the process returns to step 535, to cause the earlier described process of steps 540 and 545 to be performed in respect of the next unwanted rectangle. Once all unwanted rectangles have been processed, the process returns to step 510. By use of the above described process, it is possible that one or more locations can become re-enabled (the disable is removed), and hence by returning to step 510 it can be ensured that the process is repeated until no unwanted shapes are found.

The process of FIGS. 5A and 5B is then re-run and the earlier described XOR operation re-performed, in order to determine whether there are still any unwanted rectangles. If there are, then the earlier described steps are re-performed. However, once it has been determined that the standard cell generator will produce from the stick diagram a standard cell layout which has no unwanted rectangles, then the process proceeds to point 525, where the process of FIG. 10C is then performed.

As shown in FIG. 10C, it is determined at step 560 whether there are any absent rectangles. If not, then the process proceeds directly to the end step 598, since at this point it has been verified that the standard cell generator is able to produce from the stick diagram, and using the current contents of the mapping database, a standard cell layout that conforms to the archetype layout, and hence conforms to the design rules of the process technology.

However, assuming there are one or more absent rectangles, then the process proceeds to step 565, where the parameter M is set equal to 0, whereafter at step 570 the grid location nearest the centre point of the absent rectangle M is identified.

At step 575, it is determined whether a matching mapping entry exists for the identified grid location, this for example being determinable with reference to the log 390 produced by the standard cell generator 30 during the performance of the process of FIG. 5A.

If a matching mapping entry does already exist, then the process proceeds to step 580, where that existing mapping entry is modified to include the absent rectangle M in the layout section. In addition, the stick section is updated so as to have the minimum number of segments required to ensure that the stick section matches at the identified grid location and only the identified grid location.

If at step 575 there was determined not to be any matching mapping entry for the identified grid location, then the process proceeds to step 585 where a new mapping entry is created that includes the absent rectangle M in the layout section. Again, the stick section for that new mapping entry is set so as to have the minimum number of segments required to ensure that that stick section matches at the identified grid location and only that identified grid location.

The process then proceeds to step 590 (or proceeds to step 590 from step 580 in the event that an existing mapping entry was modified), where the parameter M is incremented, whereafter at step 595 it is determined whether all absent rectangles have been processed. If not, the process returns to step 570. Once all absent rectangles have been processed, then the process ends at step 598. At this point, the contents of the mapping database will have been updated such that if the standard cell generator 30 generates a standard cell from the stick representation previously generated by the stick representation and mapping entry generator 405, this will produce a standard cell layout matching the archetype layout, and accordingly conforming to the design rules. Since the stick sections of the added/modified mapping entries only included the minimum number of segments to ensure that they match at only one grid location in the current stick diagram under consideration, then there is a prospect of those mapping entries also producing matches at grid locations in other future stick diagrams.

It has been found that once the above described stick generation and mapping entry generation processes have been performed for a certain number of archetype layouts, there are then sufficient stick diagrams in the stick database, and a sufficiently detailed set of mapping entries in the mapping database, to enable the standard cell generator 30 to then generate any required standard cell from an input schematic 10, with that standard cell conforming to the process technology.

Figure 11:
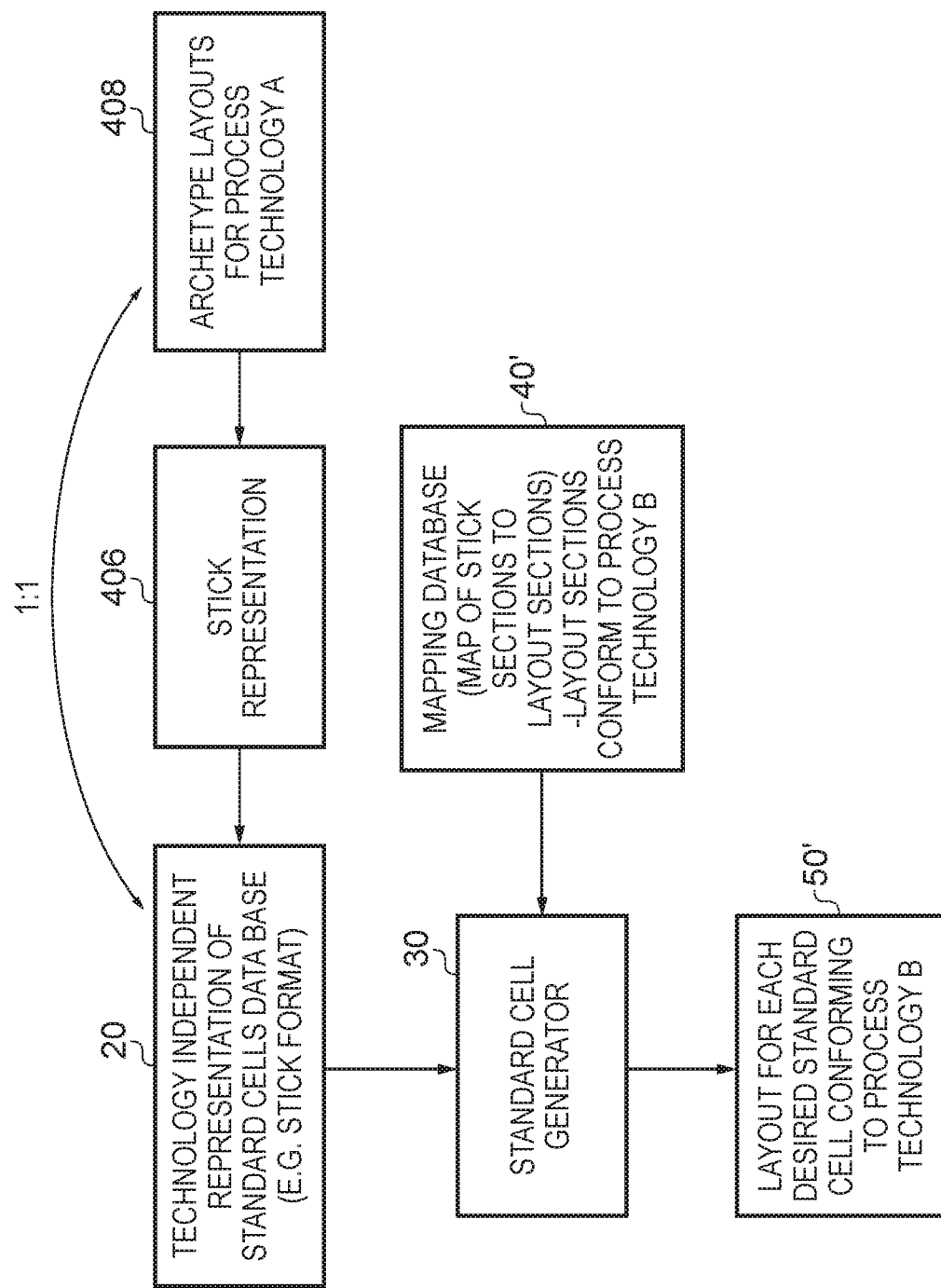
FIG. 11 illustrates a system in accordance with an alternative embodiment, which provides an automated mechanism for technology migration.

FIG. 11 illustrates a system in accordance with an alternative embodiment, which provides an automated mechanism for technology migration. A stick representation generator 406 is provided in order to generate a stick diagram for each of a set of archetype layouts 408, the generator 406 operating in the manner discussed earlier with reference to FIG. 8 when describing the generator 405 of FIG. 7. In this instance, the set 408 of archetype layouts conform to a process technology A, and the above process results in a corresponding set of process technology independent stick diagrams been produced for storage within the stick database 20.

In FIG. 11, the mapping database 40' comprises a plurality of mapping entries, where each mapping entry provides a stick format section, and an associated layout pattern section, where that layout pattern section conforms to a process technology B, which is different to process technology A. The standard cell generator 30 is then arranged, for each stick diagram in the database 20, to produce a corresponding layout using the contents of the mapping database, as a result of which a set of standard cell layouts will be produced that conform to the process technology B. Once this process has been completed, then for every input archetype layout conforming to process technology A, a corresponding layout will have been generated conforming to process technology B. As a result, it can be seen that the system of FIG. 11 provides an efficient, automated, mechanism for performing process technology migration.

Figure 12:
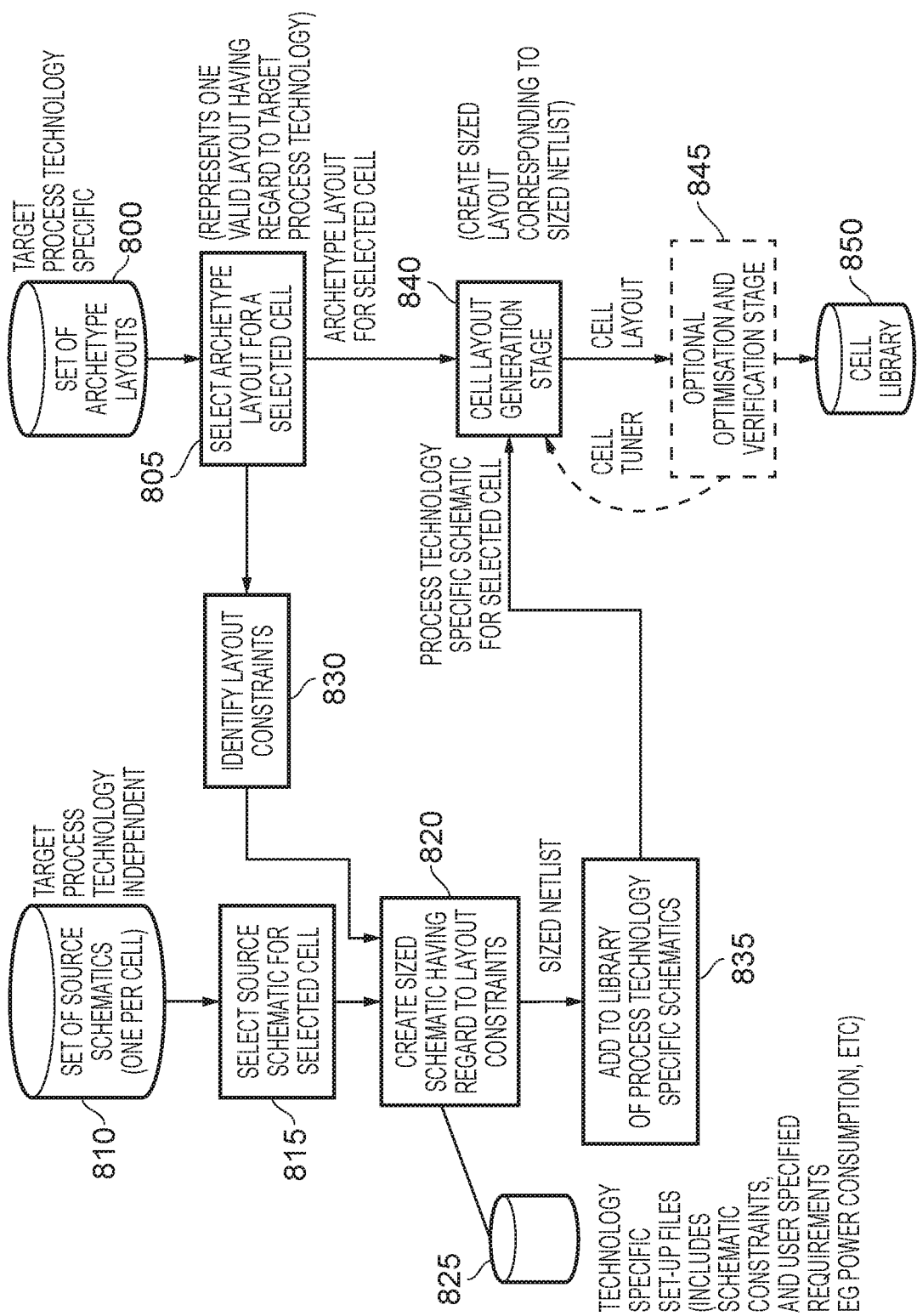
FIG. 12 schematically illustrates a cell layout generation process in accordance with one embodiment.

FIG. 12 illustrates an embodiment that seeks to co-optimise both schematic and layout during the process of generating a cell layout conforming to a target process technology. In particular, a set of archetype layouts are provided in storage 800 for a target process technology. Each archetype layout provides a valid layout pattern for a cell having regard to the design rules of the target process technology. In some instances, there may be more than one archetype layout provided for a particular cell, whilst in other instances some archetype layouts may actually be shared between more than one cell.

A storage 810 also provides a set of source schematics that are target process technology independent. Typically there will be one source schematic provided per cell. The earlier discussed FIG. 2 is an example of such a source schematic for a NAND gate.

When it is desired to produce a cell layout for a particular cell, then a suitable archetype layout is selected at step 805 from the set of archetype layouts within the storage 800. As mentioned earlier, this represents one valid layout for the cell having regard to the target process technology. This archetype layout, or in some embodiments layout information derived therefrom, is then input to the cell layout generation stage 840 for use when generating the cell layout.

In addition, the relevant source schematic is selected for the cell at step 815 from the storage 810, and that selected source schematic is input to the schematic sizing stage 820 used to create a sized schematic. In particular, the stage 820 will have access to technology specific setup files in the storage 825. These files can be used to identify schematic constraints and also user specified requirements, such as power consumption, etc, that are required in respect of the cell. Based on the information in the storage 825, the stage 820 can analyse the source schematic in order to identify a number of schematic constraints that will need to be taken into account when sizing the schematic. For example, the source schematic may identify that certain transistors need to be of the same size.

Figure 14:
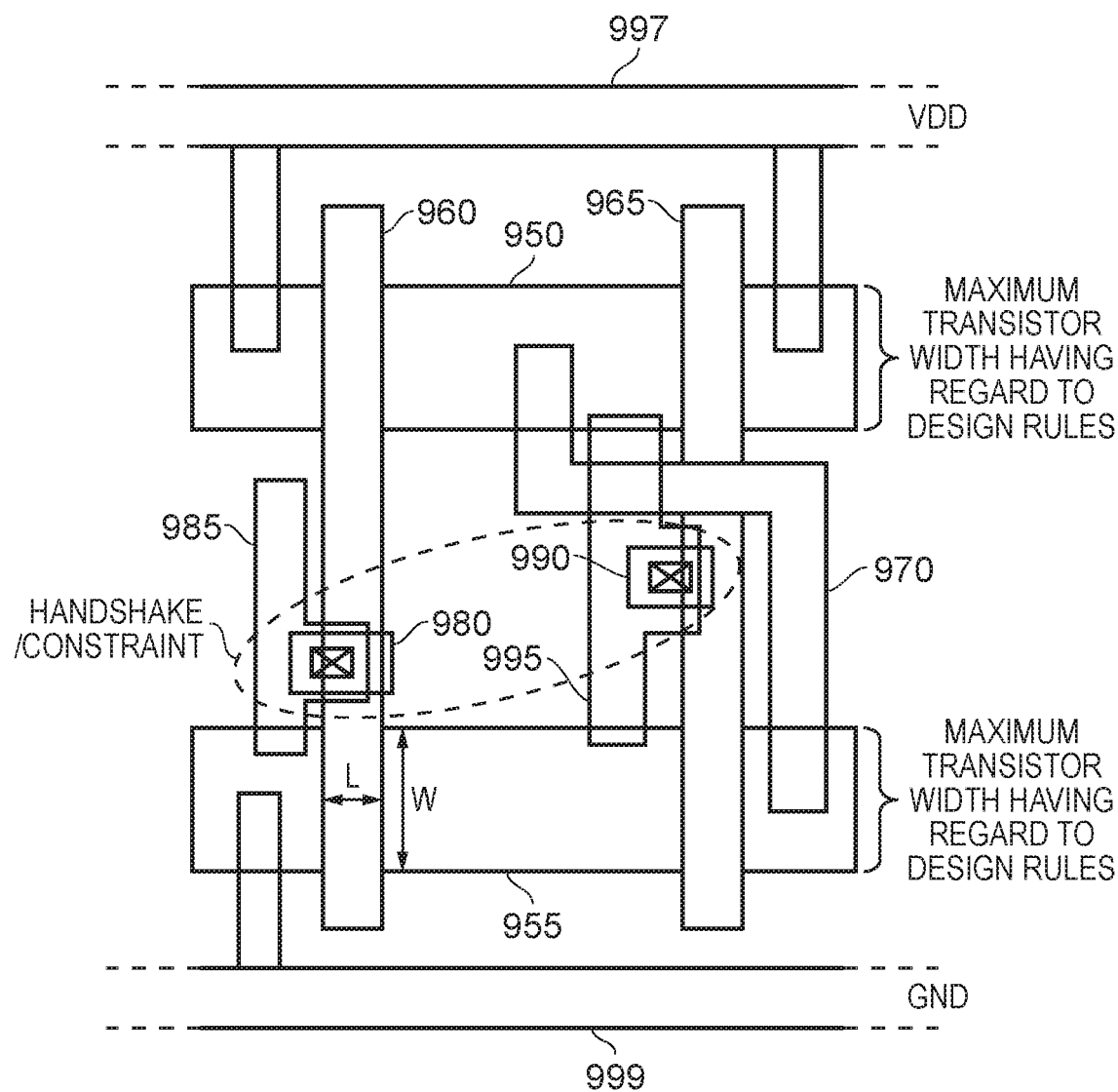
FIG. 14 illustrates an example archetype layout that may be used in one embodiment.

However, in addition, layout constraints are identified from the archetype selected at step 805, as indicated by the process step 830, and those identified layout constraints are also input to the schematic sizing stage 820. In particular, it will often be the case that whilst the source schematic can be used to identify certain schematic constraints, there will be other constraints that need to be taken into account when generating the layout if an optimal cell layout solution is to be achieved. The archetype layout will itself identify certain constraints (also sometimes referred to as handshakes) that apply within the layout design having regard to the design rules of the target process technology. Such a constraint for the archetype layout of a NAND gate is illustrated by way of example in FIG. 14. In FIG. 14, the areas 950, 955 represent the diffusion regions, and the strips 960, 965 represent the polysilicon tracks used to define the gate of each of the transistors. The input connections 980, 990 will typically have associated connection strips 985, 995 associated therewith. Often there will be a design rule restricting how close the connection points 980, 990 may be with respect to each other, as indicated by the dashed circle in FIG. 14. The connection line 970 represents a metal line from which the output connection (the "Y" connection using the example of FIG. 2 discussed earlier) can be taken. The lines 997 and 999 represent the supply voltage and ground lines, respectively.

By analysing the archetype layout, such as that shown in FIG. 14, the layout constraint with regard to the connection points 980, 990 may be identified and added to the constraints considered when sizing the schematic. In addition, by designing the archetype layout in a particular way, it is possible to increase the number of constraints that may be identified from the layout. For example, as shown in FIG. 14, the archetype layout can be arranged so as to maximize the transistor width having regards the design rules, by laying out the maximum width of diffusion region 950, 955. This layout constraint can then be identified and forwarded as one of the constraints used during the schematic sizing operation performed at stage 820.

For simplicity, the above process of identifying layout constraints has been discussed with reference to the very simple example of a cell representing a NAND gate. However, this process becomes particularly beneficial when considering more complicated cell arrangements, where it is possible to identify a significant number of layout constraints that will specify additional constraints not derivable as schematic constraints from the source schematic.

Figure 16A:
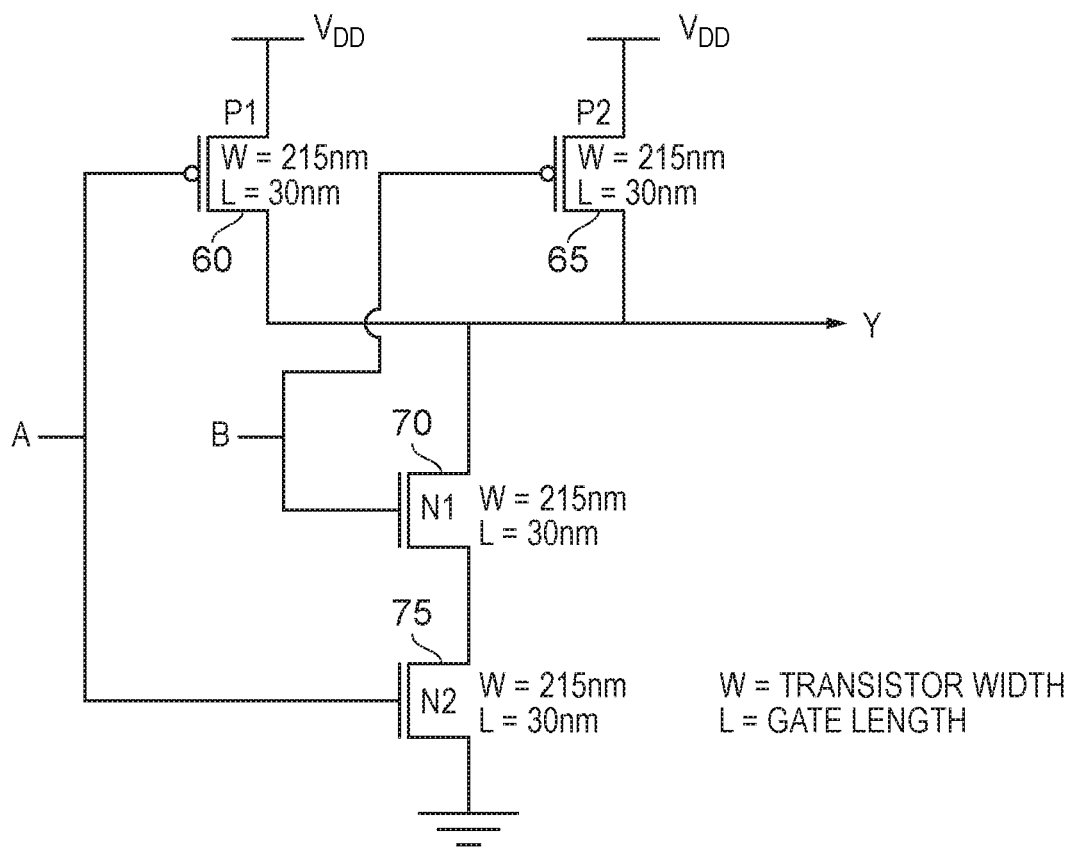
FIGS. 16A and 16B schematically illustrate examples of sized schematics that may be generated by the approach of FIG. 15 when using a source schematic such as illustrated in FIG. 2.
Figure 16B:
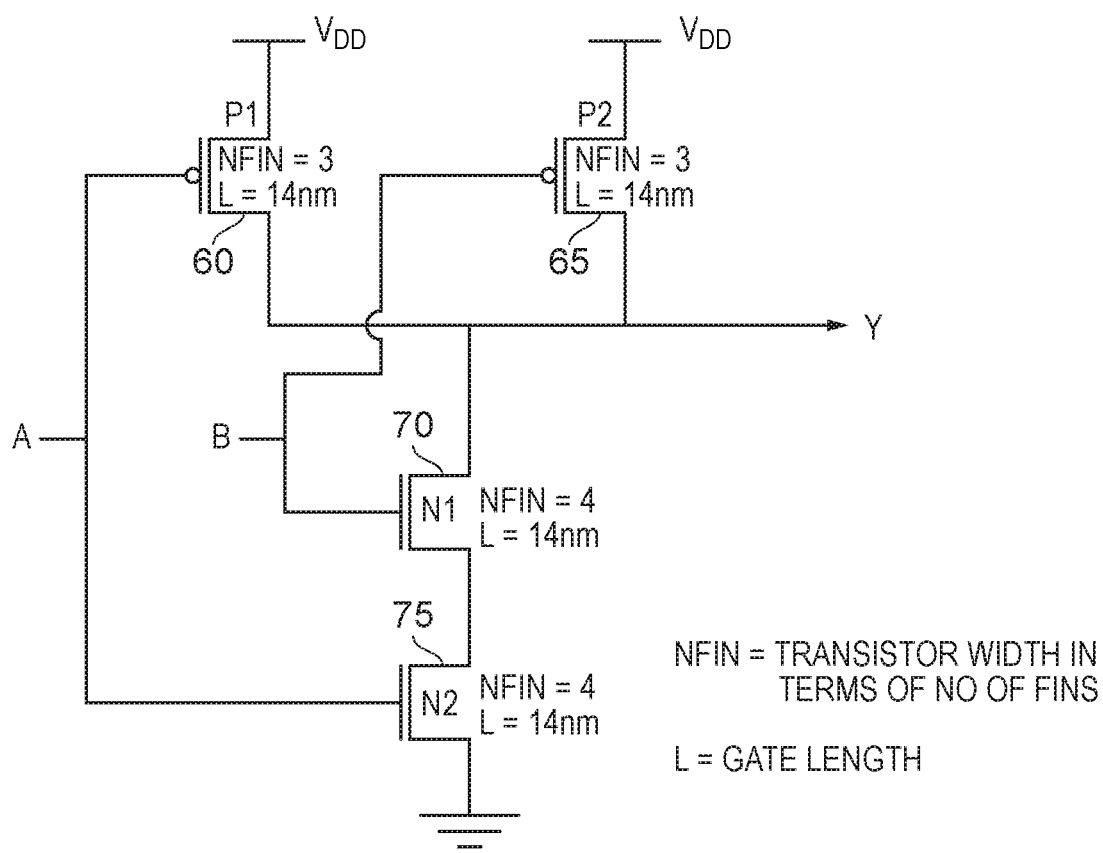

Based on both the schematic constraints and the layout constraints, the schematic sizing stage 820 will then generate a sized net list identifying a sized schematic that has been sized having regard to the identified schematic and layout constraints for the target process technology. The sized net list is essentially a data file defining the schematic, but also associating sizes with certain component elements within the schematic. FIGS. 16A and 16B illustrate two example sized schematics that may be generated from the source schematic of FIG. 2 in accordance with one embodiment. In particular, FIG. 16A shows a process technology dependent schematic produced for 28 nm technology with planar transistors. The width and length dimensions associated with each of the transistors is shown, and these width and length dimensions are shown schematically in FIG. 14 for clarity. In particular, the length identifies the width of the polysilicon strips 960, 965 whilst the width identifies the width of the diffusion regions 950, 955. Collectively these two values identify the area of the gate terminal of each transistor.

Figure 15:
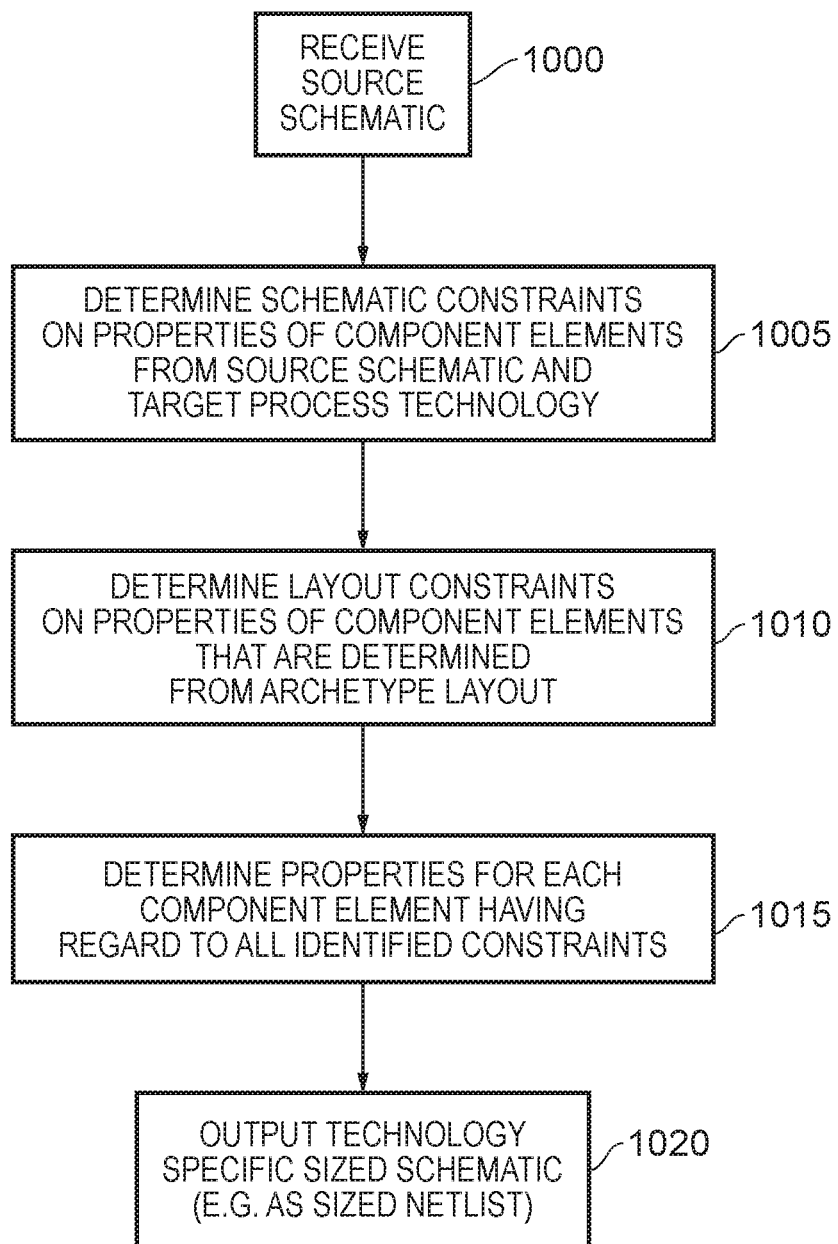
FIG. 15 is a flow diagram illustrating the steps performed to create a sized schematic in accordance with one embodiment.

FIG. 15 is a flow diagram illustrating the steps performed during the schematic sizing operation of stage 820. At step 1000, the source schematic is received, whereafter at step 1005 the schematic constraints on properties of the component elements within the cell are determined from the source schematic and target process technology information, such as the information obtained from the technology specific setup files in the storage 825.

At step 1010, the layout constraints on properties of the component elements that are identified in the archetype layout are determined. At step 1015, suitable sizing properties for each component element are determined having regard to all of the identified constraints, whereafter the resultant technology specific sized schematic is output at step 1020.

Whilst steps 1005 and 1010 are shown as being performed sequentially, it will be appreciated that these steps could be performed in parallel in one embodiment.

Each technology specific sized schematic output at step 1020 is added to a library of process technology specific schematics 835. It will be appreciated that whilst the above schematic sizing operation has been described as taking place at the time the cell layout is to be produced, this stage can actually be performed offline by reviewing in turn each of the source schematics in the storage 810 and appropriate archetype layouts retrieved from the archetype layout storage 800, and generating all of the required sized schematics for storage in the library 835. Then, at the time a cell layout is to be produced, the required archetype layout can merely be selected at step 805, and the required process technology specific schematic can then be read out of the library 835.

The cell layout generation stage 840 creates a sized layout corresponding to the sized net list input from the library 835, taking account of the archetype layout forwarded from stage 805. There a number of ways in which the cell layout can be generated within the cell layout generation stage 840, and two particular ways will be discussed later herein.

The cell layout is then added to the cell library 850, although in optional embodiments some optimisation and verification processes may be performed at stage 845. In one embodiment, this can cause a cell tuning operation to be initiated, where a modified process technology specific schematic is generated having regard to the cell layout that has been produced, and that modified process technology specific schematic is then returned to the cell layout generation stage 840 to cause another version of the cell layout to be generated from that sized schematic information and the archetype layout. Once the cell has been tuned in that matter (through one or more iterations), the resulting cell layout can then be stored in the cell library 850.

Figure 13:
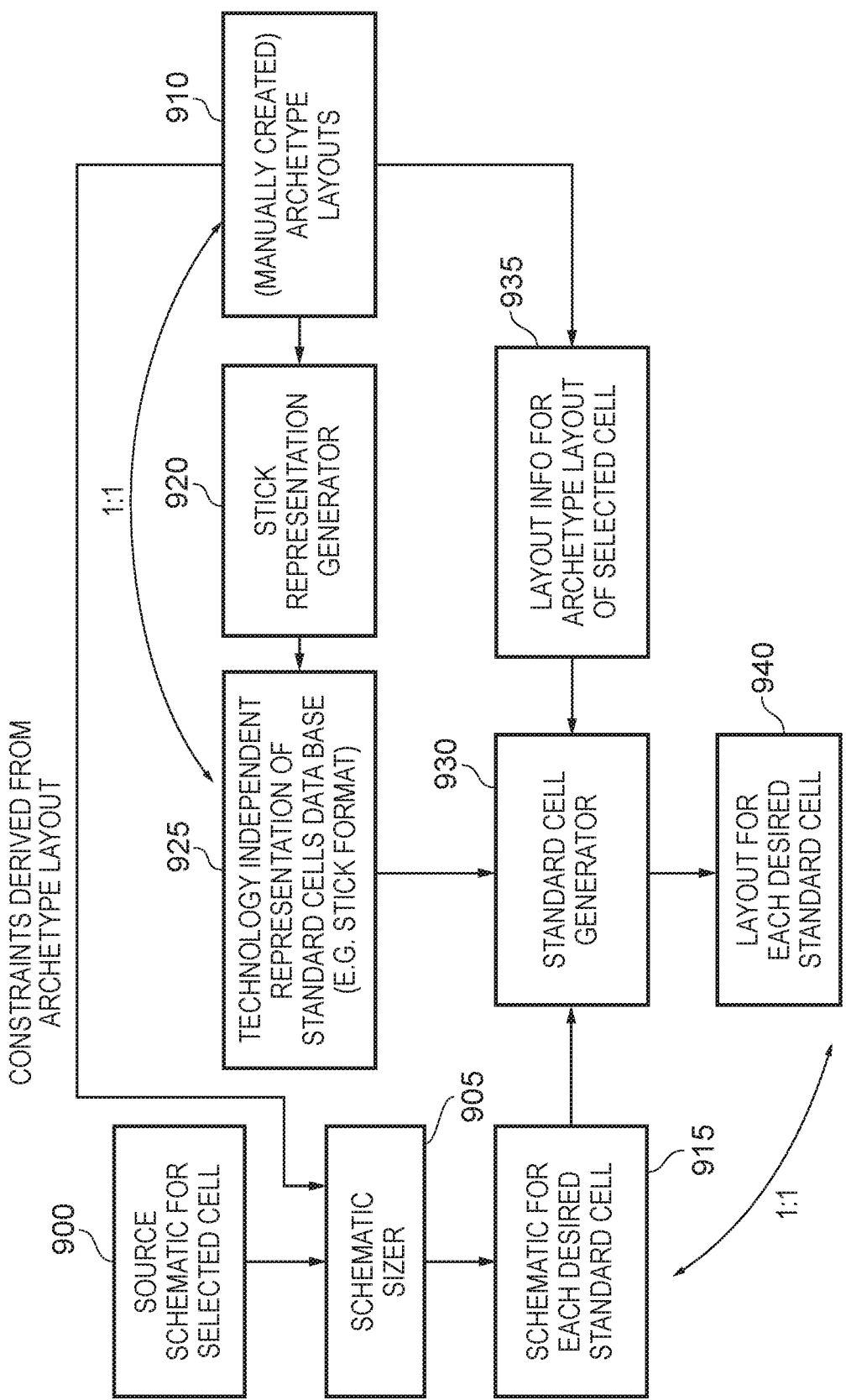
FIG. 13 further illustrates the cell layout generation process in accordance with one embodiment.

FIG. 13 schematically illustrates the cell generation operation in more detail. As discussed with reference to FIG. 12, a source schematic for a selected cell 900 is passed through the schematic sizing operation 905 in order to produce a sized schematic for each desired standard cell. Archetype layouts 900 (which may for example have been manually created) can be passed through a stick representation generator 920 in order to cause technology independent representations of standard cells to be added to the database 925. The stick representation generator 920 can use the relevant functionality from the tool 405 described earlier with reference to FIG. 7, and accordingly perform the functionality described earlier with reference to FIGS. 8 and 9 in order to generate the required stick diagrams corresponding to each of a number of input archetype layouts. In one embodiment, there will hence be a one to one relationship between the stick formats and the archetype layouts.

As discussed earlier, constraints derived from each of the archetype layouts are forwarded to the schematic sizer 905 for use in the generation of the sized schematics stored in the database 915.

At the time a layout of a particular cell is to be generated by the standard cell generator 930, then the relevant archetype layout is selected from the database 910, and the appropriate sized schematic is selected from the database 915. The schematic is then input to the standard cell generator 930 along with the relevant stick diagram from the database 925. In addition, the layout information 935 for the archetype layout of the selected cell is also input to the standard cell generator 930. In one embodiment, this layout information may itself comprise the archetype layout, such as when performing the compaction algorithm to be discussed later with reference to FIGS. 20A to 20C within the standard cell generator 930. Alternatively, it can be information derived from the archetype layout, such as the earlier mentioned mapping database providing layout sections for corresponding stick sections.

The standard cell generator 930 then generates the layout 940 for each desired standard cell using these three inputs. In one embodiment, a cell layout is determined for each sized schematic within the database 915.

Figure 17:
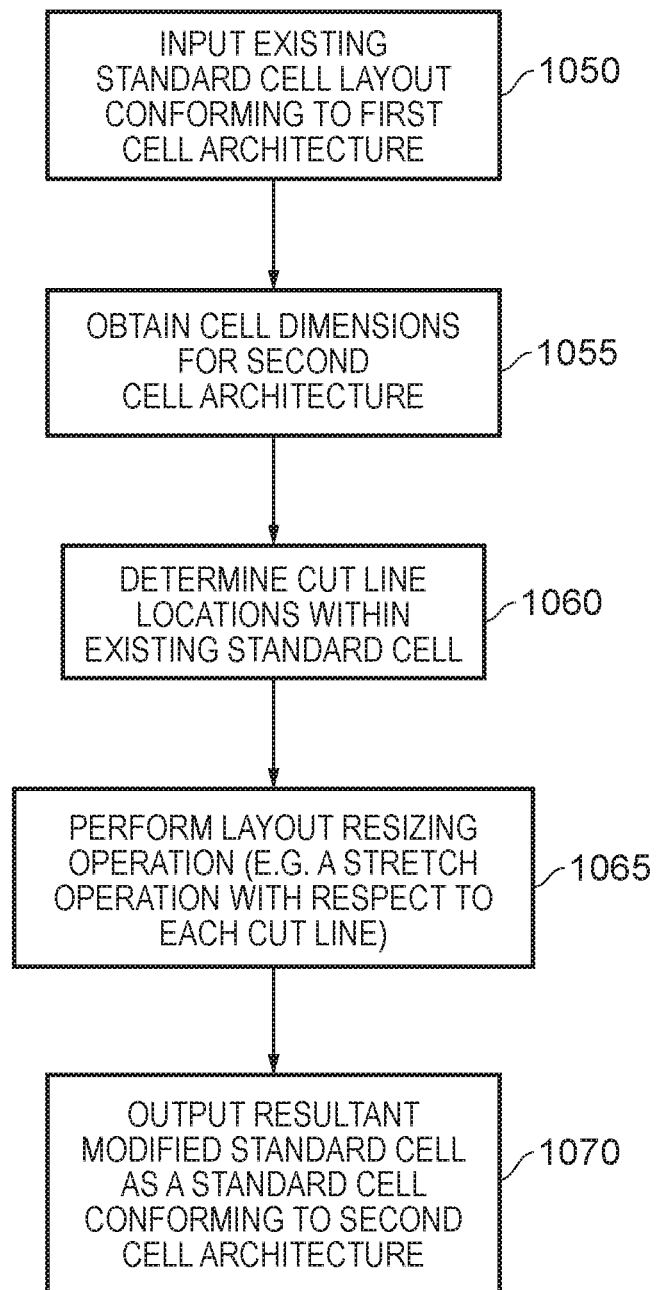
FIG. 17 is a flow diagram of a layout resizing operation that may be performed in one embodiment to convert a standard cell layout conforming to a first cell architecture into a standard cell layout conforming to a second cell architecture.

In one embodiment, the set of archetype layouts maintained in the storage 800 may include some archetype layouts that have been generated by a layout modification process illustrated schematically in FIG. 17. In particular, an existing standard cell layout conforming to a first cell architecture is input at step 1050. At step 1055, cell dimensions are obtained for a second cell architecture. These dimensions may for example identify a new cell height, or may provide data indicating a new transistor pitch. The desired transistor pitch indication data can specify the transistor pitch in a number of ways, for example in terms of spacing between polysilicon tracks, and/or the gate length of those polysilicon tracks.

Thereafter, at step 1060, cut line locations are determined within the existing standard cell. These cut lines can be determined manually, or an automated process may be used to determine the cut lines. The locations of the cut lines will often depend on what is seeking to be achieved by the conversion operation. For example it may be possible to increase the width of diffusion regions in order to generate stronger transistors, or it may be possible to increase the size of connection areas for pins, in order to provide improved routability to the cells.

Once the cut line locations have been determined, then the layout resizing operation is performed at step 1065. This can in principle be either a stretching operation or a shrinking operation, but for the purposes of the following discussion it will be assumed that the resizing operation is a stretching operation. Thereafter, the resultant modified standard cell is output as a standard cell conforming to the second cell architecture at step 1070.

Figure 18A:
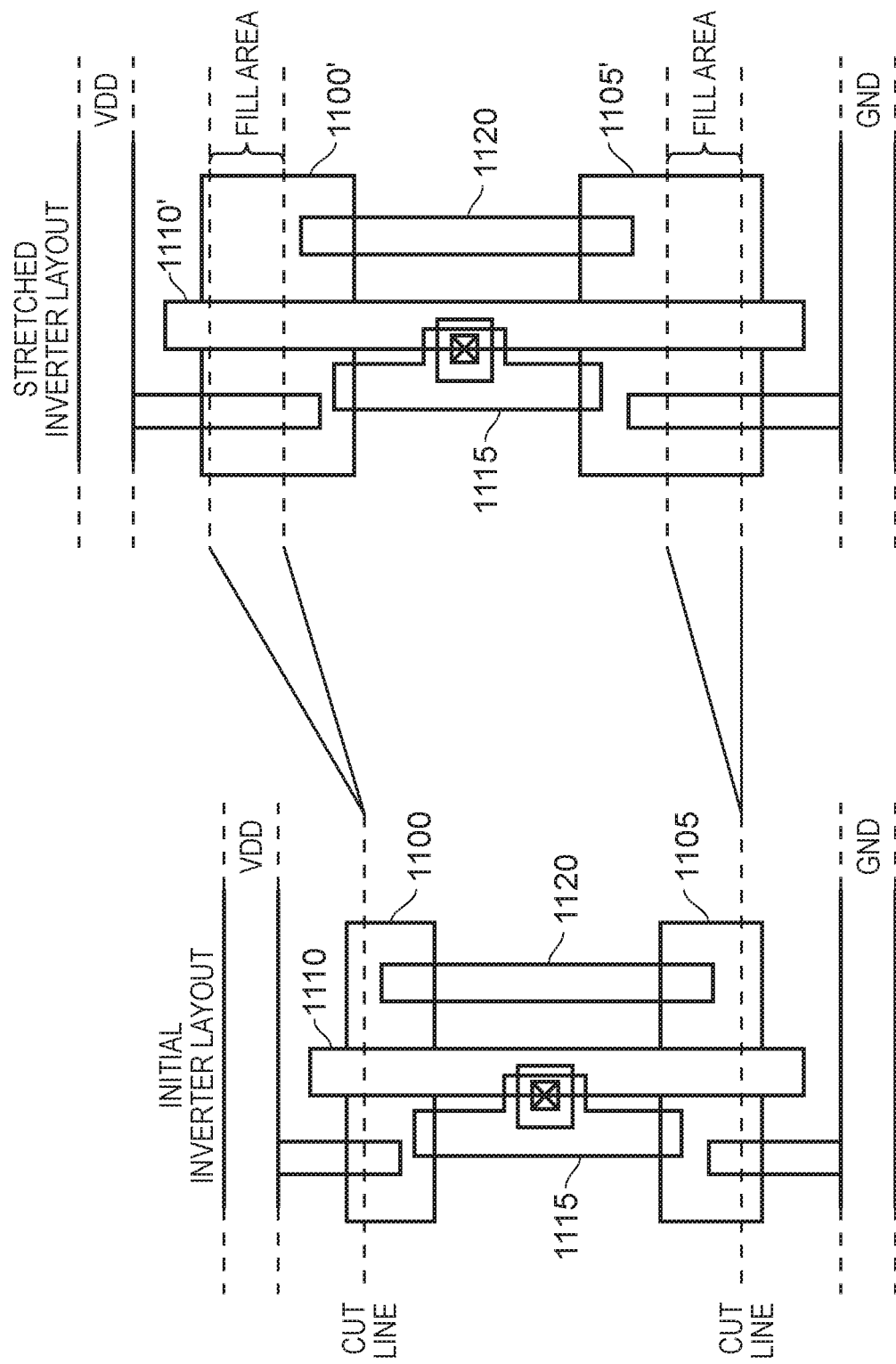
FIGS. 18A, 18B, 19A and 19B illustrate the resizing operations that may be performed when performing the process of FIG. 17, for some specific example layouts.

FIGS. 18A to 19B illustrate example stretching operations that may be performed. In FIG. 18A, an initial inverter layout is specified, having the initial diffusion regions 1100, 1105, a polysilicon layer 1110, an output connection 1120, and a metal connection 1115 associated with a connection to the polysilicon layer 1110 forming the gate of the PMOS and NMOS transistors of the inverter. If the cut lines are positioned where indicated on the left hand side of FIG. 18A, then the resultant stretched cell is shown on the right hand side of FIG. 18A. As can be seen, the height of the cell has increased, and in particular the width of the diffusion regions 1110' and 1105' has been increased as has the height of the polysilicon layer 1110'. However, the output connection 1120 and the metal connection area 1115 for the input pin are unchanged.

Figure 18B:
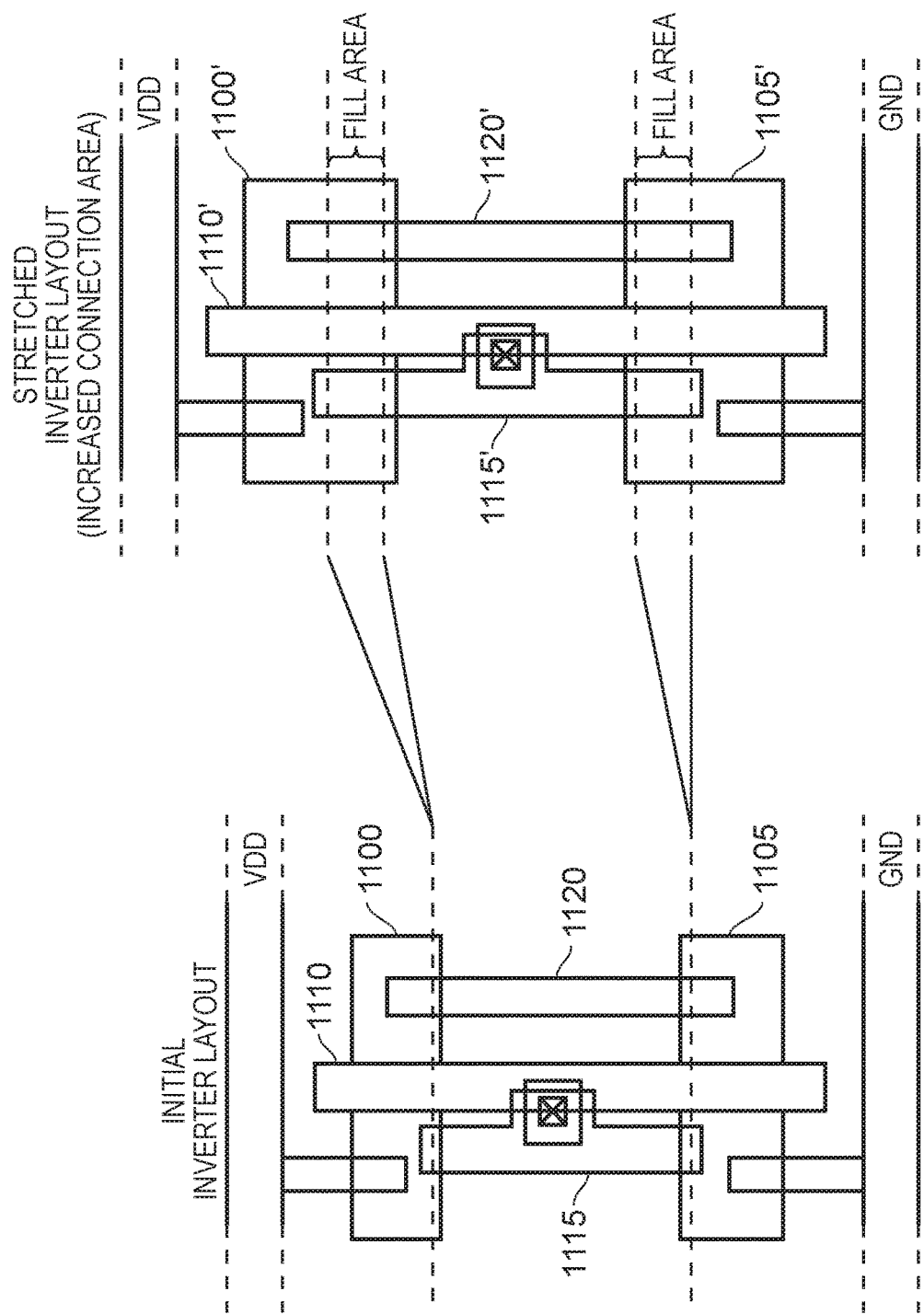

FIG. 18B illustrates an alternative arrangement of cut lines which additionally causes the dimensions of the output connection 1120' and the connection area 1115' to be increased, providing increased routability of input and output connections to the cell.

Figure 19A:
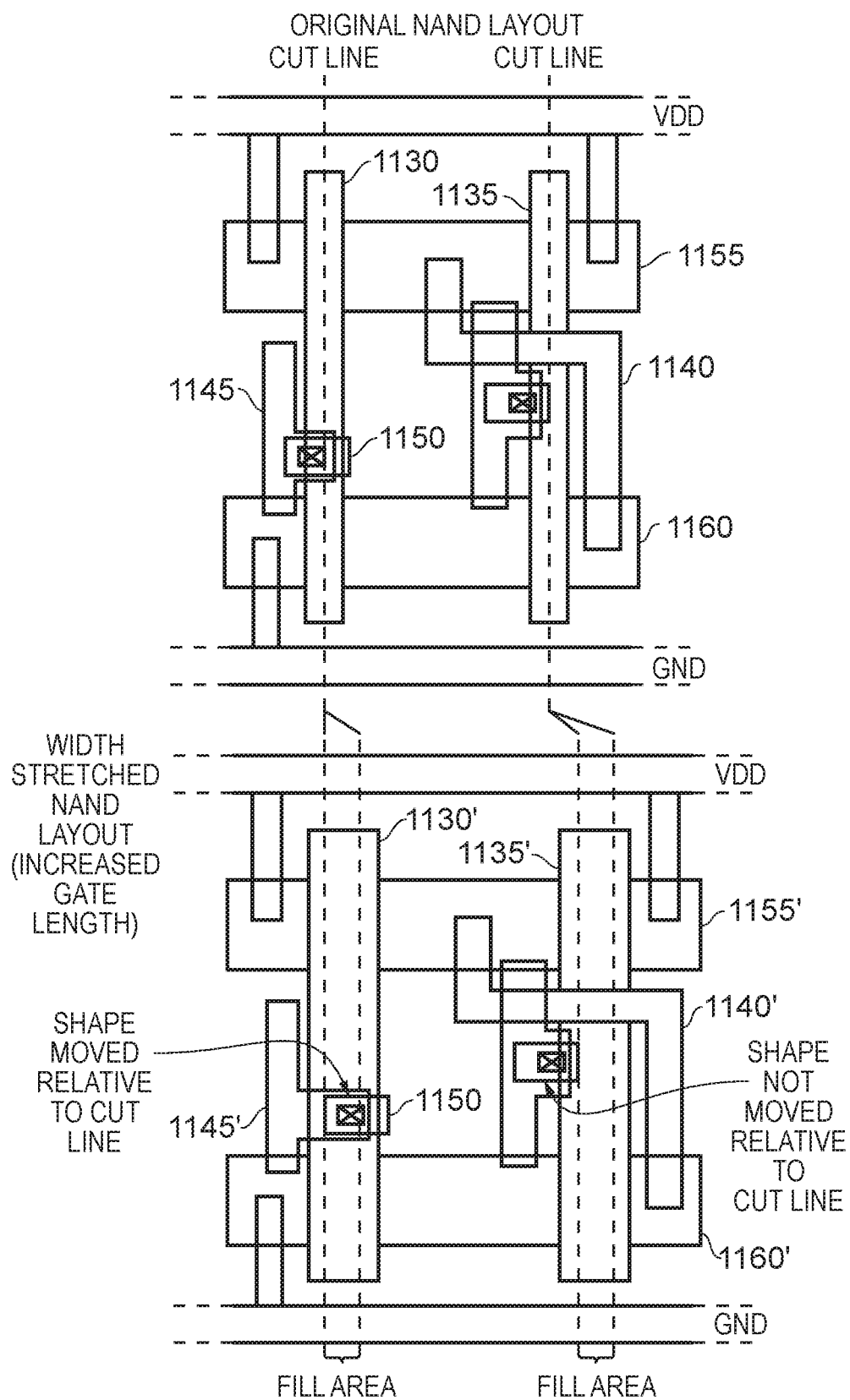
Figure 19B:
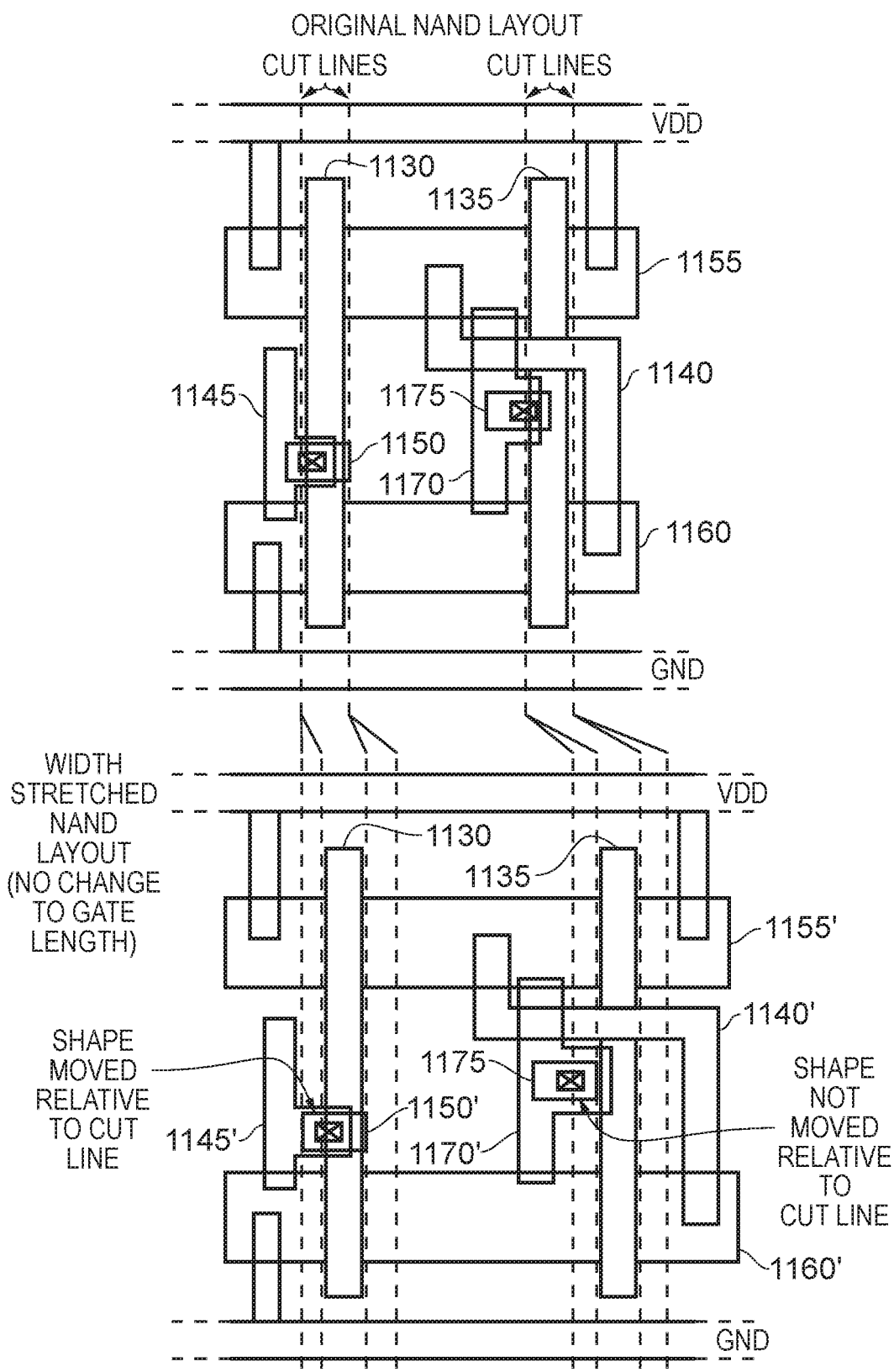

FIGS. 18A and 18B show examples where the cell height is increased. FIGS. 19A and 19B show examples where the cell width is increased. In this example, an original NAND layout is considered, and in FIG. 19A the cut lines are placed down the middle of the polysilicon layers 1130 and 1135. The diffusion regions are shown by the boxes 1155 and 1160, and the output connection line is shown by the connection area 1140. The input connection pin 1150 is also shown, as is the associated metal connection 1145.

The lower half of FIG. 19A shows the result of stretching the cell in the cell's width dimension around the cut lines. Both of the polysilicon layers 1130' and 1135' have an increased length and the diffusion regions 1155' and 1160' are also extended. In addition, the output connection 1140' is extended. The leftmost input connection is also altered. However, the connection contact 1150 is a fixed size structure that must be maintained at that size in order to avoid violating certain design rules. As a result, the entire pin connection 1150 is moved but is not stretched. In contrast, the actual metal connection 1145' is stretched.

The reason that the contact 1150 is moved is because the left hand side cut line cuts through that contact by more than a predetermined extent. In one embodiment, this predetermined extent is set such that if the contact is predominantly to the right of the cut line, it will be moved, whereas if the contact is predominantly to the left of the cut line it will not be moved. This is the reason why the second contact on the right hand side of FIG. 19A is not moved relative to the second cut line.

FIG. 19B illustrates the same original NAND layout, but indicates four sets of cut lines, placed at each side of the polysilicon tracks 1130, 1135. As a result, when the cell is stretched, the length of the polysilicon tracks 1130 and 1135 is unchanged. However, the various metal layers 1140', 1145' and 1170' are stretched. Again the contact 1150' is moved due to it being predominantly to the right of the leftmost cut line. However the contact 1175 is not moved relative to the cut line that intersects it, since it is predominantly to the left of that cut line.

By adopting the approach of FIG. 19A, resulting in longer length polysilicon tracks, this provides the transistors with larger gates and hence reduced leakage power. By increasing the pitch of the transistors (the distance between the centre lines of adjacent polysilicon tracks), which is achieved in both FIGS. 19A and 19B, this results in improved performance.

The above described mechanism provides a very flexible and efficient mechanism for stretching cells. There are a number of reasons why it may be useful to stretch cells. One particular example is when the standard cells are used in the generation of tiles for use in designing memory devices. It has typically been the case that the tiles have to be custom designed, given the custom size of the bit cells contained within the bit cell arrays. In particular, memory array tiles will be designed containing the memory bit cells, and any tiles that are to be positioned adjacent such tiles will need to match the width of those tiles, which is dependent on the custom size of the bit cells.

However, in accordance with the technique to be described later herein, the standard cells in a standard cell library can be resized using the above described technique in order to produce standard cells whose height is such that a predetermined multiple of the standard cell row height matches the width of the memory array tile, thus enabling certain tiles, or at least portions of those tiles, to be constructed using standard cell components. This significantly increases the speed with which memory tiles can be designed.

As discussed earlier with reference to FIG. 13, the standard cell generator 930 receives three inputs that it uses when generating the layout for a desired cell. In particular, it receives the sized schematic generated by the schematic sizer 905 for the desired cell, as well as receiving a technology independent representation of the required standard cell from the database 925. Further, it receives layout information for the selected archetype layout of the cell, as indicated by the box 935 in FIG. 13. In one embodiment, this information actually comprises the archetype layout itself, and the standard cell generator employs a novel compaction algorithm in order to generate the cell layout from these three inputs. In particular, in one embodiment, the compaction technique adopted is as illustrated in the flow diagram of FIGS. 20A to 20C.

Figure 20A:
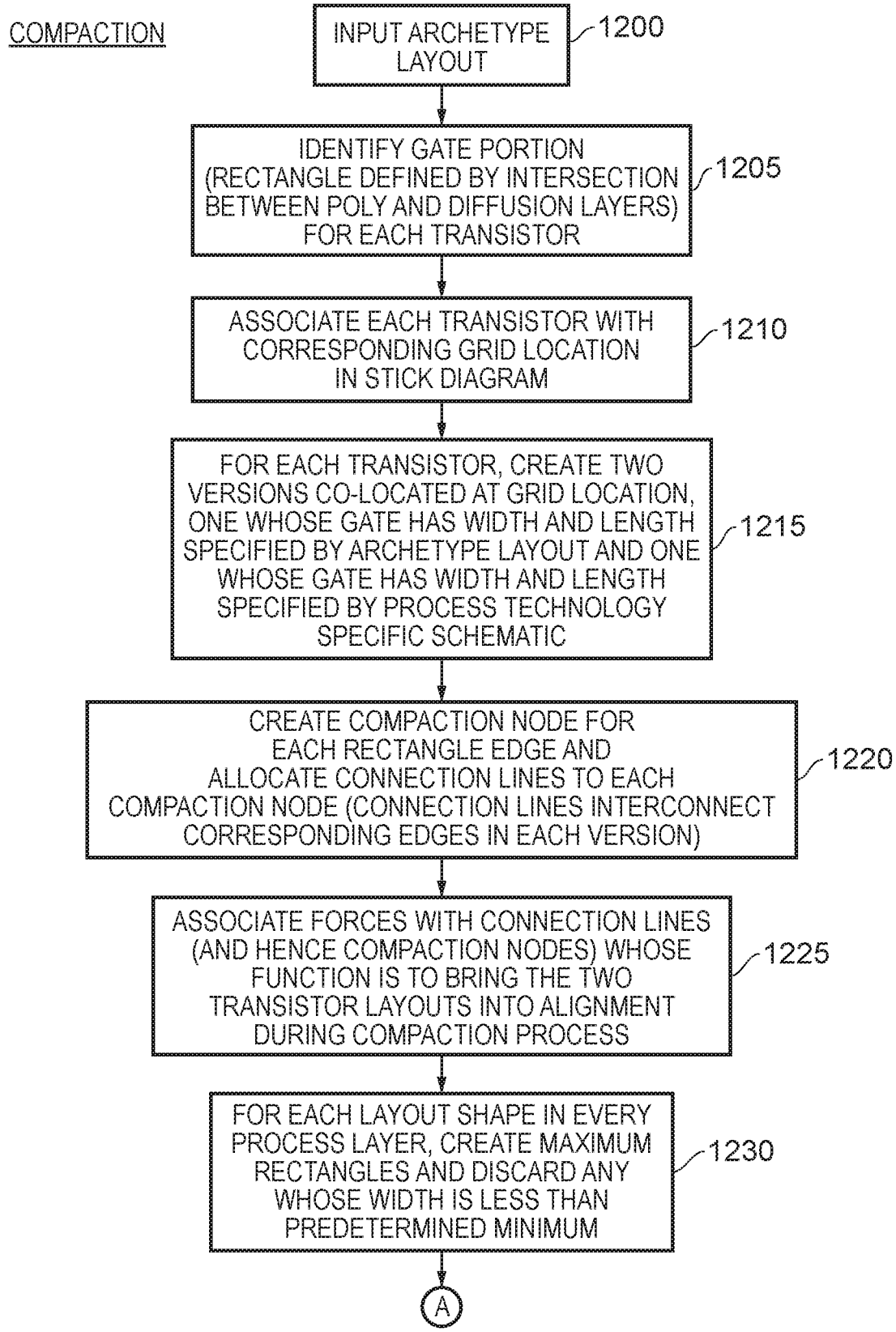
FIGS. 20A to 20C are flow diagrams illustrating a compaction operation performed within the cell layout generation stage of FIG. 12 in one embodiment in order to generate the cell layout.
Figure 20B:
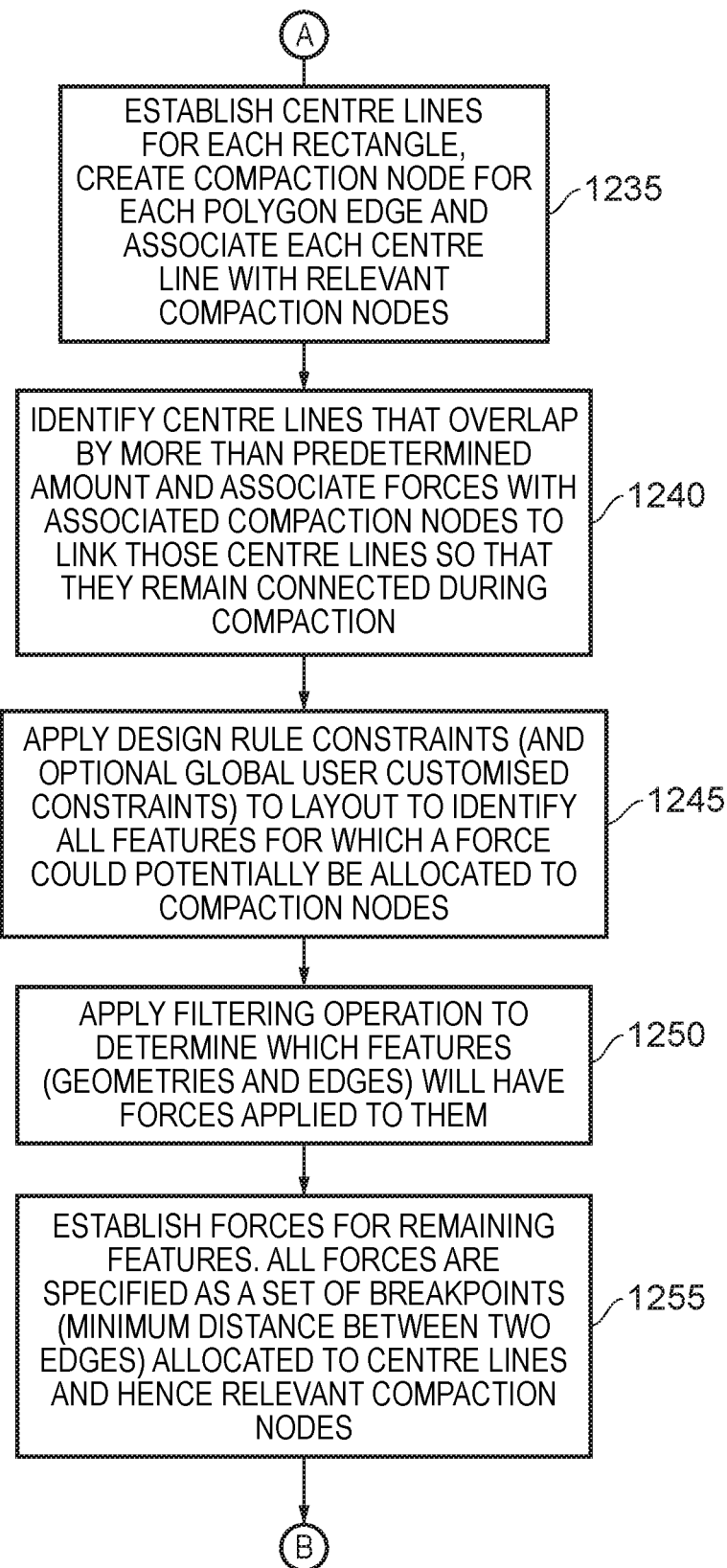
Figure 20C:
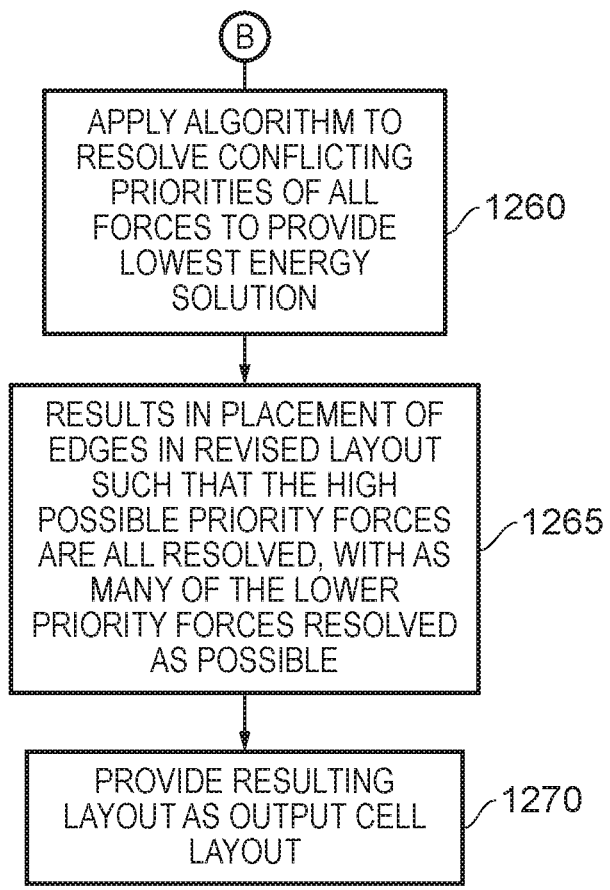

As shown in FIG. 20A, at step 1200 the archetype layout is input to the standard cell generator, whereafter at step 1205 the gate portion of each transistor is identified. In particular, for each transistor, the process identifies the rectangle that is defined by the intersection between the relevant polysilicon layer and the relevant diffusion layer.

Thereafter, at step 1210 each transistor is associated with a corresponding grid location in the stick diagram received from the database 925. By way of example, if the earlier stick diagram of FIG. 3 is considered, it can be seen that the relevant grid locations for the four transistors are the grid locations 1212, 1214, 1216, and 1218.

Figure 21A:
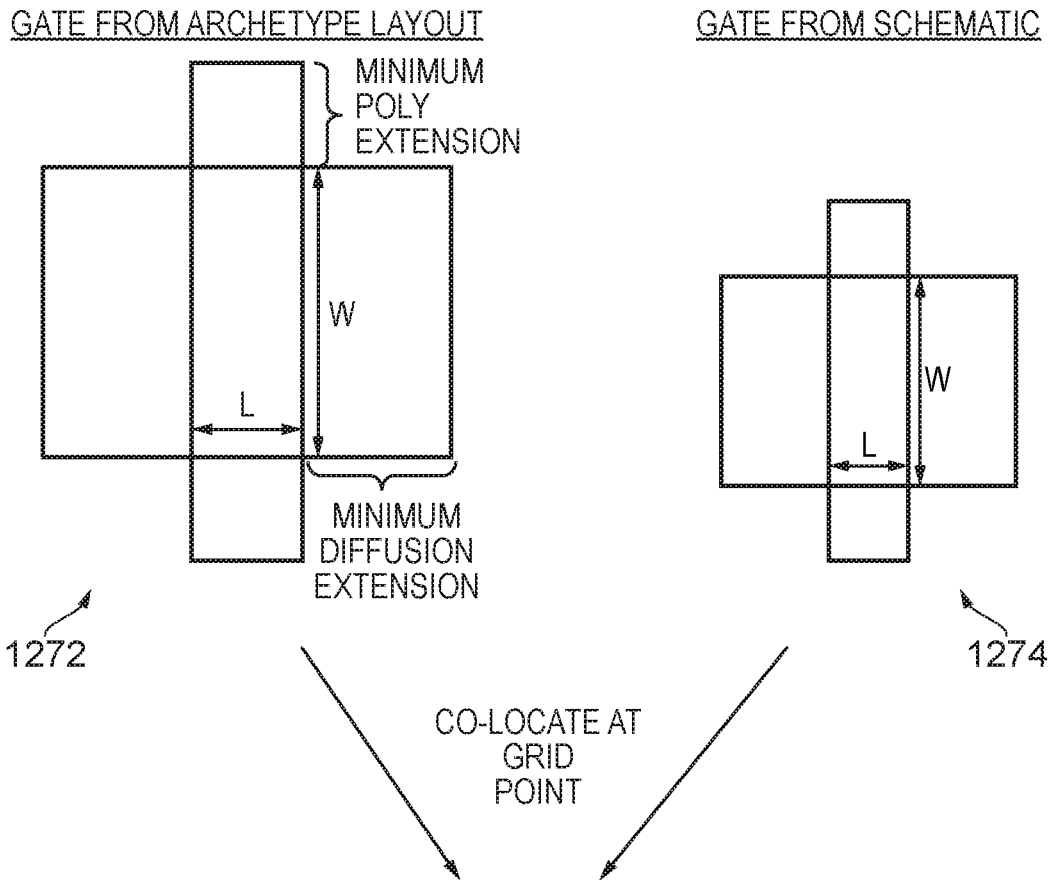
FIGS. 21A to 21C illustrate performance of some of the steps within FIGS. 20A to 20C, for some example layout shapes.
Figure 21A:
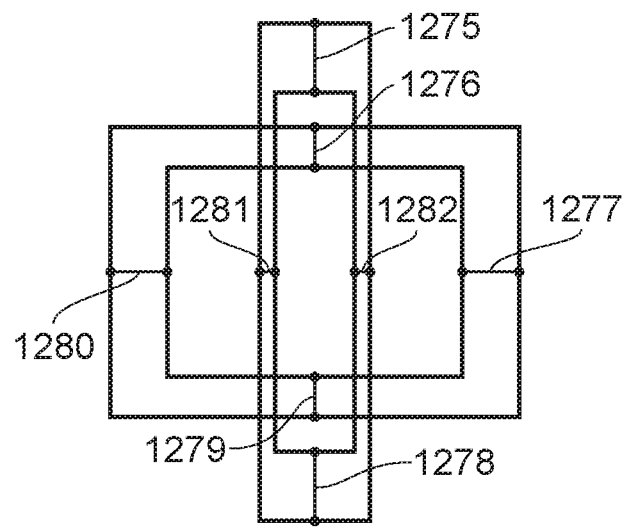

Then, at step 1215 the compaction operation creates two different versions of the transistor to be co-located at the corresponding grid location, these two versions providing two candidate layout patterns. In particular, a first candidate layout pattern is one whose gate has a width and length specified by the archetype layout, and the other candidate layout pattern is one whose gate has a width and length specified by the process technology specific schematic received as an input to the standard cell generator. This is illustrated schematically by way of example with reference to the top half of FIG. 21A, where the first candidate layout pattern takes the form 1272 shown in FIG. 21A and the second candidate layout pattern takes the form 1274. As can be seen, both candidate layout patterns include the rectangle representing the gate, having the W and L dimensions shown in the Figure, along with associated rectangles showing the minimum polysilicon extensions and minimum diffusion extensions required. As mentioned earlier, it will typically be the case that the archetype layout is designed so as to have the maximum diffusion layer width, and hence typically the corresponding gate layout obtained from the sized schematic will be smaller than the gate layout obtained from the archetype layout, as is the case in examples 1272, 1274 shown in FIG. 21A.

At step 1220, a compaction node is generated for each rectangle edge, and in addition connection lines are allocated to each compaction node in order to interconnect corresponding edges in each version of the transistor. Accordingly, as shown in the lower half of FIG. 21A, the connection lines 1275 to 1282 will be established connecting corresponding edges in both versions. At step 1225, forces are associated with each of the connection lines, and hence with each of the compaction nodes. These forces are chosen so as to pull the corresponding edges towards each other, with the function of these forces being to bring the two transistor layouts into alignment during the compaction process. In particular, during the compaction processing, a final layout for each transistor will be determined that will lie somewhere between the archetype layout pattern and the schematic layout pattern, with the final layout pattern being dependent on how these forces are resolved taking into account the forces associated with all the other compaction nodes formed by the compaction operation. These other compaction nodes will be described in more detail with reference to the remainder of FIGS. 20A to 20C.

Figure 21B:
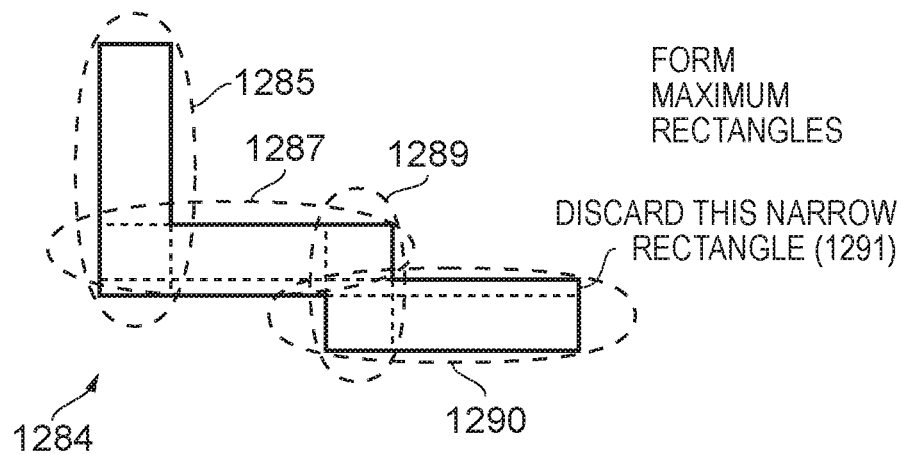
Figure 21B:
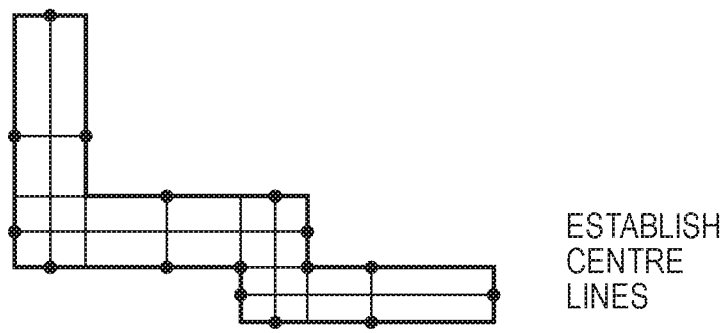
Figure 21B:
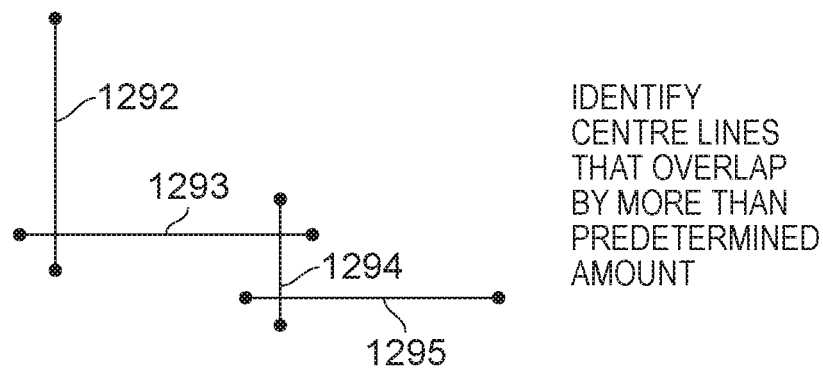

At step 1230, for each layout shape in every process layer maximum rectangles are created, this process being shown schematically in the upper figure of FIG. 21B for the example layout shape 1284. As shown schematically, the process of creating maximum sized rectangles results in the generation of the four rectangles encircled by the dotted lines 1285, 1287, 1289, 1290. In addition, a fifth maximum rectangle 1291 is generated which is very thin. In one embodiment, any rectangles whose width is less than a predetermined minimum is discarded, and in this example the rectangle 1291 will be discarded. Such an approach prevents slivers smaller than minimum width from forming a connected wire segment, by setting the minimum width of the rectangles equal to the minimum wire width of the process layer under consideration.

At step 1235, centre lines are then established for each rectangle, and compaction nodes are created for each polygon edge, in this example each rectangle edge. Further, the centre lines are associated with the relevant compaction nodes. This process is shown schematically in the middle figure of FIG. 21B, where it can be seen that for each of the four maximum rectangles, centre lines are established, and those centre lines are associated with compaction nodes associated with each of the edges. In the Figure, the compaction nodes are schematically illustrated by the dots provided halfway along each edge, and accordingly it can be seen that each centre line extends between two compaction nodes.

At step 1240, the centre lines that overlap by more than a predetermined amount are identified. This is shown by way of example with reference to the bottom figure of FIG. 21B, where the four centre lines 1292, 1293, 1294 and 1295 each overlap by more than a predetermined amount. Once these groups of centre lines have been identified, then forces are associated with those centre lines, and hence the associated compaction nodes, the purpose of those forces being to link the centre lines so that they remain connected during the compaction process. The minimum size and overlap of the centre lines before such a linking will occur may be user controlled through the technology file provided as an input to the cell generation process. Such a technology file is shown by the file 825 in FIG. 12 discussed earlier which, in addition to being used by the schematic sizer stage 820 as shown in FIG. 12, could also be referenced by the cell layout generation stage 840.

At step 1245, the design rule constraints are applied, along with any optional global user customized constraints, to the various layout features in order to identify all features for which a force could potentially be allocated to the corresponding compaction nodes. At this stage, a wide variety of different constraints could be identified, for example intra-rectangle constraints related to minimum width and minimum area considerations, overlap constraints, for example the degree to which a metal layer needs to overlap a via, and/or boundary condition constraints relating for example to fixing power rail locations, or setting the minimum space to the edge of the cell equal to a certain ratio of the minimum spacing for a layer, for example 0.5 times the minimal spacing for a layer. In addition, they may identify spacing constraints, for example minimum spacing within or between layers. All of these constraints could then be represented by forces associated with connection lines interconnecting compaction nodes.

However, in one embodiment, rather than producing a force to represent every single constraint identified at step 1245, a filtering operation is instead applied at step 1250 to determine which subset of features (i.e. which subset of geometries and edges) will have forces applied to them for resolving during the compaction operation. The list of requirements used to pick/filter specific geometries can be varied dependent on embodiment, but some non-limiting considerations that can be taken into account during the filtering operation include:

the relative size (width, height) of the shape;
whether the shape is a tip, joint, or internal edge;
which layer the geometry is contained within;
the position of the shape, either in absolute terms, or relative to an edge of the cell;
the layout context, including for example the presence or absence of geometries on the same or different layers, again in absolute terms, or relative to the location of the shape in question (this filtering approach hence taking account of neighbouring shapes and geometries);
the net number or net type of the geometry (for example input, output, internal, power, ground, etc.).

As mentioned earlier, a number of user customized constraints can also be specified to enable the user to create custom requirements, and again those requirements could be subjected to the filtering operation. If they pass the filtering operation and remain, then a custom force specified by the user can then be associated between any two arbitrary edges by associating that force with a connection line between those two arbitrary edges.

As shown at step 1255, following the filtering operation forces are established for all remaining features. In one embodiment, all forces are specified as a set of breakpoints (specification of a minimum distance between the edges) from one edge to another edge, by allocating the breakpoints to the centre lines and hence the relevant compaction nodes. In one embodiment, the breakpoints include not only an identification of the force, but also a priority to be associated with the force, the priority indicating how important it is to reach the associated breakpoint. It should be noted that the minimum distance specified can be negative, to enable maximum distance forces to be specified by simply reversing the direction of the force (swapping the edges) and making the breakpoint distance negative. For example, a spacing rule might have priority infinity to reach a distance of 10 nm, but a priority of 100 to reach a distance of 11 nm and a priority of 10 to reach a distance of 15 nm. Note that in this example the higher priority number means a higher priority.

Figure 21C:
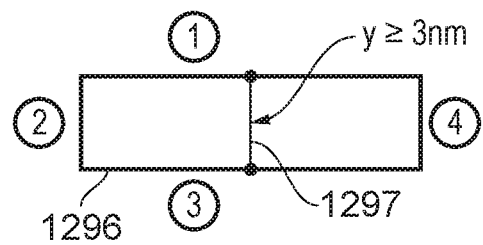

A particular example of associating a set of breakpoints with a particular centre line between compaction nodes is shown in FIG. 21C. In particular, the centre line 1297 connecting the compaction nodes 1 and 3 can have a set of breakpoints associated therewith identifying the various forces. As shown, each force specifies a minimum distance and an associated priority. In this example, it is a relatively high priority for the distance y to be greater than or equal to 3 nm, but a slightly lower priority for the distance to be greater than or equal to 4 nm, and an even lower priority for the distance to be greater than or equal to 5 nm.

Once all of the various forces have been allocated in association with compaction nodes, then a compaction algorithm is applied at step 1260 to resolve all of the conflicting priorities of all of the forces in order to provide the lowest energy solution. There are a number of suitable algorithms to be used in this instance, one example being a linear programming algorithm.

The application of the algorithm at step 1260 results, as shown at step 1265, in the placement of the edges in a revised layout such that the highest possible priority forces are all resolved, with as many of the lower priority forces resolved as possible. This resulting layout is then output at step 1270 as the cell layout generated by the standard cell generator 930.

From the above discussions, it will be appreciated that the compaction approach described enables the cell layout generation stage 840 of FIG. 12 to implement a layout optimization engine that converts a starting layout (namely the archetype layout) into a new layout that has been optimized for a potentially unlimited number of competing layout requirements. This can for example be used to determine the optimum layout for DFM (Design for Manufacturability) purposes, by resolving the multiple conflicting DFM rules. The number of conflicting trade offs for DFM may be extremely large, and accordingly the above layout optimization technique improves both the throughput of the cell library design, as well as the overall quality of the final layout, in particular for DFM.

Whilst in one embodiment the standard cell generator uses the above described compaction mechanism, in an alternative embodiment it may use an alternative mechanism. For example, in one embodiment it may use the mapping database approach described earlier. In particular the approach of FIGS. 7 and 10A to 10C may be used in order to generate mapping database entries from the input archetype layout, and thereafter those mapping database entries may be used in combination with the relevant stick diagram and sized schematic when generating the cell layout.

Figure 22A:
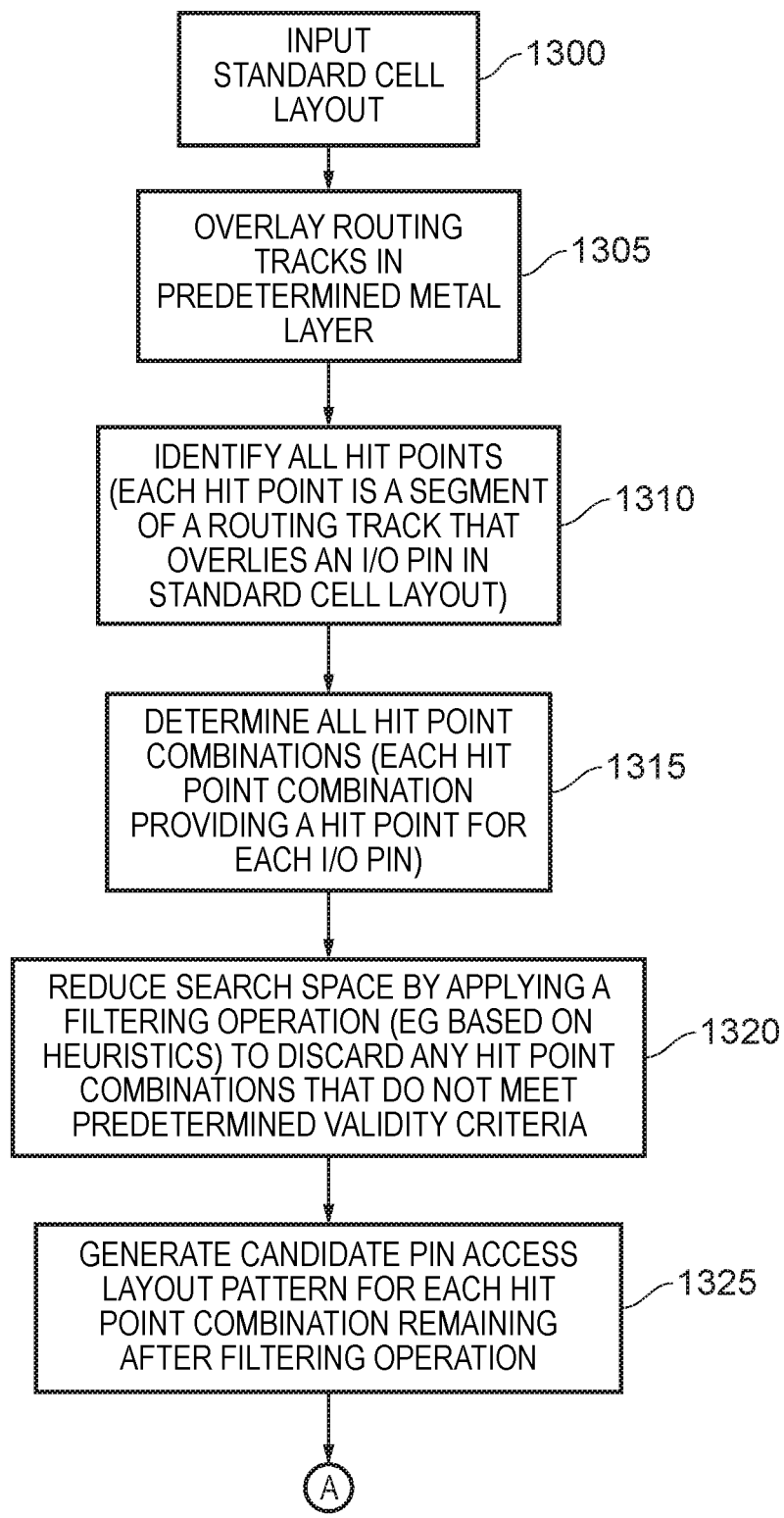
FIGS. 22A and 22B provide a flow diagram illustrating a method performed in accordance with one embodiment in order to generate an indication of valid pin access layout patterns for a layout of a cell.
Figure 22B:
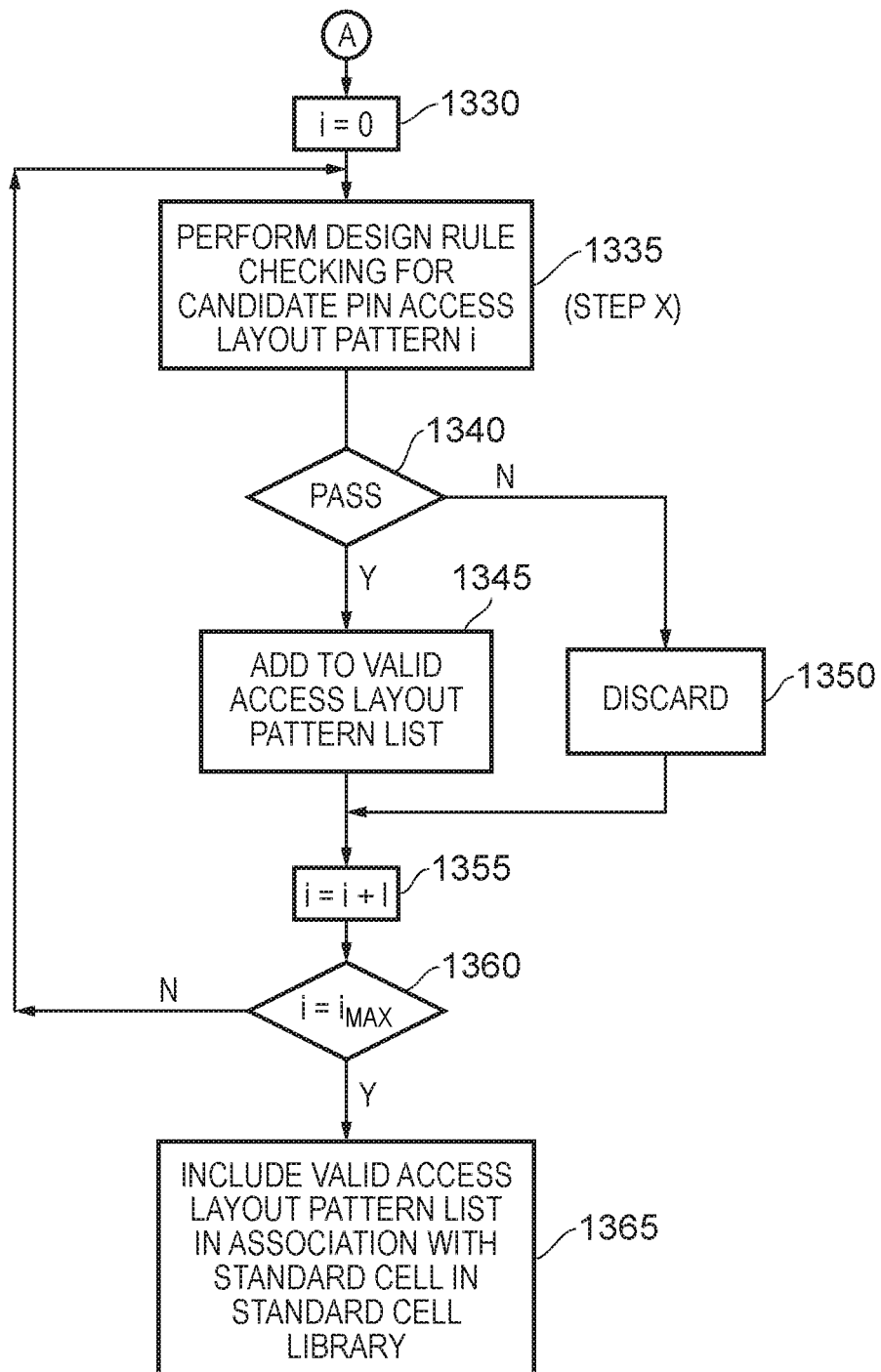

When using cells in the design of integrated circuits, the cells will often include input/output (I/O) pins within a particular process layer, and pin access connections will need to be made to those I/O pins in order to enable signals to be input to, and output from, the components defined by those cells during operation of the integrated circuit. FIGS. 22A and 22B form a flow diagram describing a computer implemented method performed in accordance with one embodiment in order to generate an indication of valid pin access layout patterns for a layout of a cell defining a circuit component, in order to provide an indication of the likelihood that, when that cell is subsequently used within an integrated circuit, a place and routing tool will be able to find a suitable pin access layout pattern to use, having regards to the arrangement of the surrounding cells in the integrated circuit. At step 1300, a standard cell layout is received. This standard cell layout will define layout patterns for a number of process layers, including an I/O pin layout pattern within a particular process layer. In one embodiment the I/O pin layout pattern will be provided in the metal 1 process layer.

In step 1305, routing tracks are provided extended through the cell in an overlying process layer. In one particular embodiment, the routing tracks are formed by a series of parallel tracks extending across the cell in a metal 2 layer used to provide pin access connections. Whilst, in principle, the pin access connections can be provided along any of the routing tracks, it is often the case that other connections will also be provided in this process layer, and accordingly will already occupy portions of the routing tracks. For example, it is known to provide cell connections using wires in the metal 2 process layer.

At step 1310, all hit points are identified for the cell. A hit point is a segment of a routing track that overlies an I/O pin in the standard cell layout, and which is not already used for other connections, such as the earlier-mentioned cell connections.

Figures 24A, 24B:
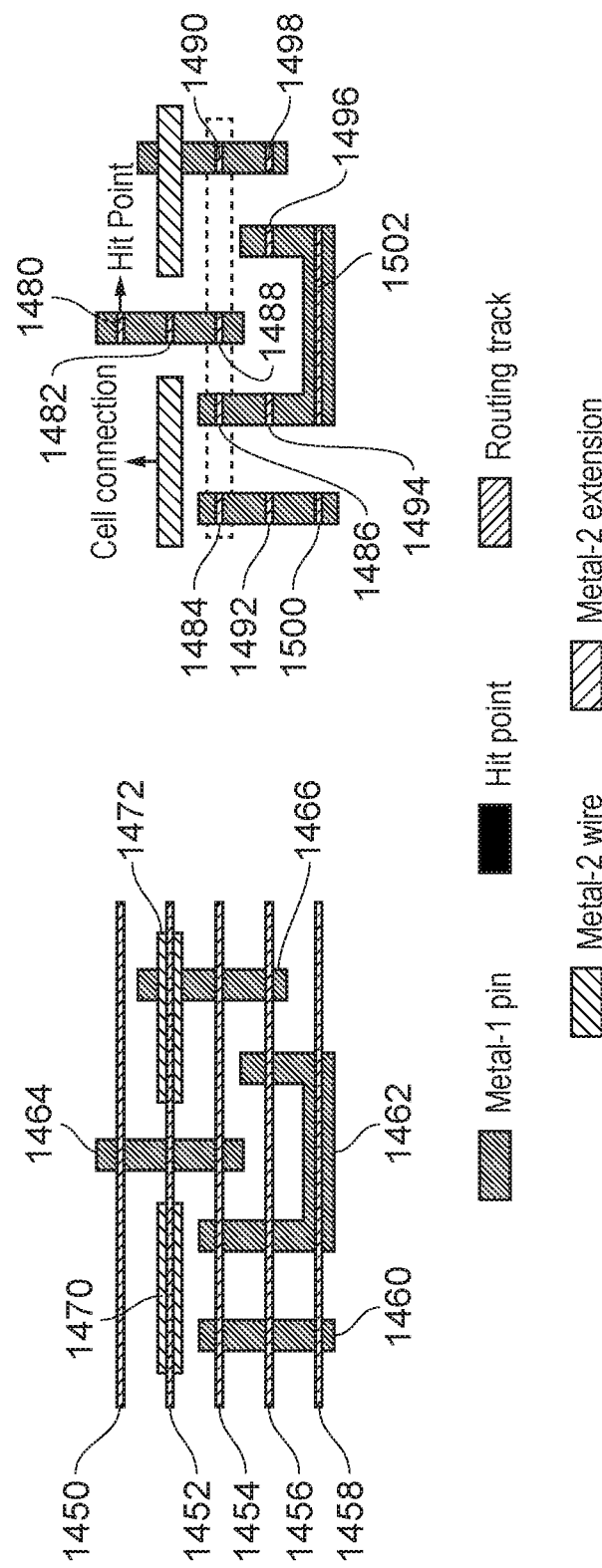
FIGS. 24A and 24B illustrate how a plurality of hit points are detected for a cell in accordance with one embodiment.

The process of step 1305 and 1310 is illustrated schematically, by way of example, with reference to FIGS. 24A and 24B. In particular, FIG. 24A shows an arrangement of I/O pins 1460, 1462, 1464, 1466 provided in the metal 1 process layer of a cell. At step 1305, a series of routing tracks 1450, 1452, 1454, 1456, 1458 are overlaid on the cell in the metal 2 layer. In this example cell, it is assumed that the metal 2 layer already includes the cell connections 1470, 1472.

Accordingly, when performing step 1310 to identify all the hit points, the hit points 1480, 1482 1484, 1486, 1488, 1490, 1492, 1494, 1496, 1498, 1500, 1502 are identified, as shown in FIG. 24B. As will be apparent from FIG. 24B, for most hit points the length of that hit point is decided by the minimum width of the metal 1 I/O connections. However, in situations where the metal 1 wires are running horizontally in the configuration shown in FIG. 24B, this can lead to a relatively long hit point, such as the hit point 1502, which allow significantly more flexibility for positioning of a via to be used to connect the I/O pin in metal 1 with an overlying routing track in metal 2.

Hence, it can be observed that each hit point determines the range of positions for the corresponding via to be provided between the metal 1 and metal 2 process layers in order to establish connections between the I/O pins and the pin access connection wires in the metal 2 layer.

At step 1315, all possible hit point combinations are determined, where each hit point combination provides a hit point for each I/O pin. Hence, considering the example cell shown in FIGS. 24A and 24B, it can be seen that there are four I/O pins, and accordingly each hit point combination will identify four hit points.

It will be appreciated that potentially a very large number of hit point combinations will be determined at step 1315. However, it is often the case that, based on even rudimentary knowledge of the process technology that will be used to instantiate the circuit component defined by the cell, certain hit points will never provide a valid position for providing a via between the I/O pin and a pin access connection wire. For example, the hit point 1482 shown in FIG. 24B will be one such hit point, which will be unable to be used to provide a connection between the I/O pin 1464 and a pin access connection in the metal 2 layer, due to the presence of the cell connections 1470 and 1472 on either side of that hit point.

Accordingly, at step 1320, a filtering operation is performed in order to reduce the search space so as to discard any hit point combinations that do not meet predetermined validity criteria. In particular, hit points that will not be usable will be identified, and any hit point combinations including one or more of those hit points is discarded.

The predetermined validity criteria can be established in a variety of ways, but in one embodiment the predetermined validity criteria is established using heuristics. In U.S. Provisional Patent Application No. 61/906,237, two examples of predetermined validity criteria are set out in section 5. In particular, if a hit point combination includes two hit points which are close together and on the same track, then that same hit point combination is discarded. As another example of a predetermined validity criteria, any metal 2 wires provided for cell connection will invalidate a hit point which is covered by or is close to them on the same track.

As a result of applying the filtering operation at step 1320, this removes a significant number of the hit point combinations, and thereafter in one embodiment candidate pin access layout patterns are generated for each hit point combination after the filtering operation, as illustrated by step 1325.

In addition to identifying a hit point for each I/O pin, each hit point combination will also identify an access direction for provision of an associated pin access connection to each hit point along the associated routing track. This information enables the associated candidate pin access layout pattern to be generated at step 1325, as illustrated schematically for the example cell layout shown in FIG. 25A. In particular, in this example, the four hit points 1510, 1514, 1518, 1522 form a hit point combination, the hit point combination identifying that the hit points 1510, 1514, 1518 should be accessed from the right, and that the hit point 1522 should be accessed from the left. As a result, the candidate pin access layout pattern includes the pin access connections 1512, 1516, 1520, 1524.

Considering now FIG. 22B, the process proceeds to step 1330, where a parameter i is set equal to zero. Thereafter, at step 1335, design rule checking is performed for the candidate pin access layout pattern i in order to establish whether the design rules applicable to the particular process technology that will be used to construct the circuit component defined by the cell are satisfied by the candidate pin access layout pattern. At step 1340, it is checked whether the design rules have been passed, and if so the candidate pin access layout pattern i is added to a valid access layout pattern list at step 1345. Otherwise, that candidate pin access layout pattern is discarded at step 1350 and not added to the list. Thereafter at step 1355, the parameter i is incremented, and it is then determined that step 1360 whether all candidate pin access layout patterns have been analysed. If not, the process returns to step 1335 to perform design rule checking on the next candidate pin access layout pattern. Once all candidate pin access layout patterns have been checked, the resultant valid access layout pattern list can be output. In one embodiment, this involves including the valid access layout pattern list in association with the standard cell in the standard cell library at step 1365. Alternatively, information derived from that valid access layout pattern list can be included in the standard cell library instead of the valid access layout pattern list itself. For example, instead the valid access layout pattern list can be used to identify the invalid layout patterns, and the invalid layout patterns can be identified in the standard cell library so that when a place and route tool subsequently seeks to find a suitable pin access layout pattern with regards to how the cell is used within an integrated circuit, it does not need to check any of the invalid access layout patterns identified in the list.

In an alternative embodiment, the valid access layout pattern list is not included in the standard cell library, but instead standard cells are only added to the standard cell library if the number of valid access layout patterns determined is above a certain threshold, hence providing the required level of confidence that the place and route tool with later be able to find a suitable connection pattern.

In accordance with one embodiment, an optimisation to the design rule checking process is performed in order to seek or convert what may otherwise be invalid pin access layout patterns into valid ones by modifying the layout in the metal 2 layer. This process is illustrated schematically in FIG. 23 and can be used to replace steps 1335 and 1340 of FIG. 22B. At step 1400, the design rules are identified for a target process technology, for example the earlier mentioned SADP process technology. At step 1405, the design rules are converted into a series of linear constraints. This can be achieved in a variety of ways, but a particular example is described in section 4.3.2 of U.S. Provisional Patent Application No. 61/906,237. It should be noted that for SADP some of the design rules are not themselves linear, see for example the last three design rules including the "or" statement at the top of the right hand column in section 4.3.2. However, as discussed in section 4.3.2, those design rules can still be converted into a series of linear constraints.

At step 1410, a function is established to be solved, such a function being illustrated for example by equation 1 in section 4.3.2 of U.S. Provisional Patent Application No. 61/906,237. That particular example function is aimed at minimising the extensions added to layout in the metal 2 layer in order to meet the design rules. For a candidate pin access layout pattern that already meets the design rules, it will be appreciated that that function will be solved with a value of zero, i.e. no extensions will be needed. Conversely, if no adjustments to the layout serve to solve the function having regards to the design rules, then it will be concluded that that candidate pin access layout pattern is invalid, and it will be discarded.

Figures 25A, 25B:
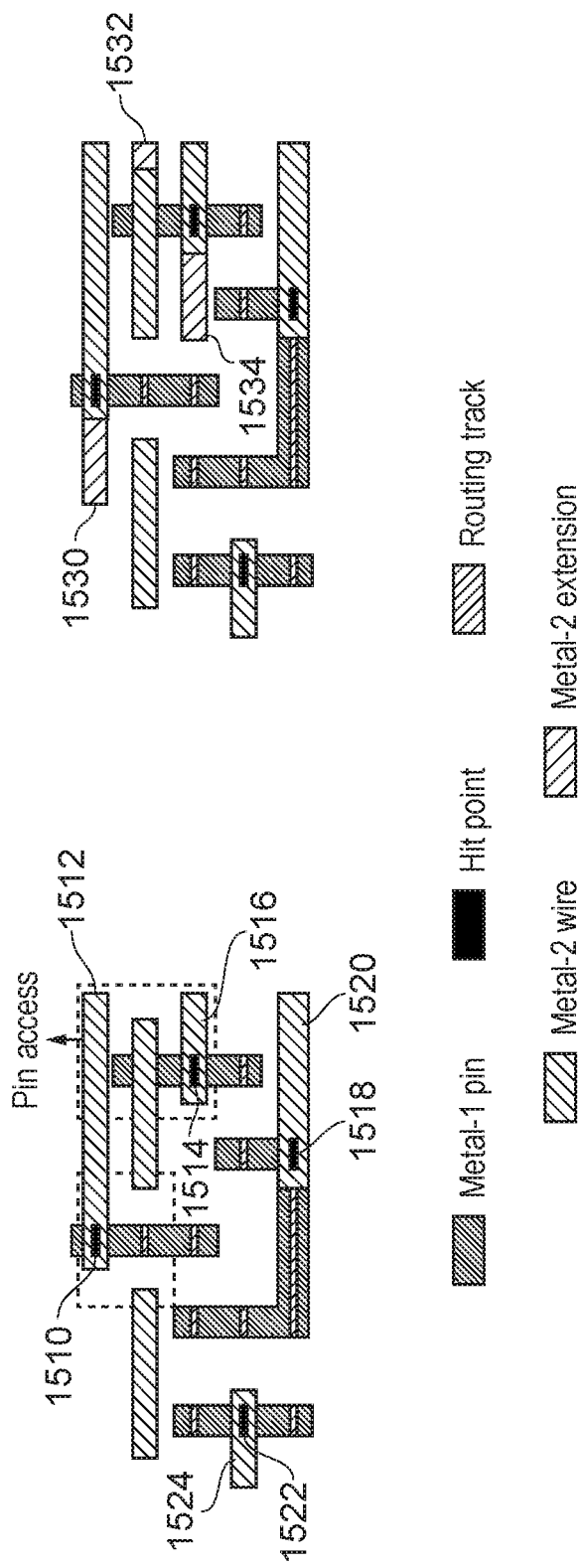
FIG. 25A illustrates a candidate pin access layout pattern produced for an example hit point combination in accordance with one embodiment.
FIG. 25B illustrates some modifications that may be made to the candidate pin access layout pattern during the performance of the modified design rule checking process of FIG. 23 in accordance with one embodiment.

In particular, at step 1415 a process seeks to solve the function for the candidate pin access layout pattern i having regard to the linear constraints in order to generate an output candidate pin access layout pattern i. For situations where the pin access layout pattern i already meets the design rules, the output candidate pin access layout pattern i will be unchanged. However, for some candidate pin access layout patterns that themselves do not meet the design rules, a modified version may be generated as the output candidate pin access layout pattern, such that the output candidate pin access layout pattern does meet the design rules. An example of this is shown in FIG. 25B. In particular, the candidate pin access layout pattern shown in FIG. 25A does not meet the design rules for SADP. For example, the two dashed boxes in FIG. 25A denote pairs of line ends that cause hot spots in trim mask designs when using SADP technology. However, by adding the line end extensions 1530, 1532, 1534 illustrated in FIG. 25B, those hot spots can be fixed in the trim mask design, thereby allowing the candidate pin access layout pattern to satisfy the design rules. Accordingly, at step 1415, the input candidate pin access layout pattern shown in FIG. 25A will be modified to form the output candidate pin access layout pattern shown in FIG. 25B.

At step 1420, it is then decided that the design rules are passed if an output candidate pin access layout is produced. Conversely, if the function cannot be solved, then no output candidate pin access layout pattern will be generated, and the input pin access layout pattern will be considered to have failed and will be discarded.

Returning to FIG. 22B, all output candidate pin access layout patterns generated will be added to the valid access layout pattern list at step 1345.

Figure 23:
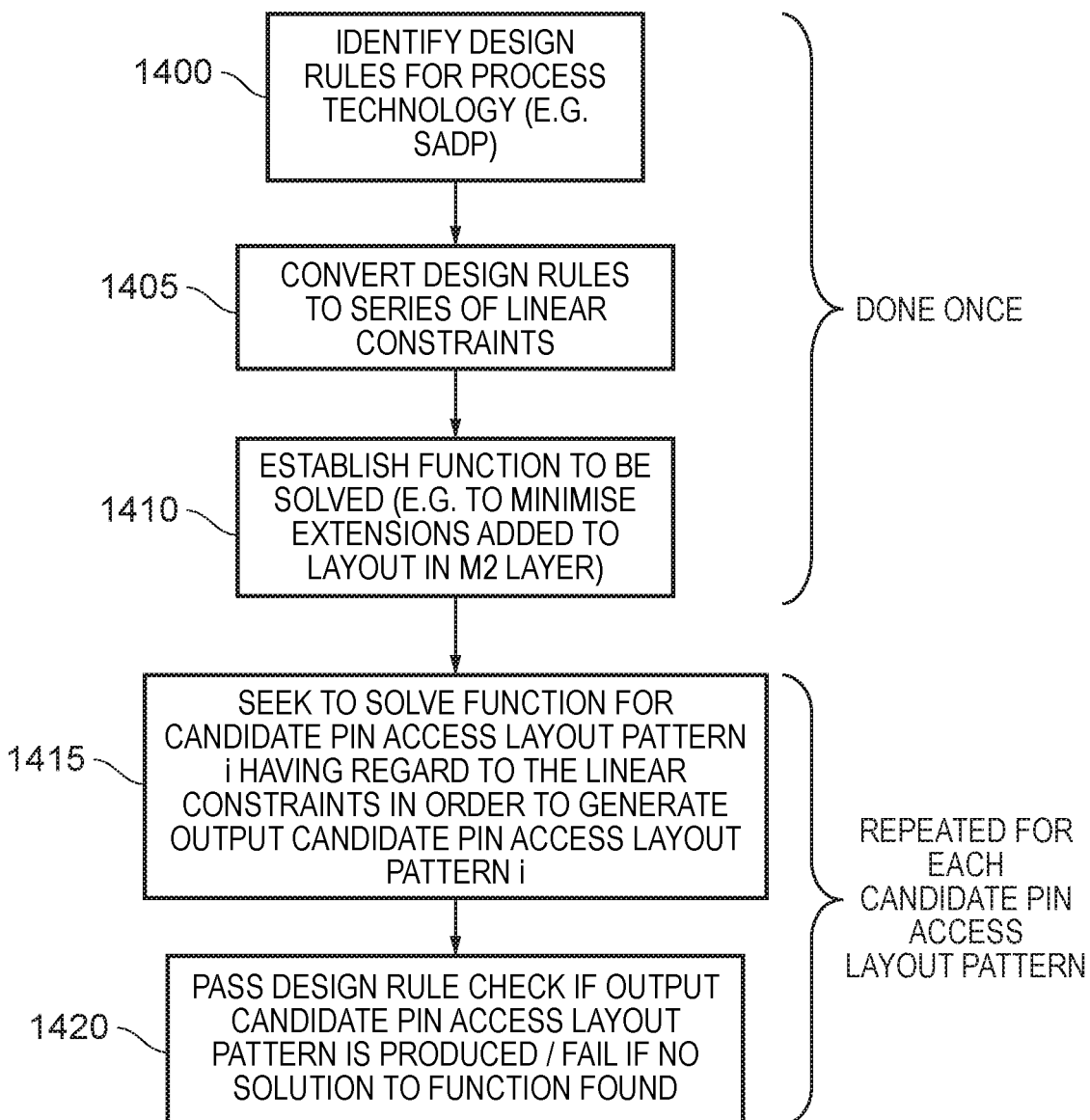
FIG. 23 describes a modified design rule checking operation that may be performed instead of steps 1335 and 1340 of FIG. 22B in accordance with one embodiment.

Hence, by the modified approach of FIG. 23, it is possible to increase the number of pin access layout patterns that are determined to be valid.

Figure 26A:
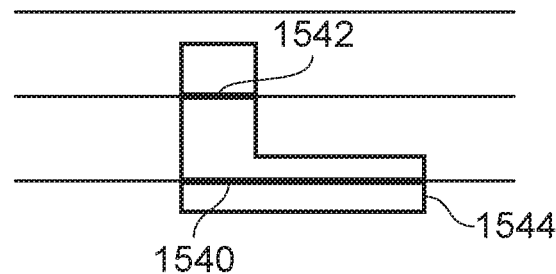
FIGS. 26A to 26C illustrate some example arrangements of routing tracks in accordance with different embodiments.

For the example discussed earlier with reference to FIGS. 24A to 25B, it is assumed that the routing tracks are arranged to run in parallel horizontally through the cell. Hence, as shown in FIG. 26A, for an I/O pin layout 1544, the routing tracks may give rise to the identification of the hit point 1542, 1540 (i.e. these are the segments of the routing tracks that overlap the I/O pin layout 1544).

Figure 26B:
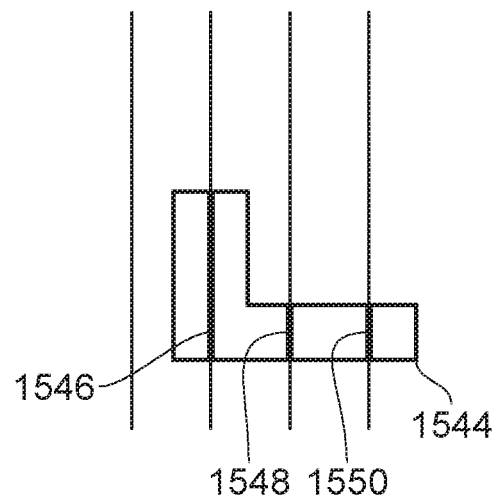

However, it is not essential for the routing tracks to be arranged in that way, and in an alternative embodiment the routing tracks may run vertically through the cell, when considering the cell orientation illustrated in FIGS. 24A to 25B. Hence, as shown by way of illustration in FIG. 26B, the vertically arranged routing tracks may give rise to identification of the hit points 1546, 1548, 1550 in association with the I/O pin 1544.

Figure 26C:
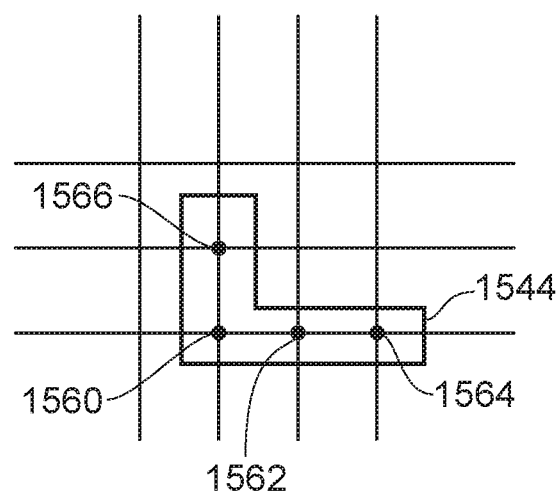

As a yet further example, the routing tracks may be formed by an array of routing tracks extending in two perpendicular directions through the cell. In such an arrangement, each hit point identifies where two crossing routing tracks overlap one of the I/O pins. This is shown by way of example in FIG. 26C, where the four hit points 1560, 1562, 1564, 1566 are identified in association with the I/O pin 1544.

In addition to determining valid pin access layout patterns, the above described checking methodology can also be extended to perform at least one additional layout check operation to determine whether the layout conforms to predetermined layout guidelines specified having regards to the target process technology, and to output log data to indicate if any layout guidelines are being violated.

The layout guidelines can take a variety of forms but in one embodiment may identify one or more restrictions on layout geometry in peripheral regions of the cell. Three such forms of layout guideline are illustrated schematically in FIG. 27, for the example of the cell 1570. In particular, in the peripheral region shown to the left hand side of the cell, three separate regions 1572, 1576, 1578 are identified. Associated with the region 1572 may be a guideline that identifies that at least one geometry must appear within that region. In this case, that guideline is satisfied by the presence of the example geometry 1594.

A second region 1576 may be defined identifying that no geometry must appear within this region. Again, this requirement is satisfied in the example shown since no geometry is shown within the region 1576.

As another example, a region 1578 may be established which has a restriction associated with it indicating that it is optional whether geometry appears in that region, but if a geometry does appear in that region it has to be wholly contained within that region. Such a requirement would be met by the geometry 1580. However, if the cell layout design included the geometry 1582, then this layout guideline would not be met, and could be identified in the output log data.

Figure 27:
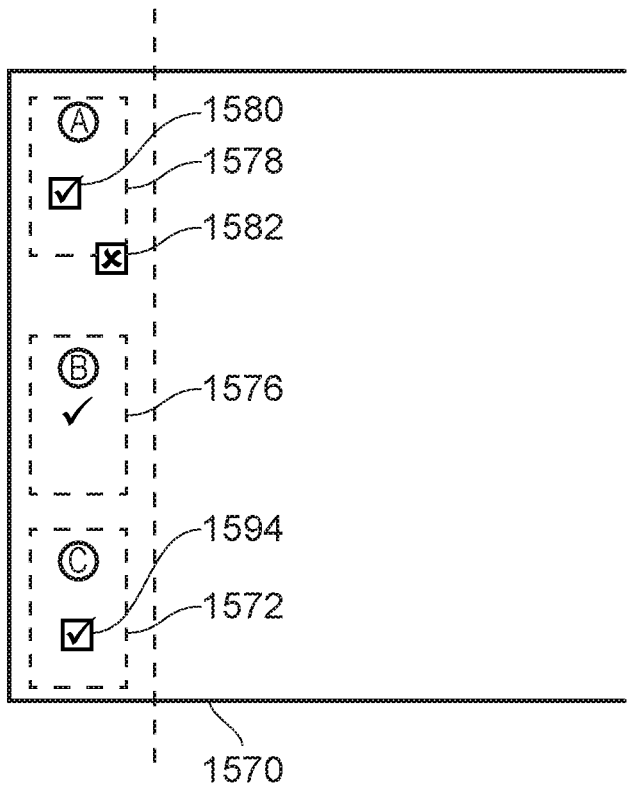
FIG. 27 illustrates some additional layout checks that may be performed in one embodiment to determine whether the layout conforms to predetermined layout guidelines specified having regards to a target process technology.

It will be appreciated that FIG. 27 merely illustrates some example layout guidelines that could be tested for, and that there may be many other types of layout guidelines that can be associated with peripheral regions of the cell. These layout guidelines can be established taking into account the various cells that may be placed in abutting contact with the cell being tested, and hence taking into account geometries that may be present in the peripheral regions of those cells.

By the above techniques, the above described methodology can analyse the layout to evaluate if it conforms to layout guidelines and check design rules that cannot be specified in traditional design rule checkers. Such an approach helps to ensure that, for any cells added to a cell library, those cells will interact with each other without creating design rule errors.

By using the above described techniques to analyse the cells for pin routability and layout guidelines ahead of time, the time to market can be potentially greatly improved by eliminating common errors that may otherwise occur during place and route operations. Further, when the cells can be guaranteed to have a certain level of pin routability, there is the potential that the place and route software can produce denser layout blocks because there is no need to insert additional spacing or change the optimal cell placement arrangement to achieve routing.

Figure 28:
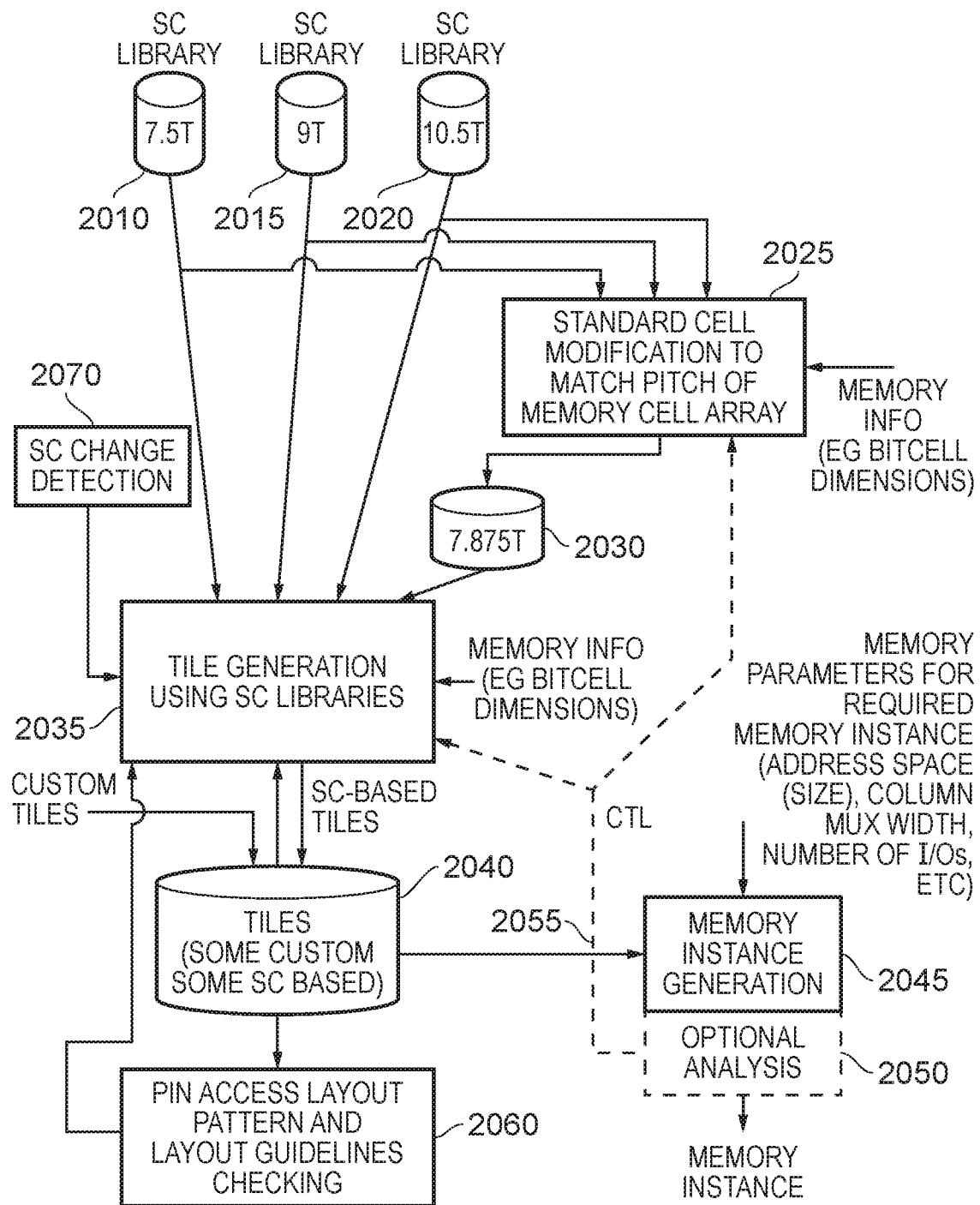
FIG. 28 schematically illustrates a method used to generate a memory instance in accordance with one embodiment.

FIG. 28 schematically illustrates a method of generating a memory instance defining the layout of a memory device, in accordance with one embodiment. A memory instance generation stage 2045 is used to generate a memory instance based on input parameters defining the required memory instance. These parameters may take a variety of different forms, for example specifying the address space and hence the size of the memory device required, as well as other required information such as the column multiplexer width, the number of input/outputs, etc. A memory instance generation stage 2045 refers to tiles within a tile database 2040, the tiles defining components sections for the memory device. In accordance with the described embodiments, while some of the tiles will be custom designed tiles, for example the tiles defining the array of bit cells, other tiles may be standard cell based tiles where at least a part of the tile comprises standard cells arranged in a plurality of standard cell rows to define components of the component section defined by that standard cell based tile.

The custom tiles are generated in the standard manner and inserted within the tiles database 2040. However, a tile generation stage 2035 is used to generate standard cell based tiles using standard cells from a number of standard cell libraries. In the example shown in FIG. 28, the tile generation stage has access to a number of existing standard cell libraries 2010, 2015, 2020, each of them having a different standard cell row pitch. As will be well understand by those skilled in the art the standard cell row pitch is typically defined in terms of the number of metal 2 tracks provided across the width of the standard cell row, and in the example shown in FIG. 28 the first standard cell library 2010 is a 7.5T (i.e. 7.5 tracks) standard cell library, the second standard cell library 2015 is a 9T standard cell library, and the third standard cell library 2020 is a 10.5T standard cell library. In one embodiment, the tile generation stage 2035 is arranged to generate a standard cell based tile for inclusion in the tile database using standard cells from multiple of the standard cell libraries 2010, 2015, 2020 so that the standard cell based tile has a plurality of standard cell rows extending across its width, where the standard cell row pitch is not the same for all of those standard cell rows. For example, in one particular embodiment the standard cell based tile may include 4 standard cell rows, 3 having a standard cell row pitch of 7.5T, and one having a standard cell row pitch of 9T. The choice of the pitch to associate with each standard cell row is chosen so as to ensure that the overall pitch of the standard cell based tile matches the width of an associated custom tile used to define the memory array. For the memory array tile, the width will be dictated by the bit cells used to form that tile.

The placement of particular standard cells within each standard cell row of a standard cell based tile may be automated, or alternatively may be performed manually by user interaction with the tile generation tool.

As an alternative to constructing the standard cell based tile using standard cell rows with different pitches, in one embodiment the standard cell library generation stage 2025 can be used to modify an existing standard cell library in order to generate a new standard cell library whose standard cell row pitch is chosen specifically having regards to the width of a memory array tile. In particular, the stage 2025 can receive memory information, for example the bit cell dimensions and the memory array sizes, in order to determine the width of various memory array custom tiles. It can then use that information to determine a standard cell row pitch for a new standard cell library, such that the memory array width of a memory array custom tile will be an integer multiple of that determined standard cell row pitch. In the example shown, the stage 2025 is used to generate a new standard cell library having a standard cell row pitch of 7.875T. This enables the tile generation stage 2035 to then generate a new standard cell based tile that consists of a plurality of standard cell rows whose collective pitch will match the width of the associated memory array custom tile.

The modification operation performed in stage 2025 can take a variety of forms. However, in one embodiment, the standard cell library used as an input to the modification stage is chosen to be one having a standard cell row pitch less than the required standard cell row pitch of the new standard cell library to be generated. Hence, in the example shown in FIG. 28, the 7.5T standard cell library 2010 can be chosen as an input. The modification operation then takes the form of a standard cell stretch operation, as described earlier with reference to FIGS. 17 to 19B.

Any standard cell based tiles generated by the tile generation stage 2035 are added to the tile database 2040, for use by the memory instance generation stage 2045.

As shown in FIG. 28, an optional analysis stage 2050 can be associated with the memory instance generation stage 2045. In one embodiment, the memory instance generation stage 2045 may generate a candidate memory instance using the existing tiles in the tiles database 2040, and then the resultant memory instance is subjected to analysis based on certain predetermined criteria in order to decide whether the resultant memory instance is satisfactory. For example, certain criteria may be set for memory density and the like. If the candidate memory instance is not considered optimal, control signals can be issued via path 2055 to the tile generation stage 2035 in order to cause one or more additional standard cell based tiles to be generated. Additionally, the standard cell library generation stage 2025 may also receive a control signal causing it to generate a new standard cell library for subsequent use by the tile generation stage 2035.

Hence, feedback can be used in order to generate further standard cell libraries and/or additional standard cell based tiles. Once those additional standard cell based tiles are then available in the tiles database 2040, the memory instance stage 2045 can be rerun using those additional tiles to determine whether an improved memory instance can be produced. This process can be repeated iteratively until a memory instance is produced that meets the specified criteria, whereafter that memory instance can be output.

The earlier described analysis operations that can be performed in respect of cells in order to determine valid pin access layout patterns and optionally to perform layout guideline checks, as discussed in FIGS. 22A to 27, can also be applied at the tile level, in order to perform those checks on individual tiles, having regards to other tiles in the tile database that may be placed against the tile under consideration. Hence, as shown in FIG. 28, a pin access layout pattern and layout guidelines checking stage 2060 may be provided to analyse the tiles stored in the tile database 2040. The results of the checking process can then be provided to the tile generation stage 2035, in order to cause any problematic tiles to be redesigned.

In memory design, the relative placement of the various components is very structured, and hence there is a limited subset of tiles that can be used as neighbouring tiles for any particular tile under consideration. Hence, as compared with the earlier described process performed in respect of cells of the cell library, the structured nature of the memory design means that there will typically be less checks that need to be performed in respect of the tiles. Given the limited number of neighbouring tiles needing to be checked against, it is possible to set up different boundary conditions to be checked for a particular tile, dependent on the potential neighbouring tiles being considered.

When using the above described approach for generating memory instances, where some of the tiles used to construct a memory instance are standard cell based tiles, it is possible that situations will arise where the standard cells within one or more of the standard cell libraries are altered, which will then have a knock-on effect to the layout of those standard cells within the standard cell based tiles. Example situations where the layout of individual standard cells may change is an Engineering Change Order (ECO) event or a process technology migration to a new process technology.

In accordance with one embodiment, a standard cell change detection stage 2070 is provided which detects when any of the standard cells used to create standard cell based tiles are changed, and notifies the tile generation stage 2035 accordingly. The tile generation stage 2035 then applies an automated technique to modify the layout of the standard cells within the standard cell rows of an affected standard cell based tile in order to accommodate such changes in individual standard cell layouts. In particular, in one embodiment, the tile generation stage 2035 performs a tile modification operation on a standard cell based tile to take account of a change in layout of at least one of the standard cells included in the plurality of standard cell rows of the standard cell based tile. More details of the tile modification operation will be provided later with reference to FIGS. 33 to 35D.

Figure 29:
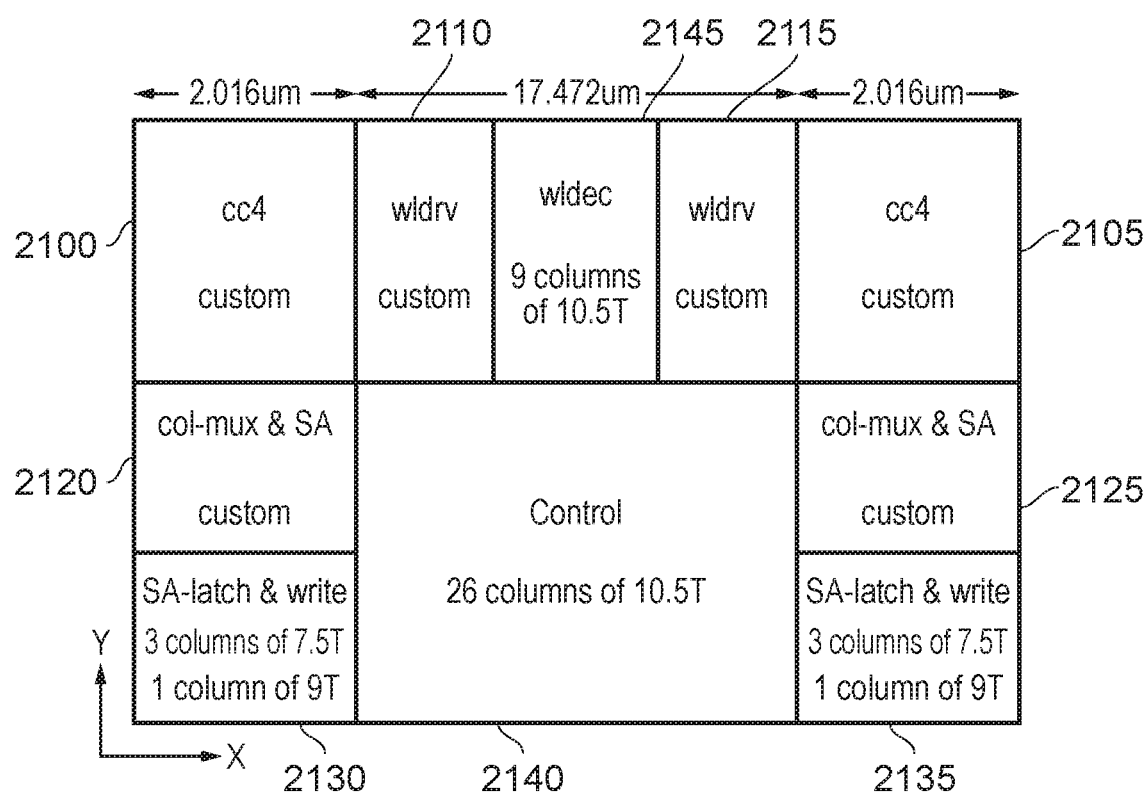
FIG. 29 schematically illustrates a memory instance generated in accordance with the technique of FIG. 28.

FIG. 29 illustrates an example memory instance that may be generated using the approach of FIG. 28. This memory instance consists of a number of separate regions, with each of the separate regions typically being constructed from multiple tiles. In particular, two separate memory arrays are defined by the memory array regions 2100, 2105, and each of these regions will typically be formed by arranging a plurality of memory array tiles side-by-side. As mentioned earlier, these tiles will be entirely custom tiles designed having regards to the bit cells used within the memory array. In association with each of the memory arrays 2100, 2105, additional tiles may be generated to define the column multiplexing and the sense amp functionality, including the sense amplifier latching and write mechanisms. In particular, regions 2120, 2130 will be formed in association with memory array 2100, and regions 2125, 2135 will be formed is associated with the memory array 2105, and each of the regions 2120, 2130 and 2125, 2135 will be populated with a plurality of tiles to provide the required column multiplexing and sense amp functionality. The tiles used in these regions in one embodiment will be standard cell based tiles, since at least a portion of each such tile is formed from standard cells arranged in a plurality of standard cell rows. However, typically not all of the components within the tiles will be formed from standard cells. For example, the column multiplexing and sense amplifier circuitry still typically needs to be custom designed. For instance, the sense amplifier circuitry is sensitive analogue circuitry and does not lend itself to being implemented using standard cells. However, all of the sense amplifier latching and write circuitry can be implemented using standard cells arranged in a plurality of standard cell rows. In the example, four rows are provided for each tile, three using 7.5T pitch and one using 9T pitch.

In FIG. 29, these rows are referred to as columns, because the orientation of the memory array is such that the rows of the memory array run in the X direction shown in FIG. 29 and the columns of the memory array run in the Y dimension. However, whilst the orientation shown in FIG. 29 means that the standard cell rows run in the Y dimension, and accordingly can be referred to as columns, for the purpose of the present application the standard cells will be described as extending along multiple standard cell rows.

Figure 30A:
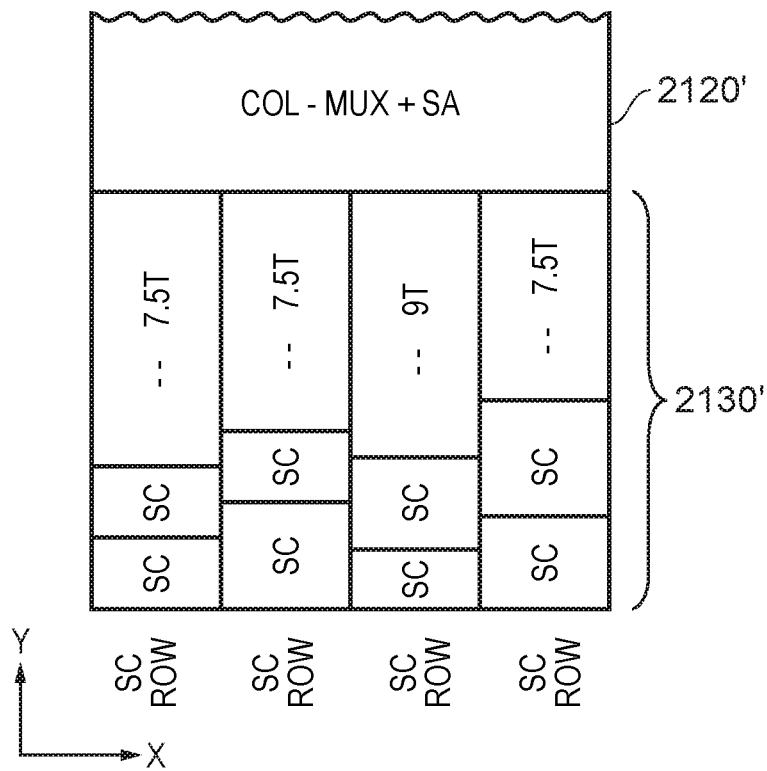
FIGS. 30A to 30C illustrate alternative arrangements for generating a standard cell-based tile used to form the memory instance regions 2120, 2130 in FIG. 29.

FIG. 30A hence illustrates the four standard cell rows within a tile section 2130' of a tile in one embodiment, used to implement a part of region 2130 of the memory instance. The tile also includes a tile section 2120' formed from custom layout, and used to implement a part of region 2120 of the memory instance. A similar arrangement will be used for the tiles used to implement the regions 2125, 2135 of the memory instance. In this particular implementation, the 9T standard cell row is the third row from the left, this allowing boundary abutment with 7.5T to 7.5T standard cells.

Figure 30B:
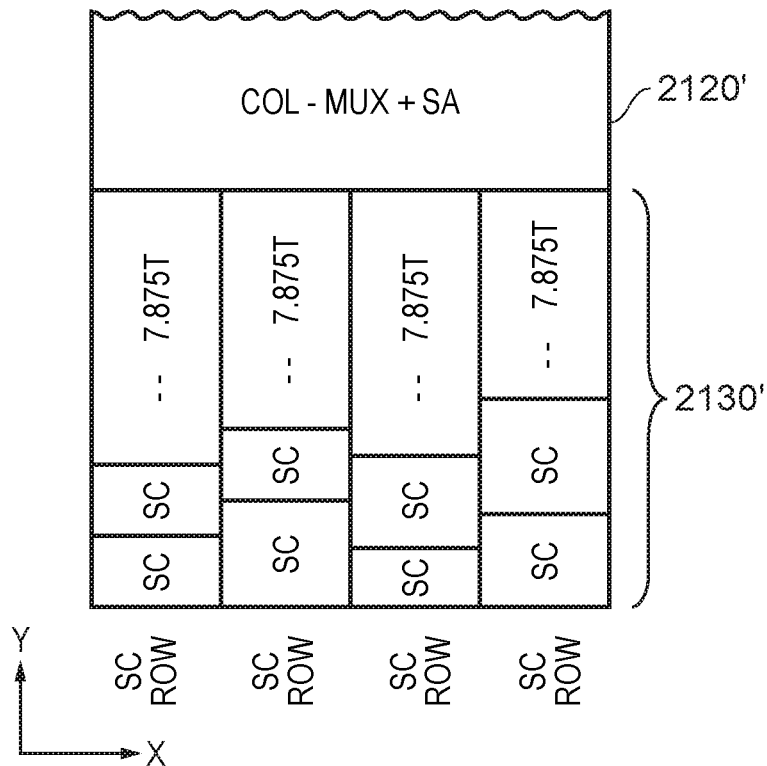

FIG. 30B illustrates an alternative arrangement that may be used for the tile section 2130' within a standard cell based tile, when using standard cells from the generated 7.875T standard cell library 2030. As discussed earlier, this standard cell library is generated by the stage 2025 having particular regard to the width of the custom tiles used to implement the custom memory array cells 2100, 2105.

Figure 30C:
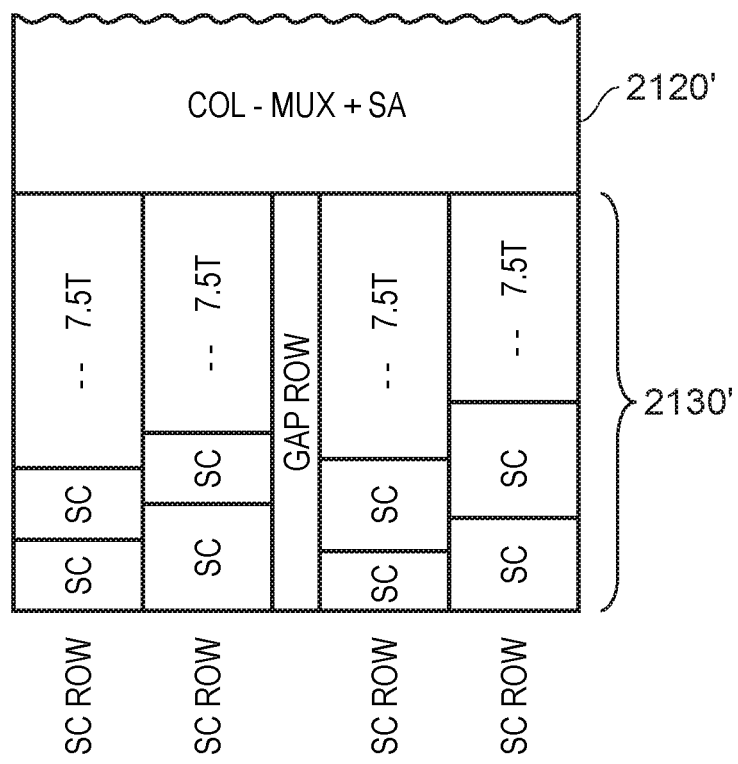

FIG. 30C illustrates a yet further alternative arrangement that may be used for the section 2130' within a standard cell based tile used in the region 2130 of the memory instance. In this example, the standard cell rows are populated with standard cells from the 7.5T standard cell library, and a gap row is introduced so as to allow the total width of the standard cell rows to match the width of the corresponding memory array tile.

A further region of the memory instance forms the control block 2140 including all of the various control circuitry required by the memory instance. Again this region of the memory instance is typically constructed from multiple tiles. There are many large drivers within the control circuitry and routing is extremely congested (typically being limited to the metal 2 and metal 3 layers only) in the control layout. Accordingly, a standard cell library is chosen to implement the components of the control circuitry that allows the best device density (i.e. the best number of fins per finger assuming that FINFET technology is used to implement the control components). In one embodiment, it is found that using the 10.5T cell library provides the optimum device density.

Figure 31:
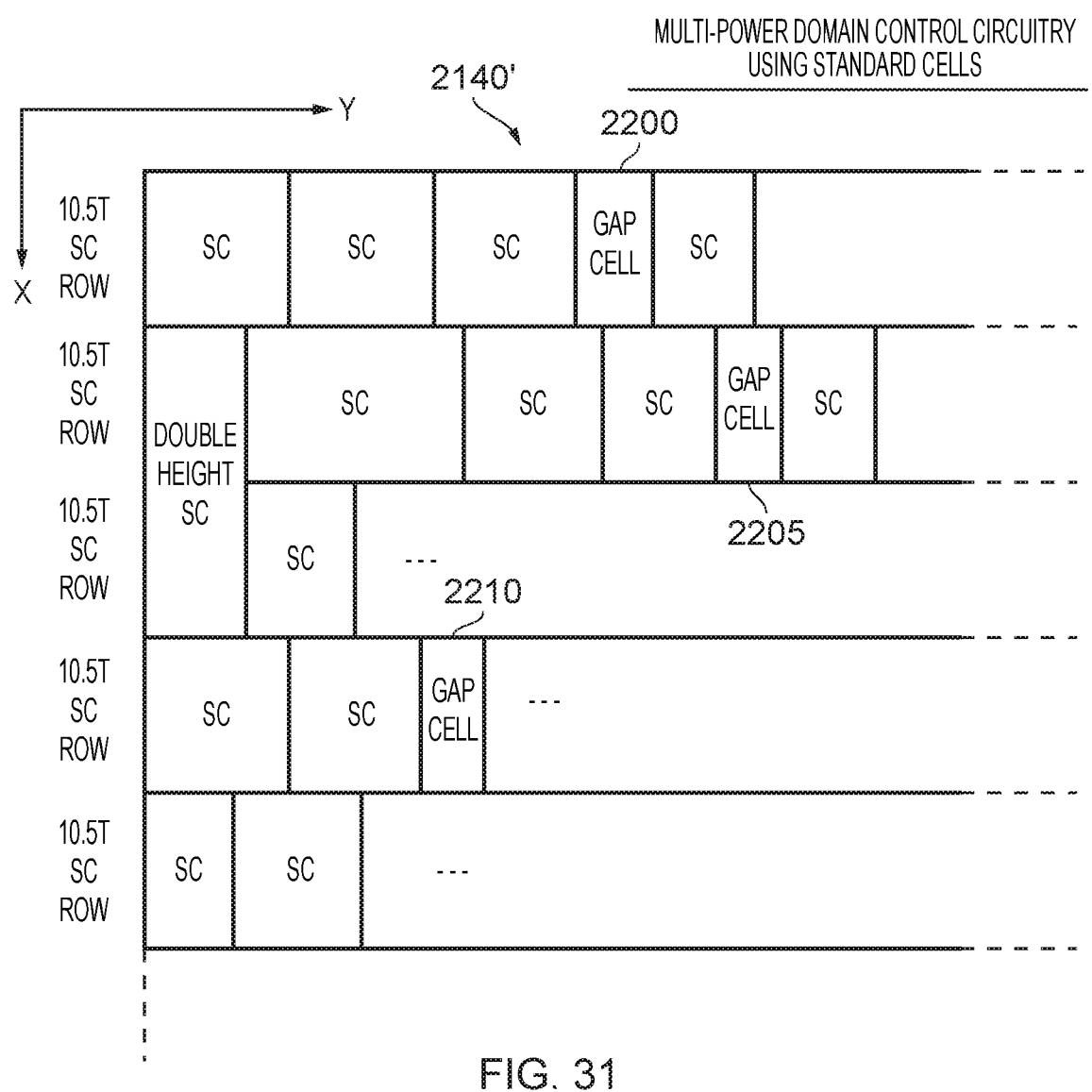
FIG. 31 schematically illustrates the use of gap cells within the control tiles used to form the control region 2140 of FIG. 29 in accordance with one embodiment.

It is also the case that the control circuitry often needs to support multiple power domains. In accordance with one embodiment, the standard cell library is supplemented to include custom gap cells that are used to provide isolation between the various power domains without the need to completely segregate the standard cell components of one power domain from the standard cell components of another power domain, which could have an adverse impact on density. This approach is illustrated schematically in FIG. 31.

Figure 32A:
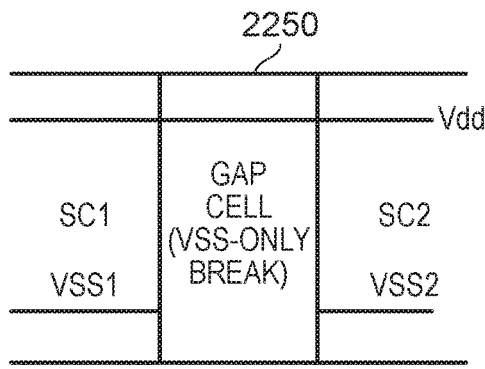
FIGS. 32A to 32C illustrate different forms of gap cell that may be used in one embodiment.
Figure 32B:
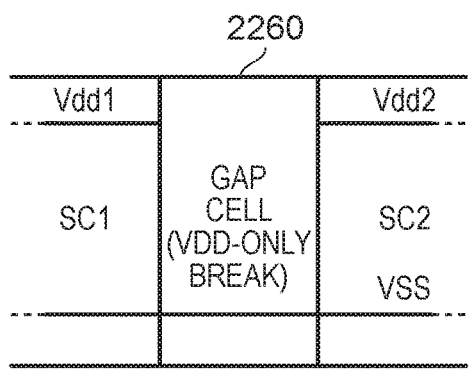
Figure 32C:
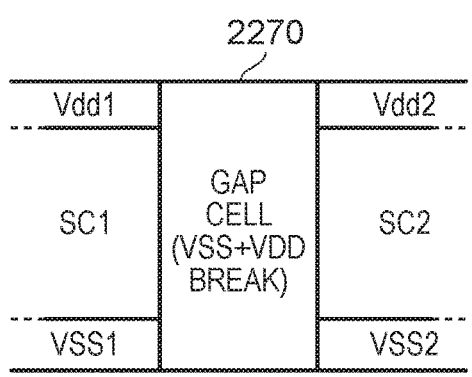

In particular, as shown, within a standard cell based tile 2140' used to form part of the control region 2140, standard cells can be arranged within each of the various standard cell rows, with standard cells associated with one power domain being separated from standard cells associated with another power domain via the appropriate gap cells 2200, 2205, 2210. Various forms of gap cells that can be used are shown in FIGS. 32A to 32C. In particular, FIG. 32A shows a Vss-only break gap cell 2250. As can be seen, the supply voltage line Vdd is not interrupted by the gap cell, but the associated reference voltage line, namely the ground voltage line, is. This enables the standard cell 1 to operate from a different ground supply to the standard cell 2, while both standard cells operate from the same supply voltage line.

FIG. 32B illustrates a Vdd-only break gap cell 2260. In this arrangement, the ground supply line is shared between the two standard cells SC1 and SC2 but each of those standard cells can be provided with a different supply voltage line Vdd1 and Vdd2.

FIG. 32C illustrates a Vss+Vdd break gap cell 2270, where different supply voltage lines and ground lines are provided in association with the two standard cells either side of the gap cell.

When using FINFET technology, it is also the case that a supply voltage is typically provided to the Nwell of a PMOS device and the Pwell of an NMOS device. Similar gap cells as those shown in 32A to 32C can also be used to provide breaks between Nwell voltage lines and/or Pwell voltage lines to enable different Nwell voltages and Pwell voltages to be provided to different components in different power domains.

Returning to FIG. 29, another tile is provided which can be replicated to implement the blocks 2110, 2145 and 2115 of the memory instance. Wordline drivers in blocks 2110 and 2115 are typically custom designed, since they are large devices (of the order of 20 to 40 fins in FINFET technology) and accordingly do not lend themselves to be designed using standard cells. However, the wordline decoder portion 2145 can be formed using standard cells, and in this case the standard cell row pitch of the tile is chosen to be equal to the standard cell row pitch used in the control tile used to implement the control region 2140.

Whilst the above described technique significantly improves the speed by which memory instances can be generated for a particular process technology, it also eases the layout migration to different process technologies. In particular, migration to a different process technology will be easier because it is possible to reuse the relative placement of standard cells and replace the existing standard cells with new process standard cells. Alteration can then be used to route the wires in accordance with the new process.

In addition to the above process technology migration situation, other situations can arise where the size of the standard cells will change, hence having a knock-on effect to the layout of those standard cells within any standard cell based tiles. One such examples situation is an Engineering Change Order (ECO) event.

In accordance with one embodiment, an automated mechanism is provided to enable the layout of the standard cells within the standard cell rows of the standard cell based tile to be modified in order to accommodate any changes in the individual standard cell layout. This mechanism will now be described with reference to FIGS. 33 to 35D.

Figure 33:
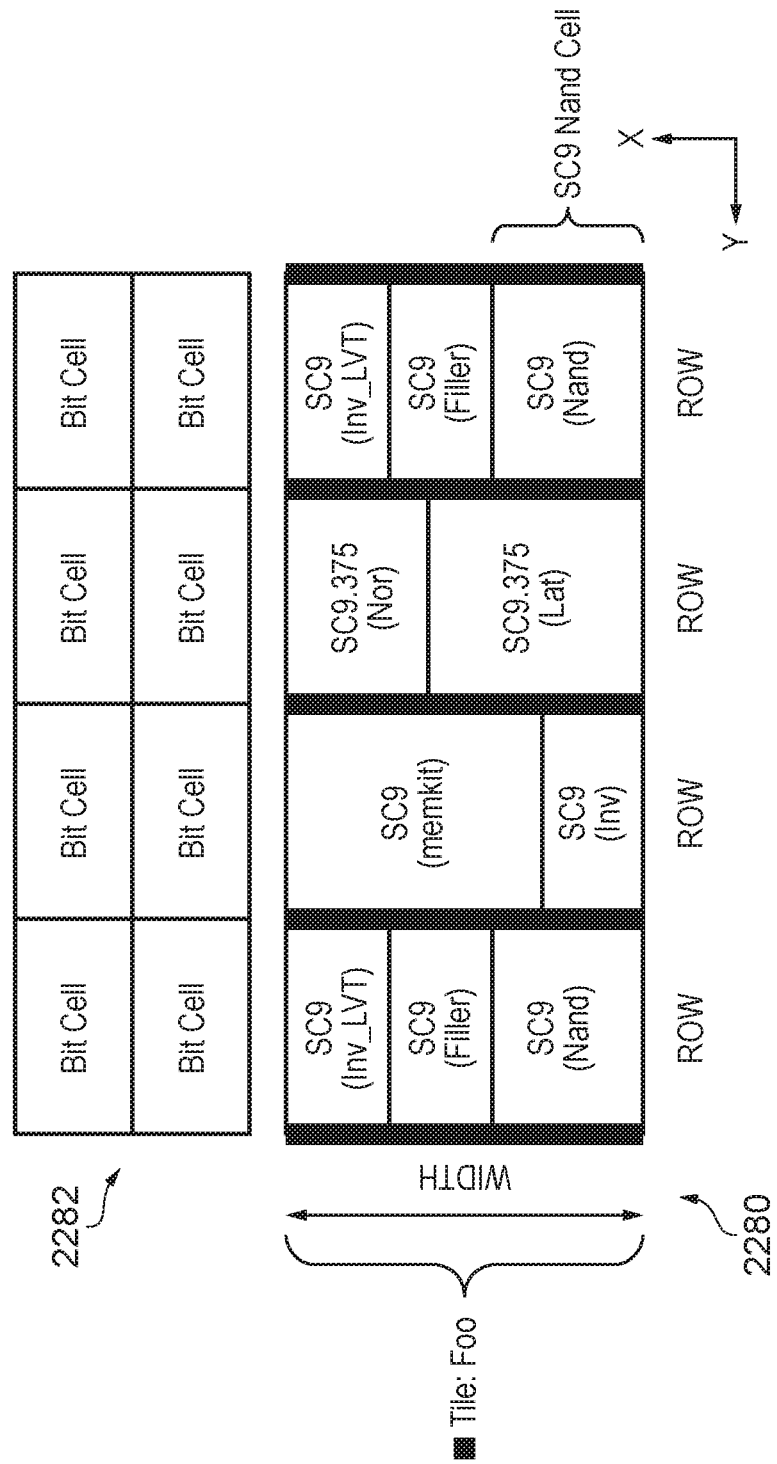
FIG. 33 illustrates a standard cell based tile in accordance with one example embodiment.

FIG. 33 illustrates a particular standard cell based tile 2280 designed so that its overall pitch matches the width of an associated memory array tile 2282, in this instance the associated memory array tile specifying an array of two rows of bit cells arranged in four columns. The standard cell based tile includes three rows of 9T pitch and one row of 9.375T pitch. Since for the purposes of the following discussion consideration will be given to cells changing width in the standard cell row dimension, or height in the standard cell row dimension, the X and Y dimensions referred to when describing FIGS. 34A to 35D are as shown in FIG. 33.

It should be noted that this is the opposite to that shown in FIG. 29, due to the fact that in FIG. 29 the X and Y dimensions were set with respect to the rows and columns of the memory array, and as discussed earlier the standard cell rows are aligned with the columns of the memory array.

Figure 34A:
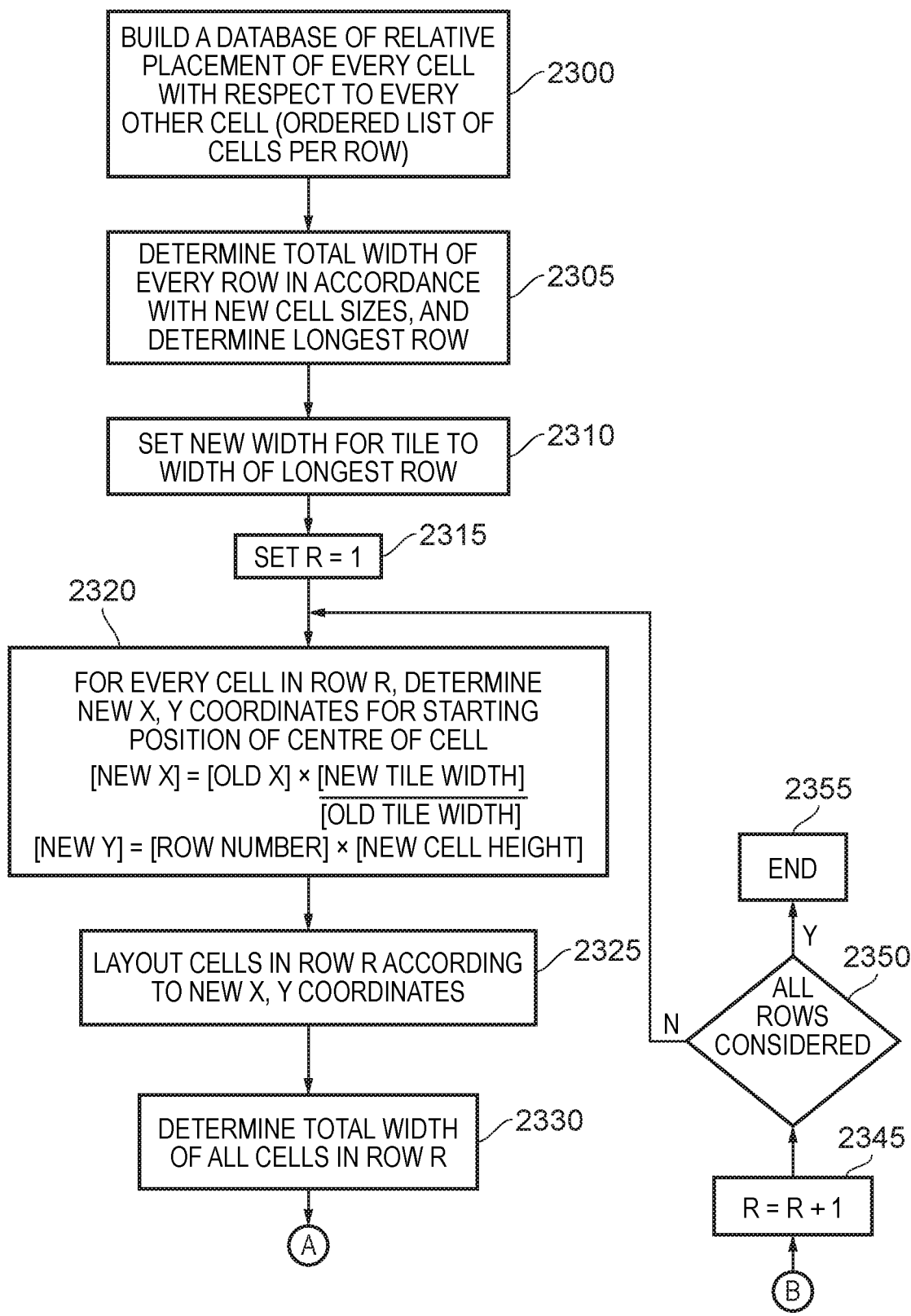
FIGS. 34A and 34B illustrate a flow diagram describing a tile modification operation performed in accordance with one embodiment when the layout of at least one standard cell in the tile changes.
Figure 34B:
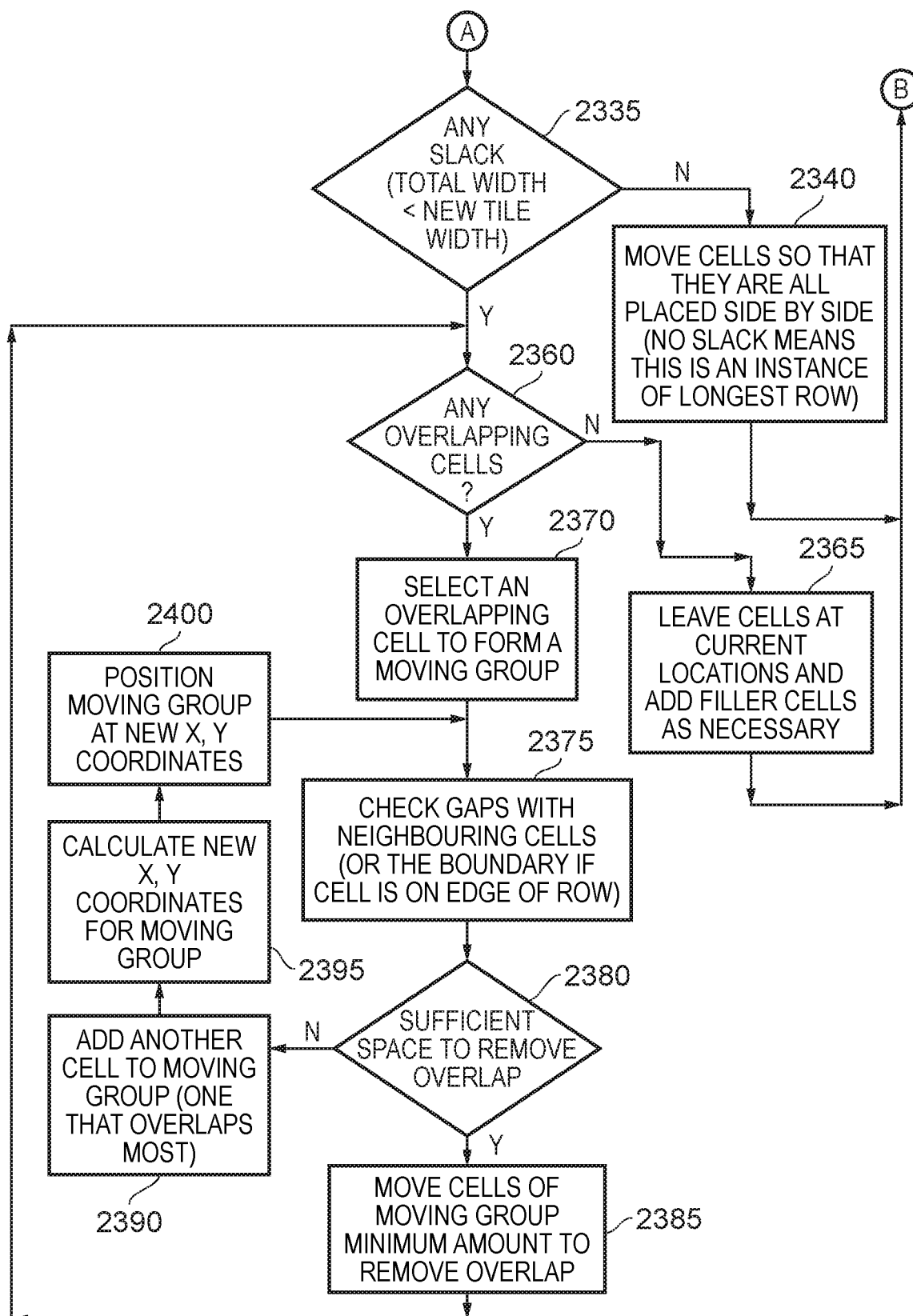

FIGS. 34A and 34B describe a relative placement algorithm executed within the tile generation stage 2035 in respect of a tile from the tile database 2040 when the standard cell change detection stage 2070 determines that at least one of the standard cells has changed size. At step 2300, a database is constructed identifying the relative placement of every cell with respect to every other cell within the tile, this effectively providing an ordered list of cells per row within the tile.

At step 2305, the total width of every row is determined in accordance with the new cell sizes, and the longest row is then identified. This is hence the longest row in the X dimension shown in FIG. 33. It is possible that more than one row may be the longest row, but is expected that not all the rows will now have the same width, given the changes in the various standard cells that may have taken place.

At step 2310, the new width of the tile is set to the width of the longest row. This new width may in fact be larger than the pre-existing width of the tile, or may actually be smaller than the pre-existing width, and the following described technique is applicable to either situation.

At step 2315, a parameter R is set equal to one. Then, at step 2320, for every cell in row R of the tile, the new X and Y coordinates of the starting position of the centre of that cell is determined. The new X coordinate is calculated by taking the original X coordinate, and multiplying it by the ratio of the new tile width to the old tile width. The new Y coordinate is merely determined by multiplying the row number by the new cell height (it is to be noted that the cell height will not always have changed when the cells are modified, but in that event the new Y coordinate will merely be determined to be the original Y coordinate).

After step 2320 has been performed for every cell in row R, the various cells in row R are laid out according to the new X, Y coordinates at step 2325. This can potentially lead to some overlapping of the cells, as shown by way of example in the upper figure of FIG. 35A. Alternatively, it may mean that some cells have gaps between them within the row, as illustrated by the upper figure in FIG. 35B.

At step 2330, the total width of all the cells in row R is determined. It should be noted that for the purposes of this calculation, it does not matter how the cells are positioned within the row, but instead the individual widths are added together. Hence, considering the example of FIG. 35A, the widths W1, W2 and W3 are added together to determine the total width.

At step 2335, it is then determined whether there is any slack present in the row. This will be the case if the total width is less than the new tile width determined at step 2310. However, if there is no slack, this means that the row in question must be one of the longest rows, and in this situation the process proceeds to step 2340, where the cells are moved so that they are all placed side by side. This process is illustrated schematically in FIG. 35A. This then represents the final cell placement for the cells within such a row, and the process then returns to point B in FIG. 34A. In particular, the process then proceeds to step 2345, where the row number is incremented, whereafter at step 2350 it is determined whether all rows have been considered. If they have, then the process ends at step 2355, whereas otherwise the process returns to step 2320 to consider the next row.

Assuming at step 2335 it is determined that there is some slack in the row, then at step 2360 it is determined whether there are any overlapping cells. This process is performed by scanning from one side of the row to the other, for example, in one embodiment involving scanning from left to right through the rows for the orientation illustrated in FIGS. 35A to 35D. If no overlapping cells are found, then the process proceeds to step 2365, where the cells are left at their current location and filler cells are added as necessary. This process is schematically illustrated for the example of FIG. 35B, where the three cells 2450, 2455, 2460 within the row are all non-overlapping and accordingly can be left where they are, with filler cells added to fill out the row to meet the new tile width. The process then returns to step 2345.

If at step 2360 it is determined that there are overlapping cells, then one of the overlapping cells is selected to form a moving group. This is illustrated for example in FIG. 35C for the cells 2470, 2475, 2480. Whilst either of the cells 2470, 2475 could be selected to form the moving group, in one embodiment the rightmost of the two cells is chosen as the original moving group.

Thereafter, at step 2375, the gaps with neighbouring cells are checked in order to determine if there is sufficient space for the moving group to be accommodated. If the moving group is placed adjacent either boundary of the cell, then the gap is determined with regards to the location of the one neighbouring cell, and the location of the row boundary to the other side of the moving group.

Accordingly, if it is assumed that the moving group is formed from cell i, then the distance is checked between the right edge of cell i−1 and the left edge of cell i+1. If the distance between the neighbours is sufficient to place the moving group, as determined at step 2380, then at step 2385 the moving group is moved the minimum amount necessary to remove the overlap. For the first iteration, where the moving group only contains a single cell, it will be appreciated that the cell will move right, since the moving group would have been formed due to there being an overlap with cell i−1.

Figure 35A:
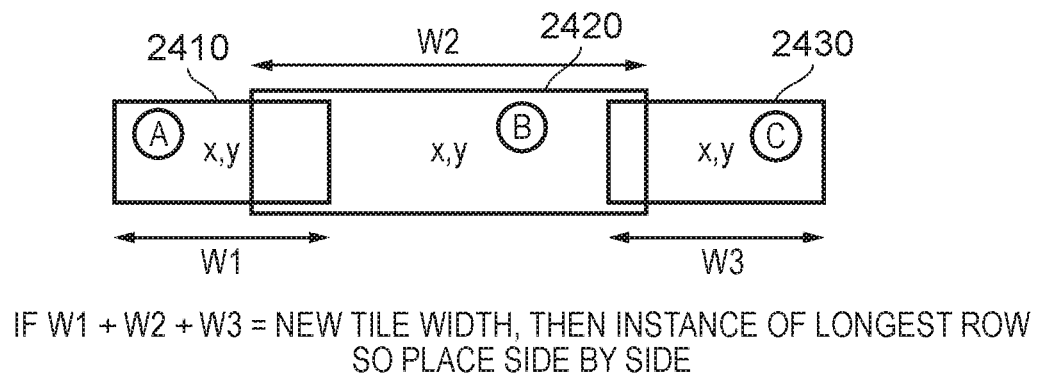
FIGS. 35A to 35D illustrate example cell placement modifications that may take place when performing the process of FIGS. 34A and 34B.
Figure 35B:
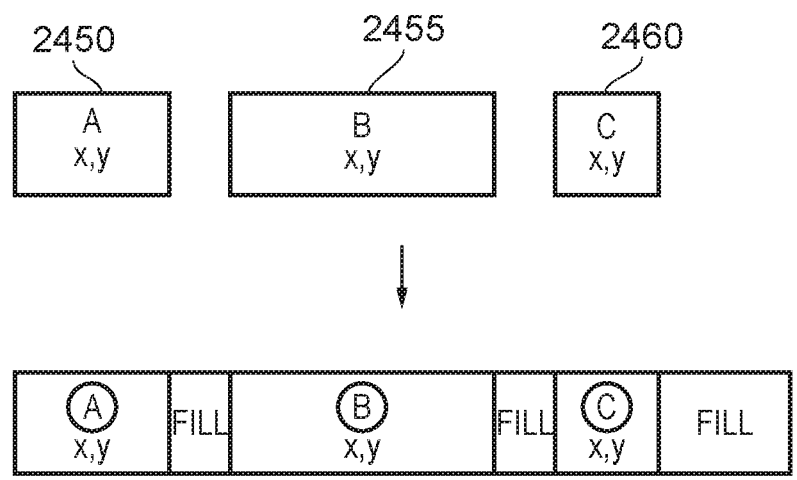
Figure 35C:
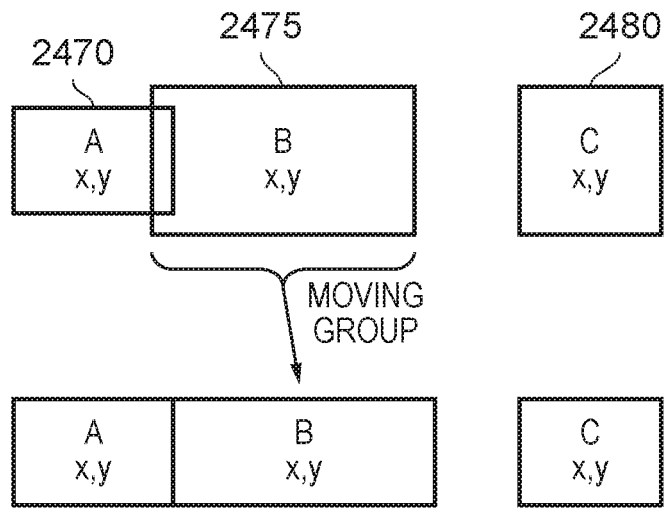

The required movement of the moving group in this instance is illustrated schematically in FIG. 35C, the moving group formed by cell 2475 being moved the minimum amount to remove its overlap with cell 2470.

However, if at step 2380 it is determined that there is insufficient space to remove the overlap, then another cell is added to the moving group. Typically this will be the cell that overlaps the most with the existing cell(s) of the moving group.

Figure 35D:
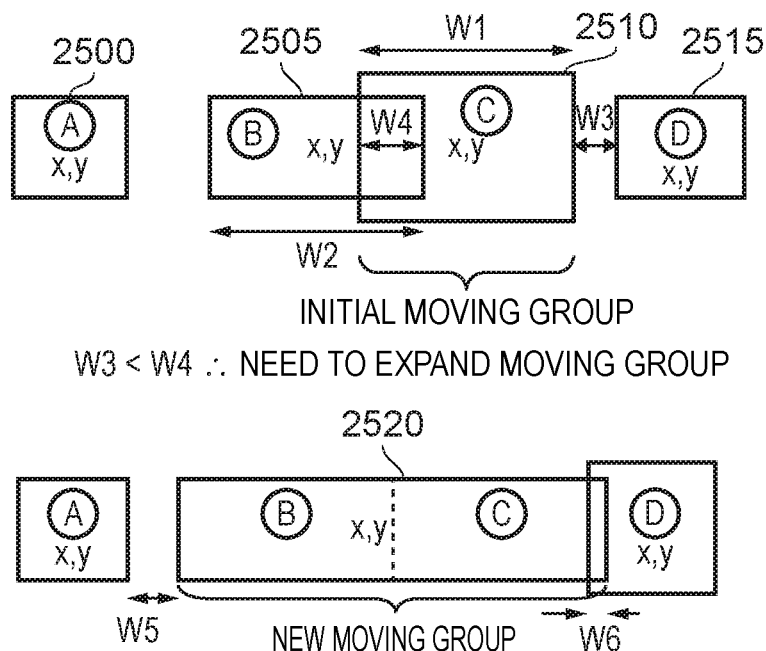
Figure 35D:
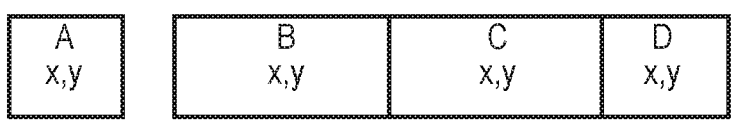

This scenario is illustrated for example in the uppermost figure of FIG. 35D. In particular, the initial moving group is set equal to the cell 2510. When performing the check at step 2375, it is determined that there is not sufficient space between the adjacent cells 2505 and 2515 to accommodate the moving group, due to the distance W3 being less than the distance W4 shown in FIG. 35D. As a result, at step 2390, the cell 2505 is added to the moving group along with the cell 2510.

At step 2395 a new X, Y coordinate is determined for the new moving group, i.e. the combination of cells 2505 and 2510. In general terms, the starting centre X, Y location of the moving group is determined to be the average of the X value of the leftmost edge of the leftmost member of the moving group and the X value of the rightmost edge of the rightmost member of the moving group. Hence, if the moving group contains cells i, i+1, i+2, then the centre of the moving group is (left_edge(i)+right_edge(i+2))/2.0. This is shown schematically in the middle figure of FIG. 35D, and results in the new moving group 2520 being formed with its associated X, Y coordinate. That new moving group is then positioned at its X, Y coordinate at step 2400, whereafter the process returns to step 2375.

For the example illustrated in the middle figure of FIG. 35D, it will now be seen that when the gaps are again checked at step 2375, there will be sufficient space to accommodate the moving group, since the overlap distance W6 is less than W5. Accordingly, the process proceeds to step 2385, where the cells of the moving group are moved the minimum amount to remove the overlap, as shown in the bottom figure of FIG. 35D. The process can then return to step 2360 to determine whether there are any remaining overlapping cells within the row. Once all overlapping cells have been resolved in this way, the process will eventually branch to step 2365, where any remaining gaps will be filled by filler cells, and the process will then return to step 2345.

By the above described approach, it will be seen that such an approach enables an automated mechanism for readjusting the locations of standard cells within standard cell rows of a standard cell based tile in order to accommodate changes in standard cell sizes either due to ECO events or process technology migration events. Further, the relative placement algorithm used ensures that the fewest number of standard cells have to be moved to accommodate the standard cell changes, hence reducing the rewiring overhead required to maintain the required connectivity between the cells. This technique hence improves the productivity and reduces the time required to make changes to an existing tile layout, or to migrate from one process technology to another. This in turn allows for additional iterations and improvements, thus improving the overall quality of the design at less cost.

Figure 36:
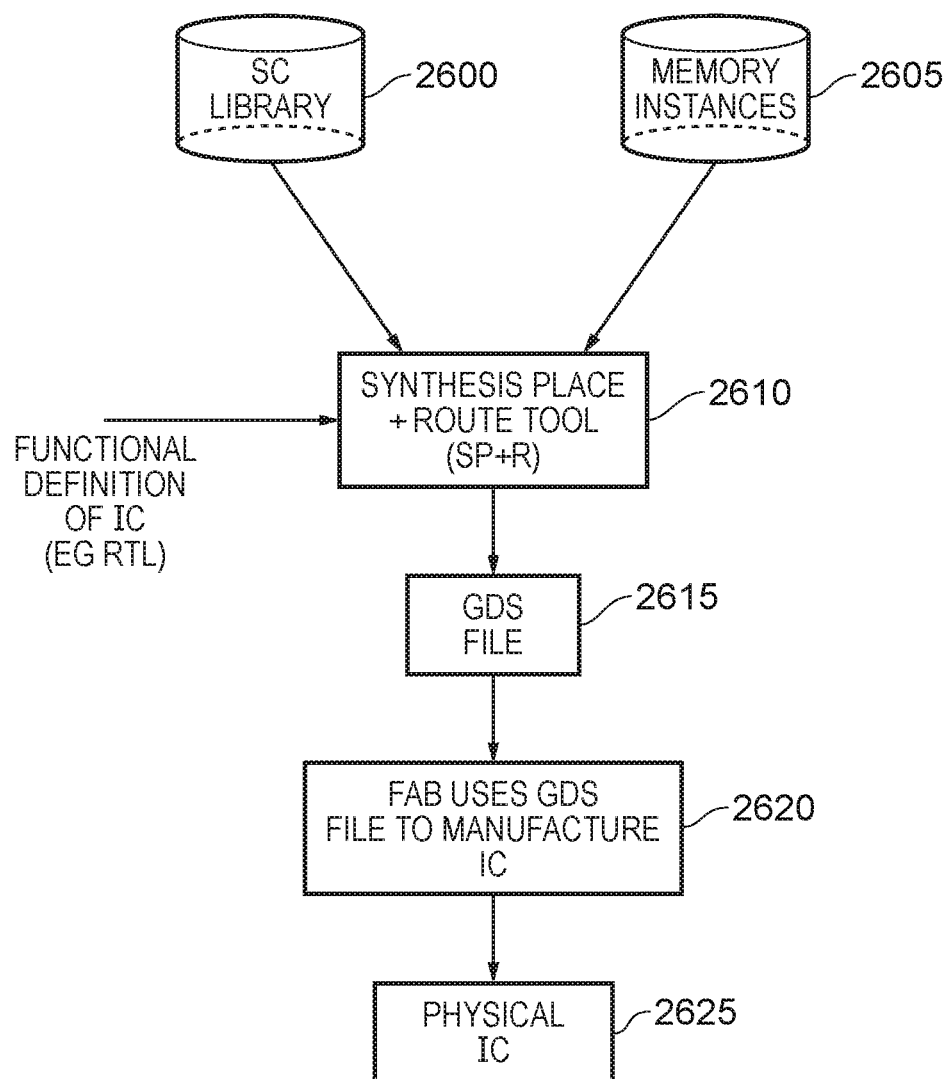
FIG. 36 schematically illustrates how an integrated circuit is manufactured in one embodiment, using the standard cells and memory instances generated using the techniques described herein.

FIG. 36 is a flow diagram illustrating the steps involved in one embodiment in order to manufacture a physical integrated circuit from the standard cells and memory instances generating using the earlier described techniques. In particular, a standard cell library 2600 may be provided containing a plurality of standard cells generated using the above described techniques. A further library 2605 may be provided storing a plurality of memory instances, which may be generated using the tile-based approach described earlier.

A synthesis place and route (SP&R) tool 2610 may then receive a functional definition of the desired integrated circuit, for example in RTL (Register Transfer Language) form, and using the standard cell library 2600 and memory instances 2605 can then generate an output GDS file 2615 representing the integrated circuit layout in each of the various layers. GDS is a well known file format for representing layout.

At step 2620 the manufacturing facility (also referred to as the fab) uses the GDS file in order to manufacture the integrated circuit, for example by depositing various layers on a semiconductor substrate in patterns defined by the GDS file. This results in the output of a physical integrated circuit at step 2625.

Figure 37:
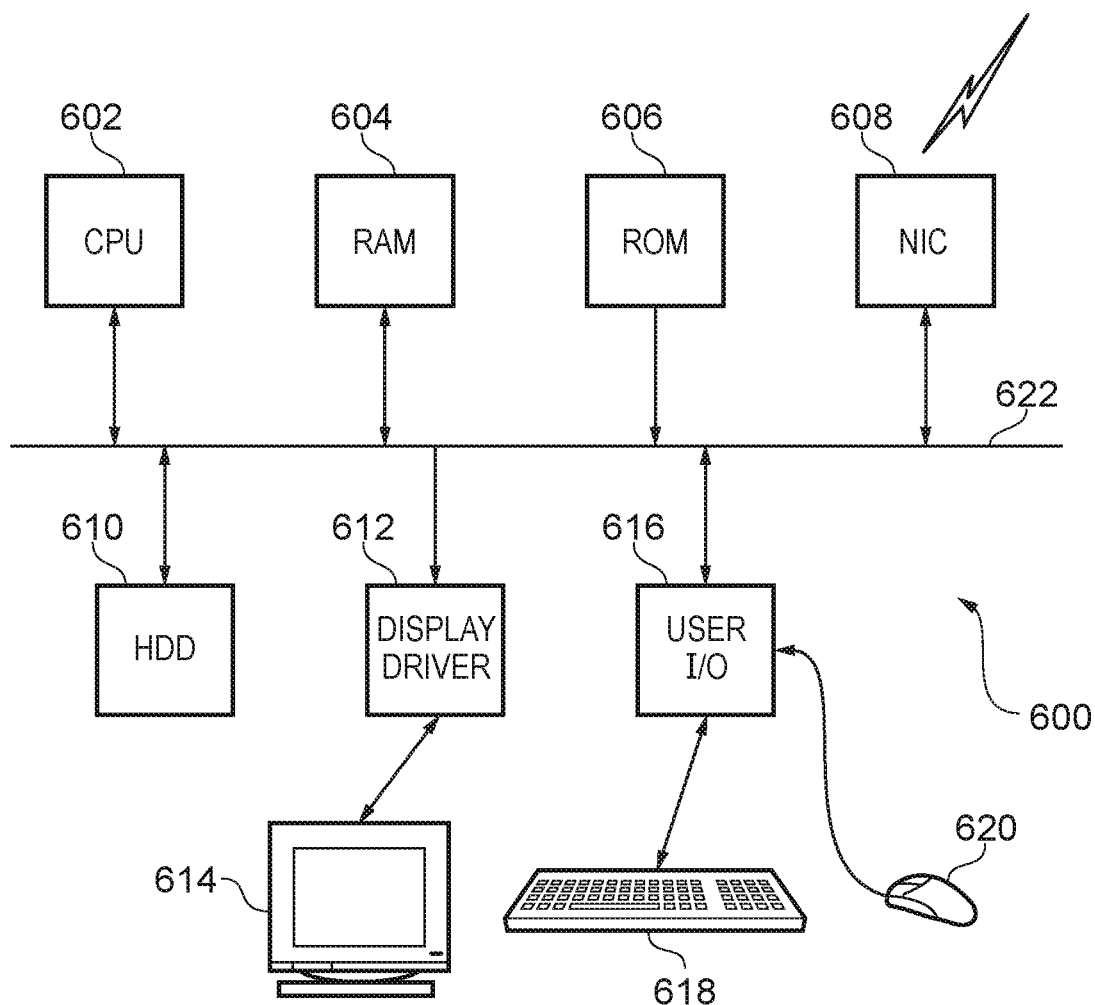
FIG. 37 schematically illustrates a general purpose computer of the type which can be used to implement the present techniques.
Figure 38:
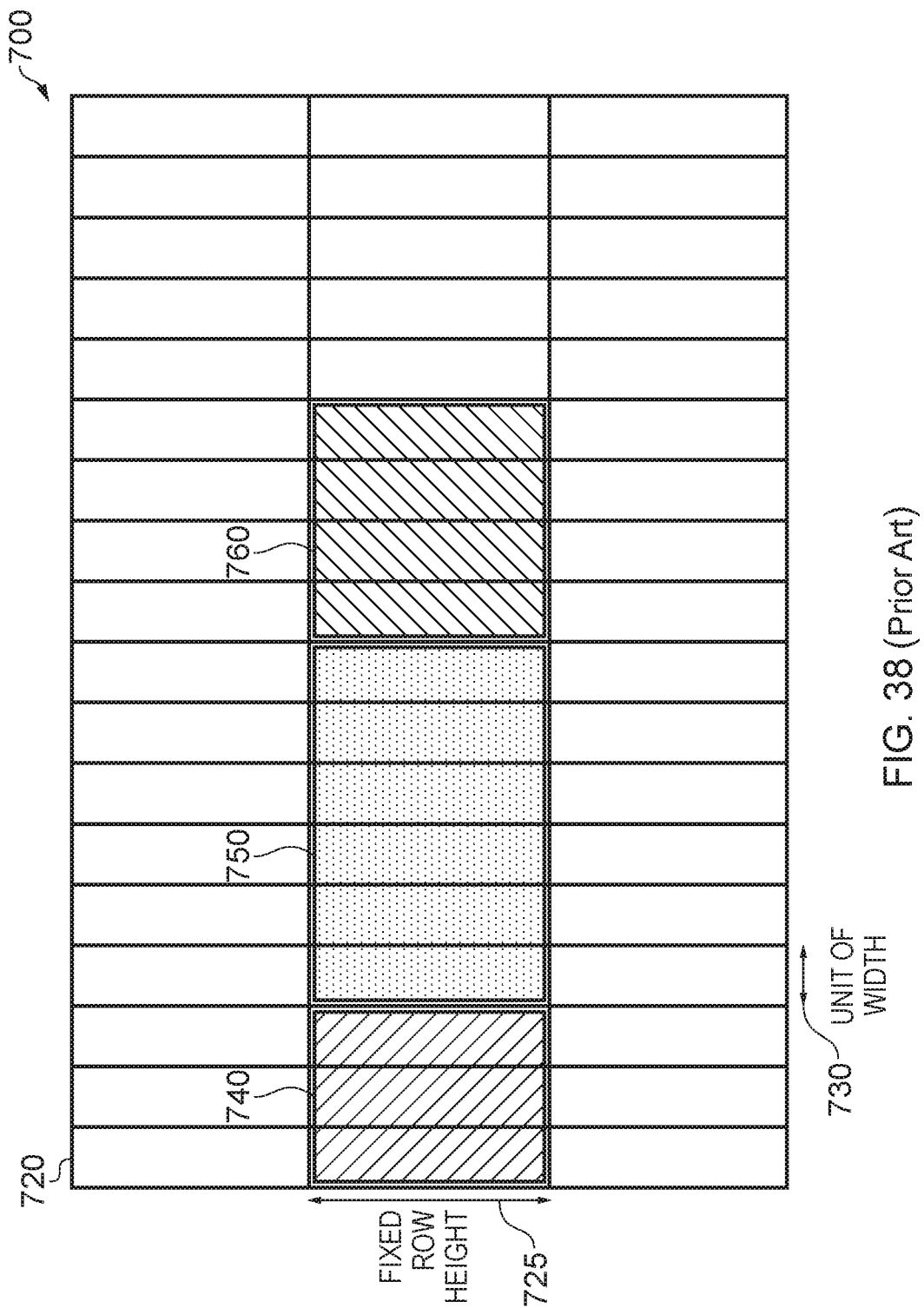
FIG. 38 is a diagram schematically illustrating how standard cells are placed within rows during the process of generating a layout for an integrated circuit.

FIG. 37 schematically illustrates a general purpose computer 600 of the type that may be used to implement the above described techniques. The general purpose computer 600 includes a central processing unit 602, a random access memory 604, a read-only memory 606, a network interface card 608, a hard disk drive 610, a display driver 612 and monitor 614, and a user input/output circuit 616 with a keyboard 618 and mouse 620 all connected via a common bus 622. In operation the central processing unit 602 will execute computer program instructions that may be stored in one or more of the random access memory 604, the read-only memory 606 and the hard disk drive 610, or dynamically downloaded via the network interface card 608. The results of the processing performed may be displayed to a user via the display driver 612 and the monitor 614. User inputs for controlling the operation of the general purpose computer 600 may be received via the user input/output circuit 616 from the keyboard 618 or the mouse 620. It will be appreciated that the computer program could be written in a variety of different computer languages. The computer program may be stored and distributed on a recording medium or dynamically downloaded to the general purpose computer 600. When operating under control of an appropriate computer program, the general purpose computer 600 can perform the above described techniques and can be considered to form an apparatus for performing the above described techniques. The architecture of the general purpose computer 600 could vary considerably, and FIG. 37 is only one example.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. A method comprising:
providing a tile database with multiple tiles that define one or more first component sections for a memory device;
defining an array of storage elements having a specified memory array width;
defining one or more second component sections having at least part of a standard cell based tile with standard cells arranged in multiple standard cell rows; and
generating a memory instance by defining a layout for the memory device with the multiple tiles selected from the tile database based on matching the multiple standard cell rows to the specified memory array width of the array of storage elements.

2. The method of claim 1, wherein the tile database includes a memory array custom tile that defines the array of storage elements with the specified memory array width.

3. The method of claim 2, wherein the multiple standard cell rows are configured to match the specified memory array width of the memory array custom tile.

4. The method of claim 3, wherein a portion of the standard cell based tile is formed using the standard cells arranged in the multiple standard cell rows that are configured to align with the specified memory array width of the memory array custom tile.

5. The method of claim 3, further comprising:
receiving input parameters for generating the memory instance; and
constructing the memory instance based on the multiple tiles selected from the tile database in accordance with the input parameters.

6. The method of claim 5, wherein the multiple tiles selected from the tile database include the memory array custom tile and the standard cell based tile.

7. The method of claim 1, further comprising manufacturing an integrated circuit, or causing an integrated circuit to be manufactured, in accordance with the memory instance generated by defining the layout for the memory device.

8. A method comprising:
obtaining a first cell layout of a cell from a tile database;
identifying one or more cut lines based on the first cell layout of the cell, wherein the one or more cut lines run horizontally through the cell in a height dimension or run vertically through the cell in a width dimension;
generating an output data file of the cell for the tile database by performing a resizing operation on the first cell layout of the cell in the height dimension or in the width dimension using a resizing amount for each cut line of the one or more cut lines; and
generating a second cell layout of the cell that corresponds to the first cell layout of the cell by performing a cell generation operation based on the output data file.

9. The method of claim 8, wherein the resizing operation is a stretching operation in the height dimension or in the width dimension with the resizing amount as a stretching amount, wherein the cut lines run horizontally through the cell to enable the cell to be stretched in the height dimension or in the width dimension.

10. The method of claim 8, wherein the resizing operation is a shrinking operation in the height dimension or in the width dimension with the resizing amount as a shrinking amount, wherein the cut lines run vertically through the cell to enable the cell to be shrunk in the height dimension or in the width dimension.

11. The method of claim 8, further comprising:
providing the tile database with multiple tiles that define component sections for a memory device,
wherein the tile database includes a memory array custom tile that defines an array of storage elements having a specified memory array width.

12. The method of claim 11, wherein:
the tile database has a standard cell based tile that defines a component section having at least part of the standard cell based tile with standard cells arranged in standard cell rows to define components of the component section, and
the standard cell rows are configured to match the specified memory array width of the memory array custom tile.

13. The method of claim 12, further comprising:
receiving input parameters for generating a memory instance; and
fabricating the memory instance from the multiple tiles that are selected from the tile database based on the input parameters,
wherein the multiple tiles include the memory array custom tile and the standard cell based tile.

14. The method of claim 8, further comprising manufacturing an integrated circuit, or causing an integrated circuit to be manufactured, based on the second cell layout.

15. A method comprising:
accessing a tile database that identifies a cell layout for a cell;
identifying one or more cut lines relative to the cell architecture;
specifying a resizing amount for each cut line of the one or more cut lines; and
generating an output data file for the tile database that resizes the cell layout of the cell based on the resizing amount corresponding to each cut line.

16. The method of claim 15, wherein:
the resizing amount refers to a stretch amount or a shrink amount, and
resizing the cell layout of the cell refers to stretching or shrinking the cell layout of the cell based on the stretch amount or the shrink amount corresponding to each cut line.

17. The method of claim 15, further comprising manufacturing an integrated circuit, or causing an integrated circuit to be manufactured, based on the cell layout of the cell.

18. The method of claim 15, further comprising:
identifying the cell layout for the cell architecture as a first cell layout for a first cell;
identifying a second cell layout for a second cell that is different than the first cell layout of the first cell;
resizing the first cell layout of the first cell architecture at the one or more cut lines to match the second cell layout of the second architecture; and
generating another output data file for the tile database in reference to the second cell layout of the second architecture.

19. The method of claim 18, wherein resizing the first cell layout to match the second cell layout refers to stretching or shrinking the first cell layout of the first cell architecture relative to the resizing amount corresponding to one or more cut lines to match the second cell layout of the second architecture.

20. The method of claim 18, further comprising manufacturing an integrated circuit, or causing an integrated circuit to be manufactured, based on the second cell layout of the second cell.

* * * * *